Sept. 7, 1948.  G. F. DALY  2,448,781
RECORD CONTROLLED MACHINE
Filed March 14, 1942  29 Sheets-Sheet 3
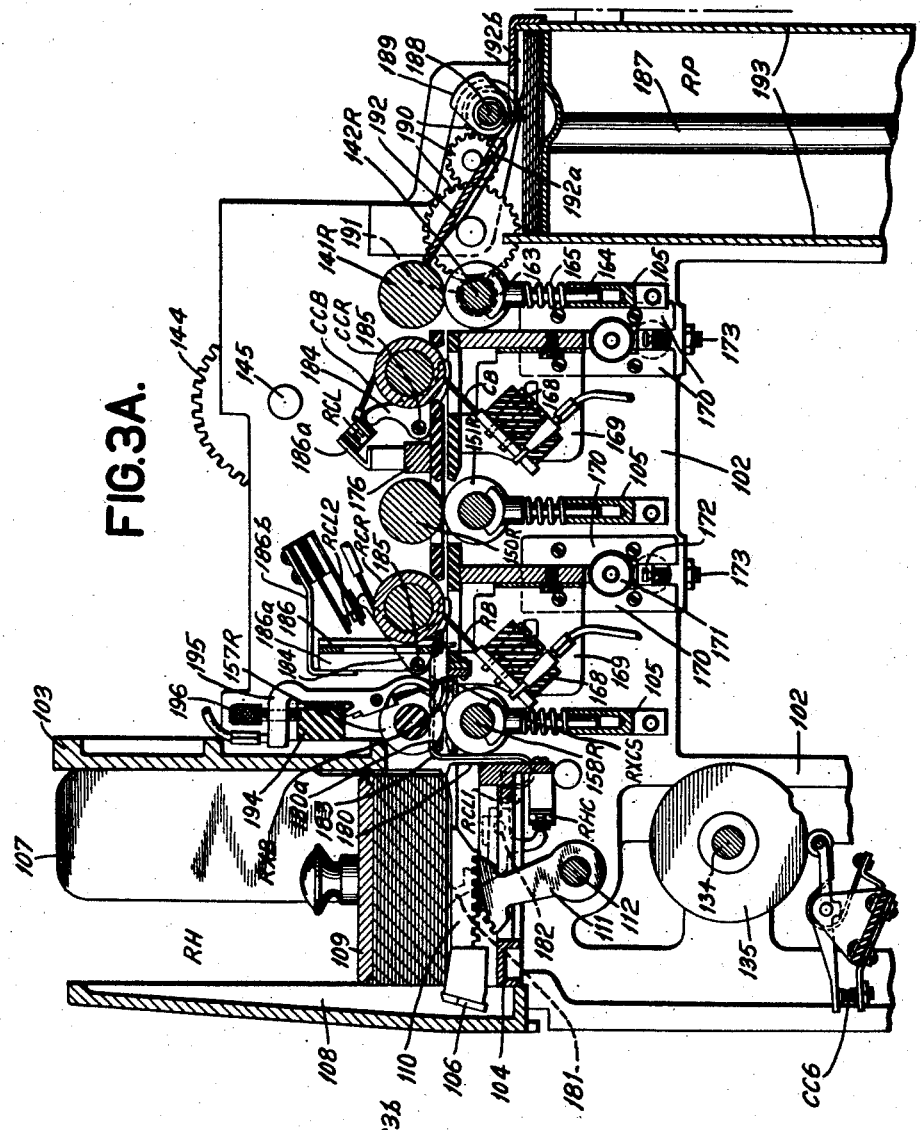
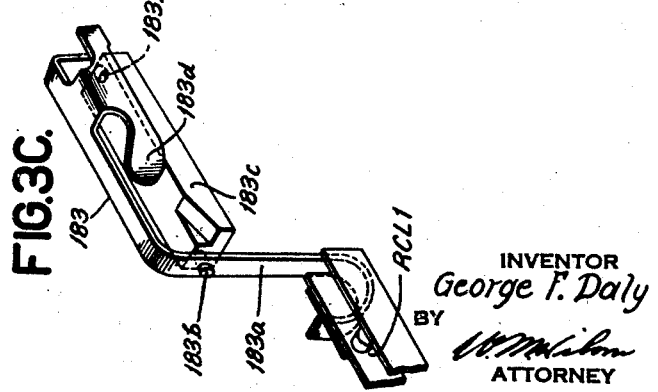
INVENTOR
George F. Daly
BY
ATTORNEY Sept. 7, 1948.   G. F. DALY   2,448,781
RECORD CONTROLLED MACHINE
Filed March 14, 1942   29 Sheets-Sheet 4

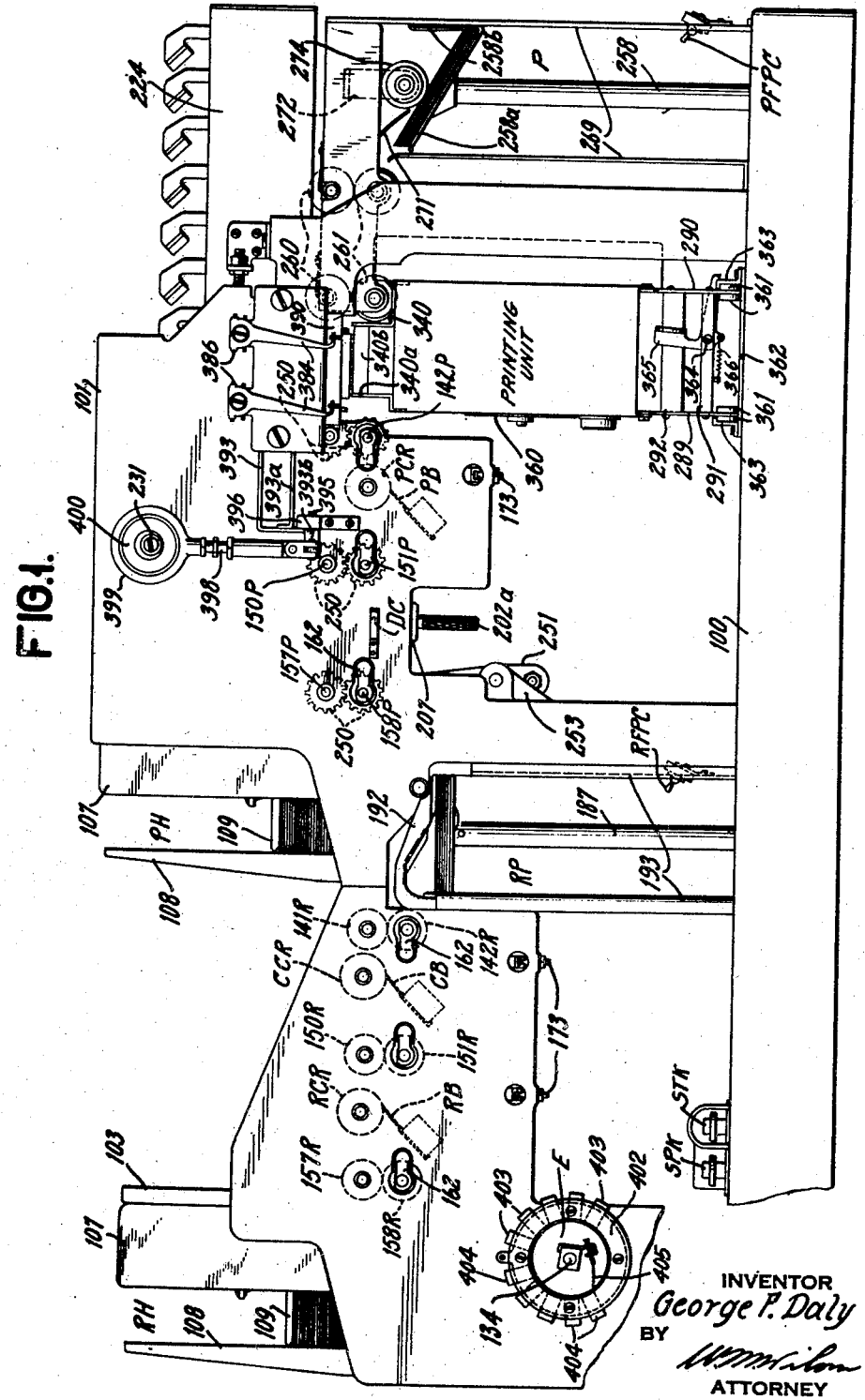

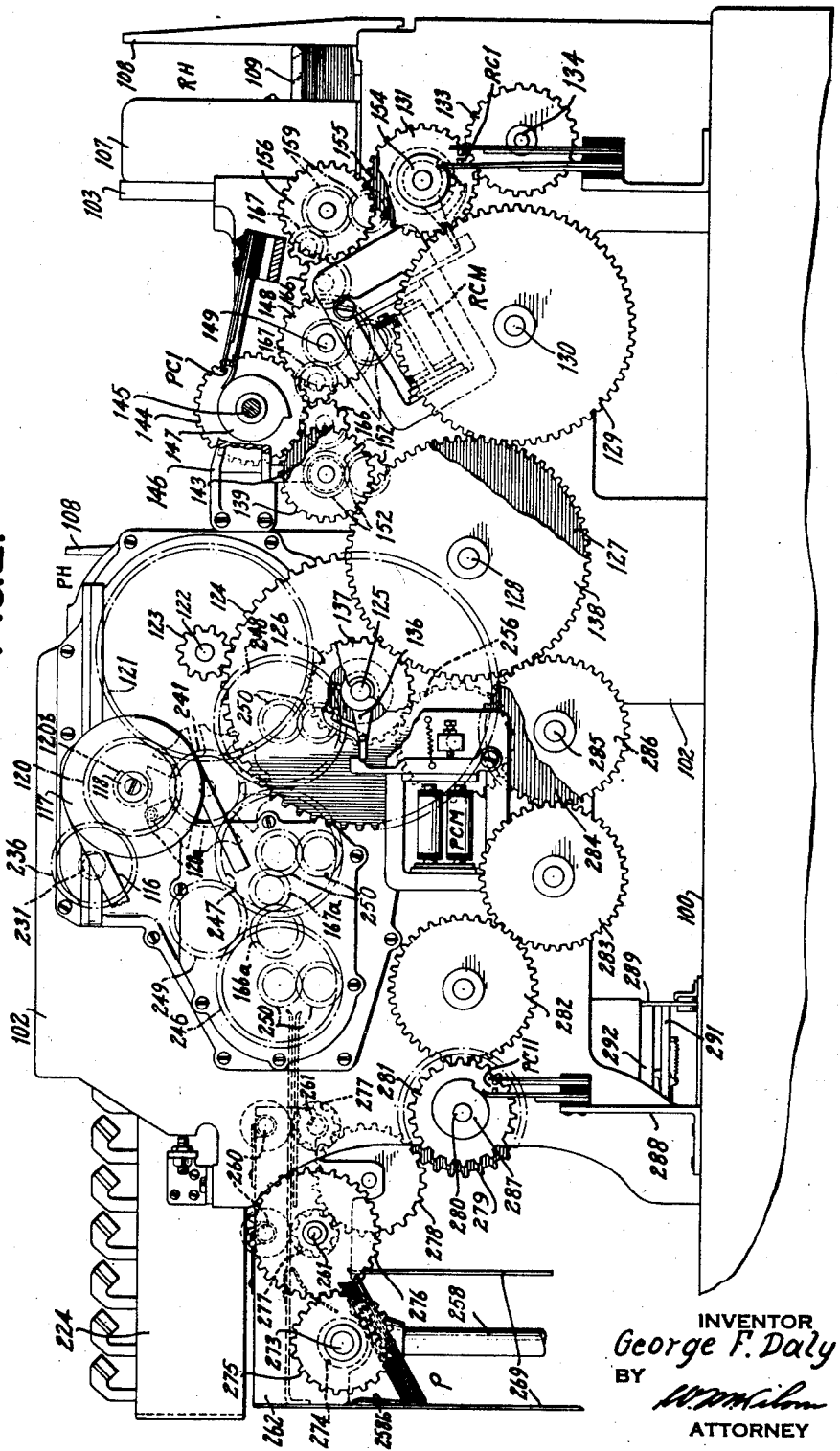

INVENTOR
George F. Daly
BY
ATTORNEY

Sept. 7, 1948.         G. F. DALY         2,448,781
            RECORD CONTROLLED MACHINE
Filed March 14, 1942                 29 Sheets-Sheet 6
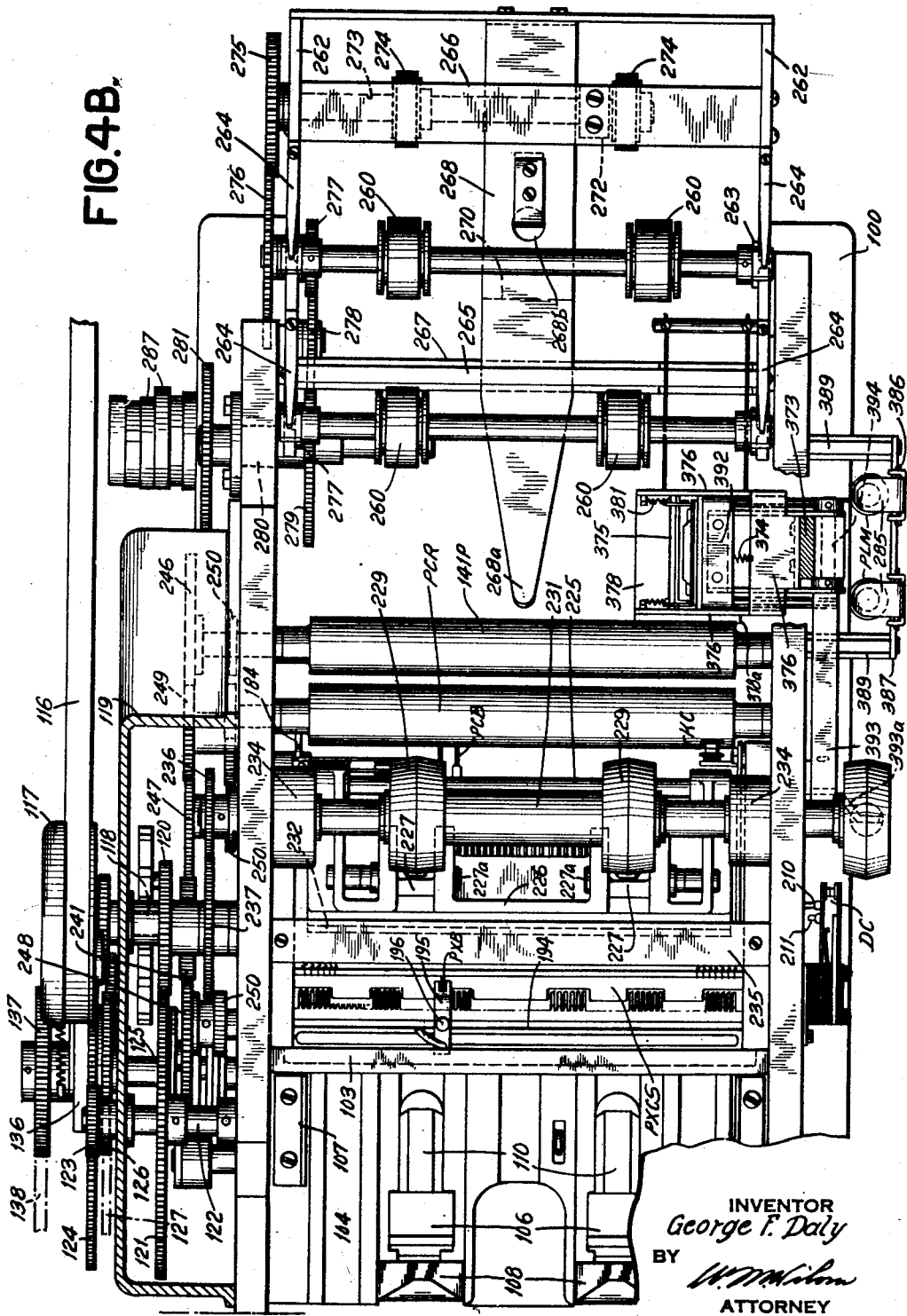
INVENTOR
*George F. Daly*
BY
*W. M. Wilson*
ATTORNEY Sept. 7, 1948.　　　　　G. F. DALY　　　　　2,448,781
RECORD CONTROLLED MACHINE
Filed March 14, 1942　　　　　　　　　　　　29 Sheets-Sheet 7

INVENTOR
George F. Daly
BY
ATTORNEY

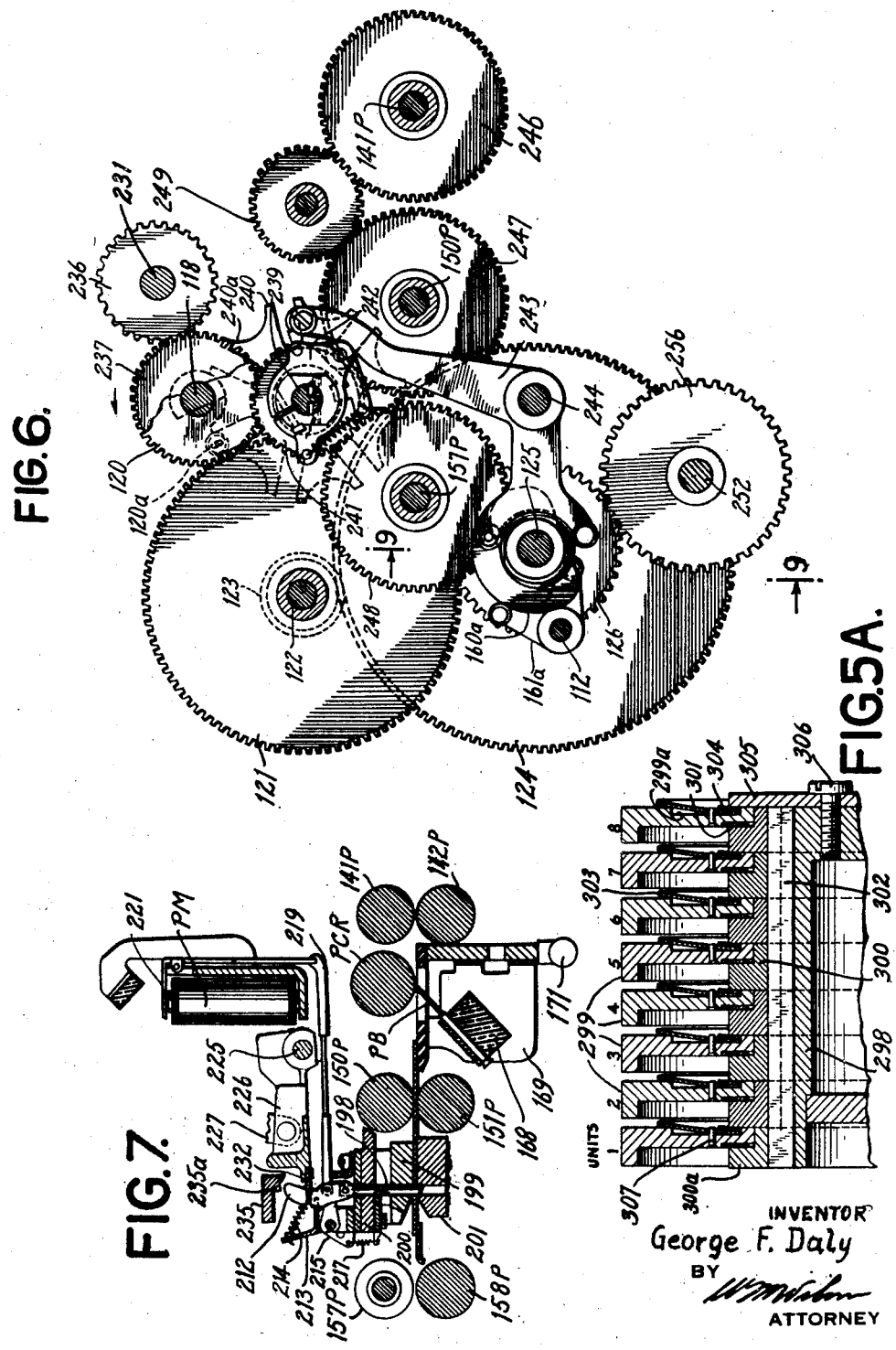

Sept. 7, 1948.   G. F. DALY   2,448,781
RECORD CONTROLLED MACHINE
Filed March 14, 1942   29 Sheets-Sheet 9
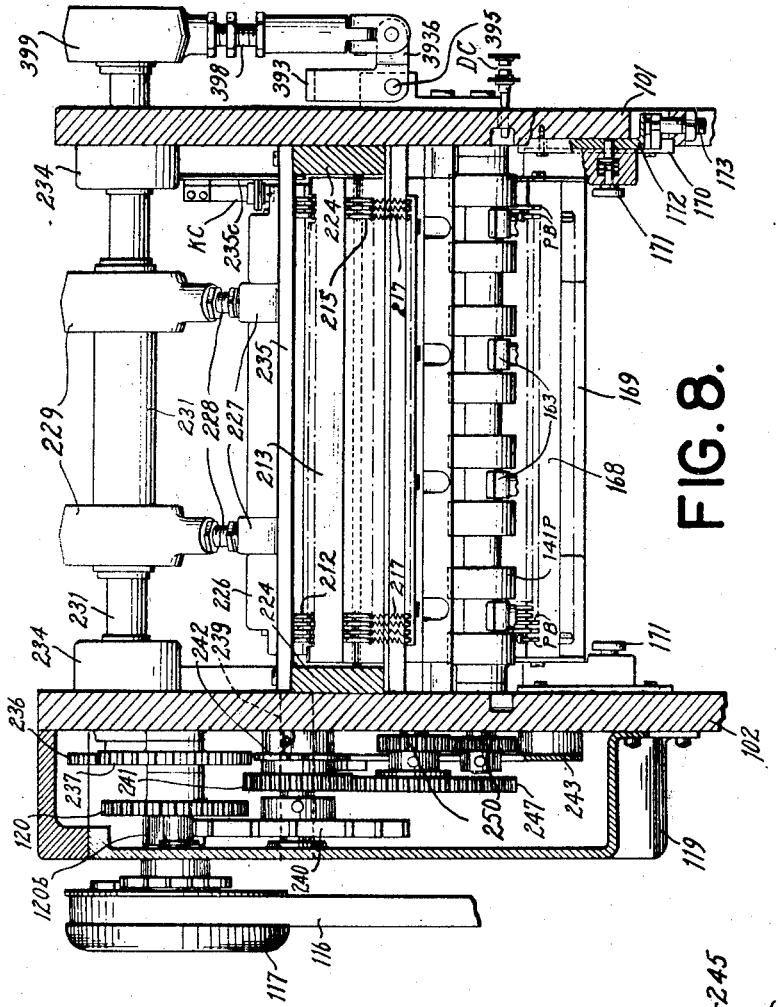
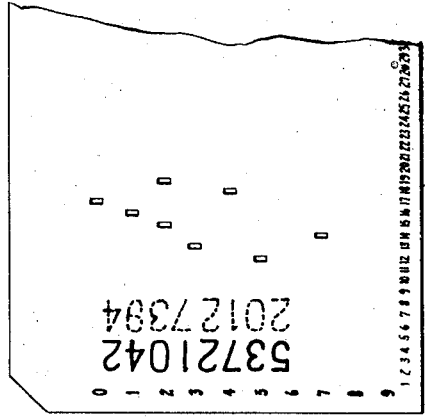
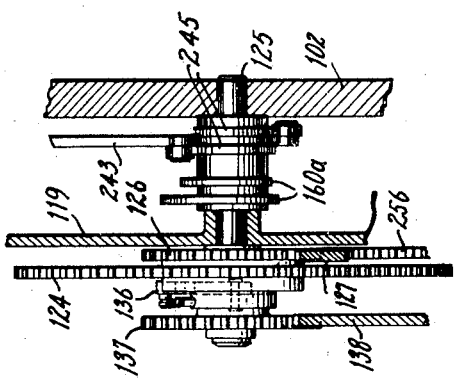
INVENTOR
George F. Daly
BY
ATTORNEY Sept. 7, 1948.  G. F. DALY  2,448,781
RECORD CONTROLLED MACHINE
Filed March 14, 1942  29 Sheets-Sheet 10
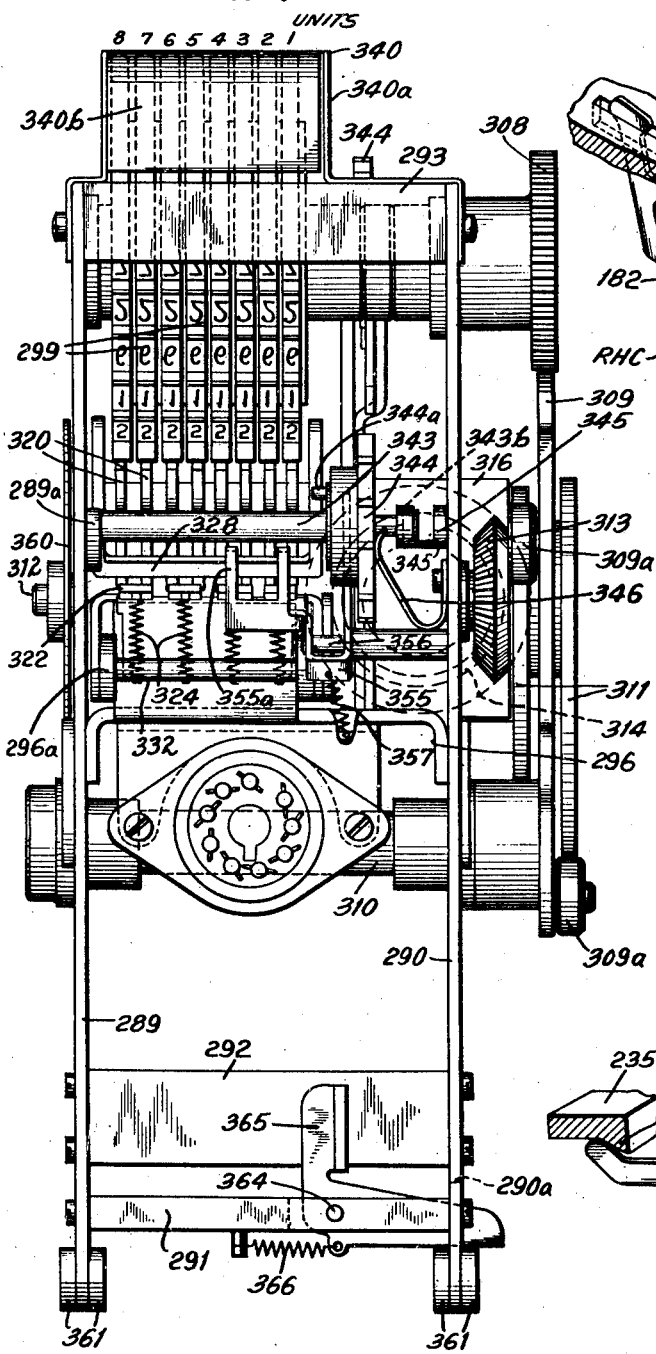
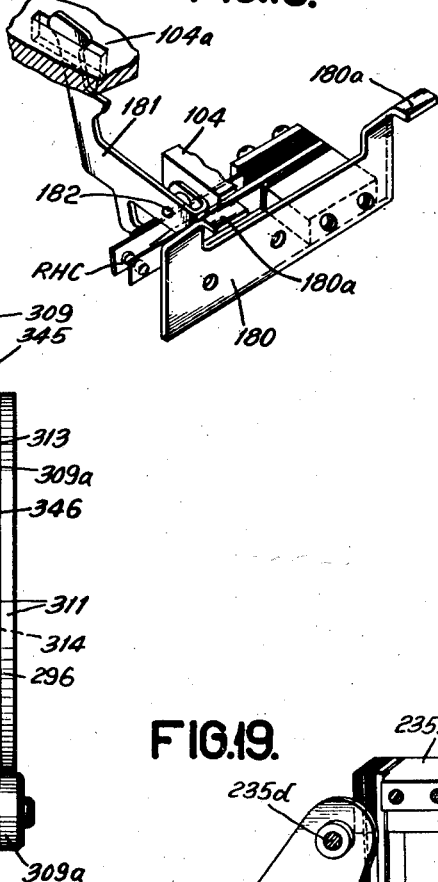
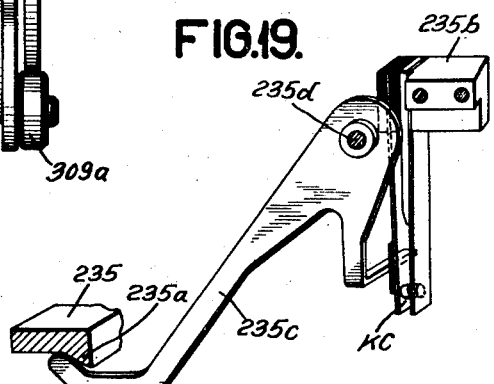
INVENTOR
George F. Daly
BY
ATTORNEY Sept. 7, 1948.　　　　　G. F. DALY　　　　　2,448,781
RECORD CONTROLLED MACHINE
Filed March 14, 1942　　　　　　　　　　　　29 Sheets-Sheet 11

INVENTOR
George F. Daly
BY
W. M. Wilson
ATTORNEY

Sept. 7, 1948. G. F. DALY 2,448,781
RECORD CONTROLLED MACHINE
Filed March 14, 1942 29 Sheets-Sheet 12
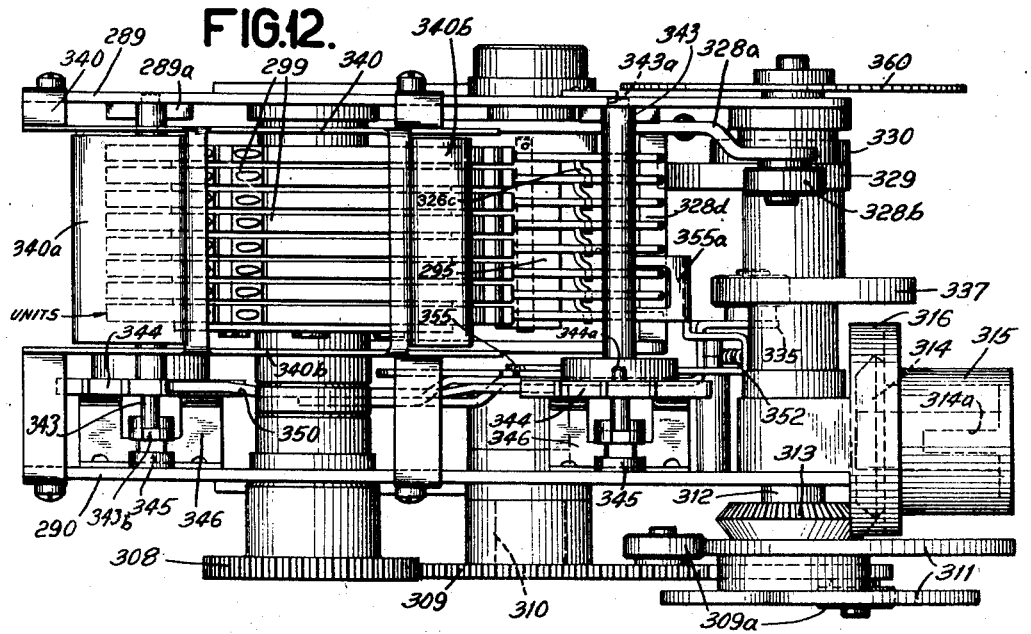
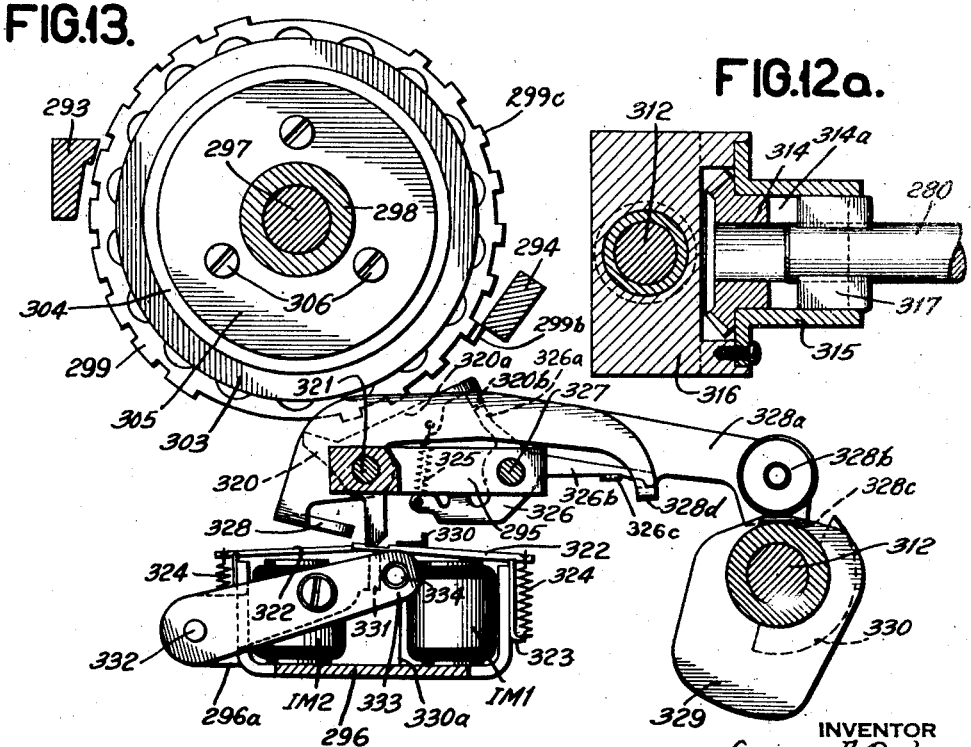
INVENTOR
George F. Daly
BY
ATTORNEY Sept. 7, 1948. G. F. DALY 2,448,781
RECORD CONTROLLED MACHINE
Filed March 14, 1942 29 Sheets-Sheet 13
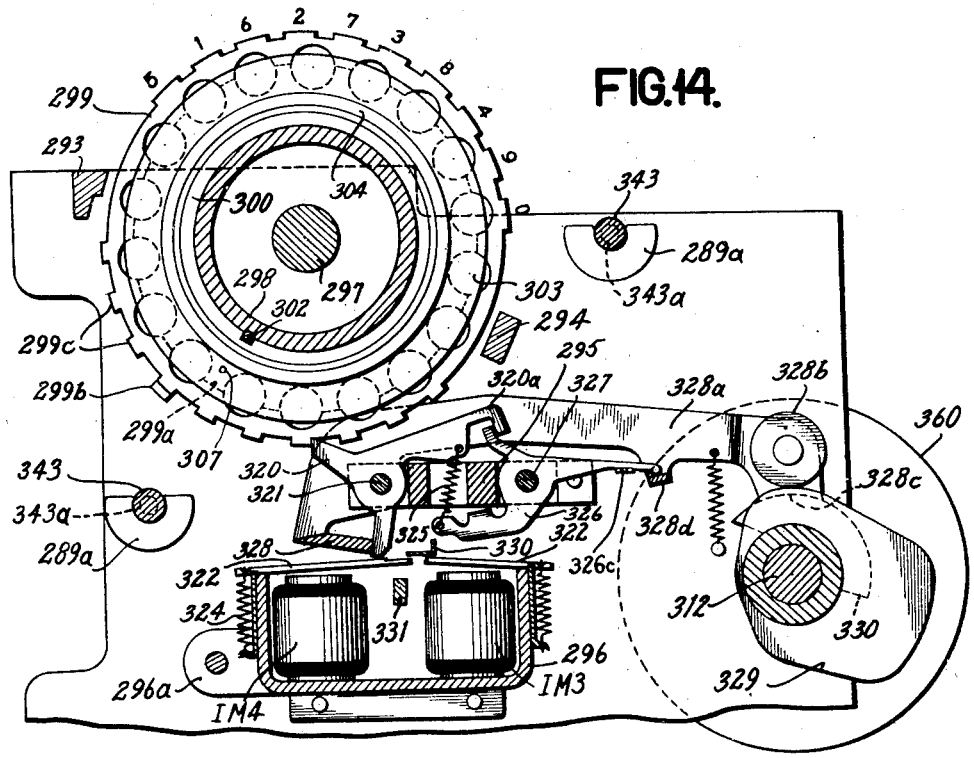
FIG. 14.
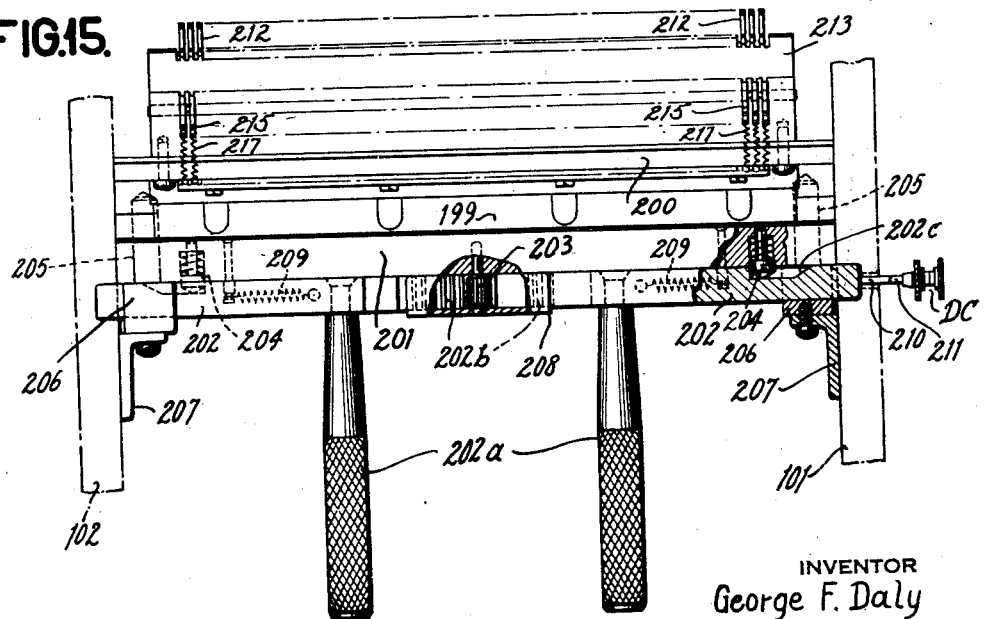
FIG. 15.
INVENTOR
George F. Daly
BY
ATTORNEY

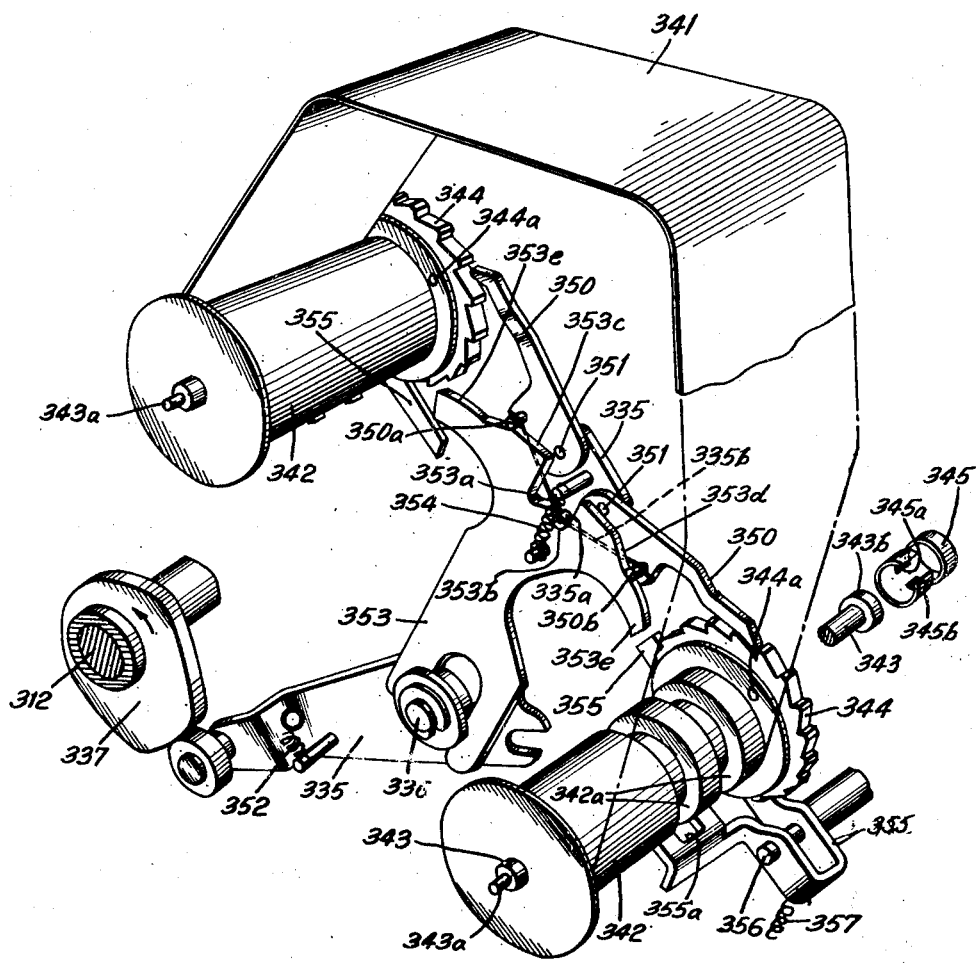

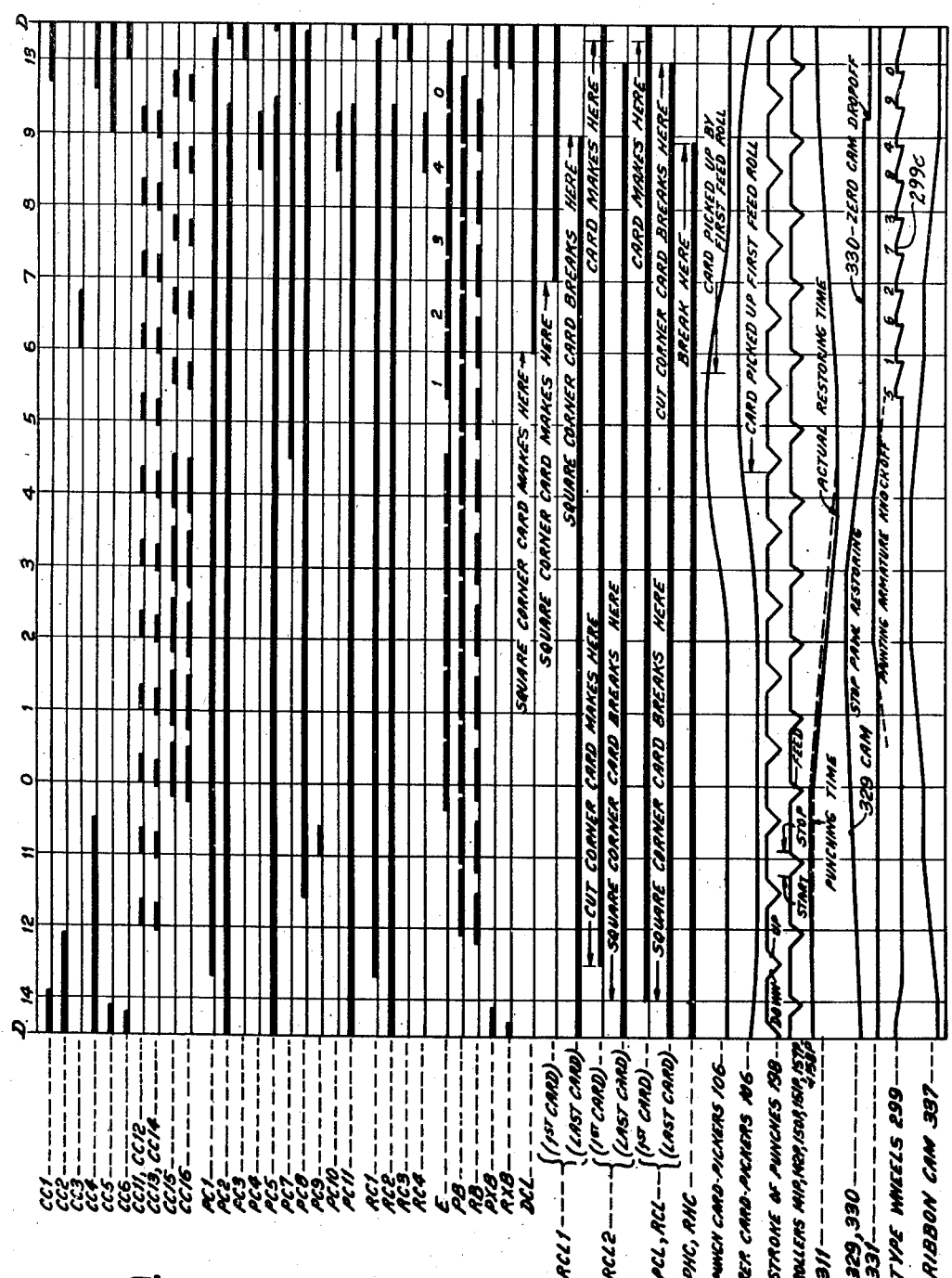

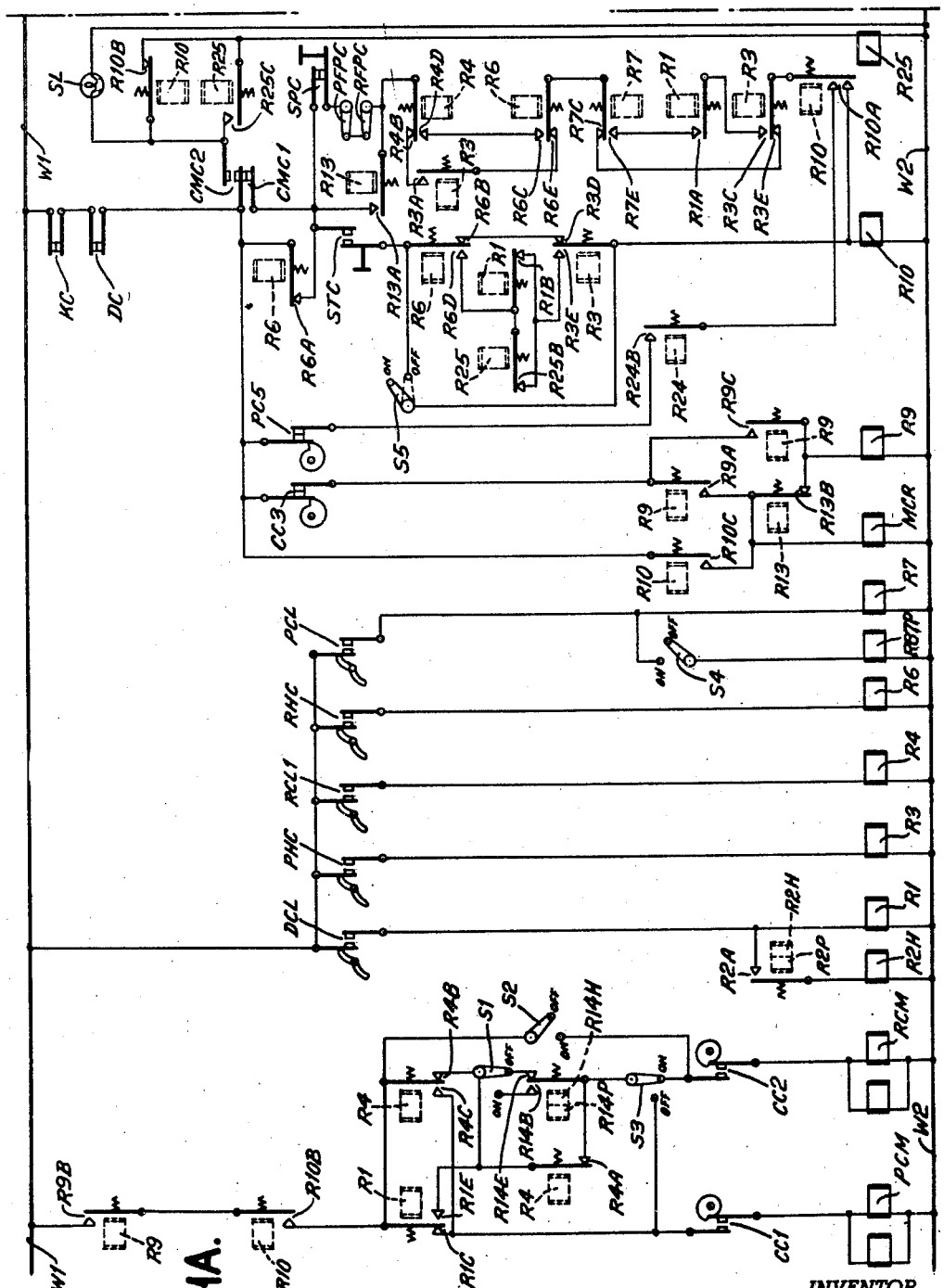

Sept. 7, 1948.

G. F. DALY 2,448,781

RECORD CONTROLLED MACHINE

Filed March 14, 1942

INVENTOR
George F. Daly
BY
ATTORNEY

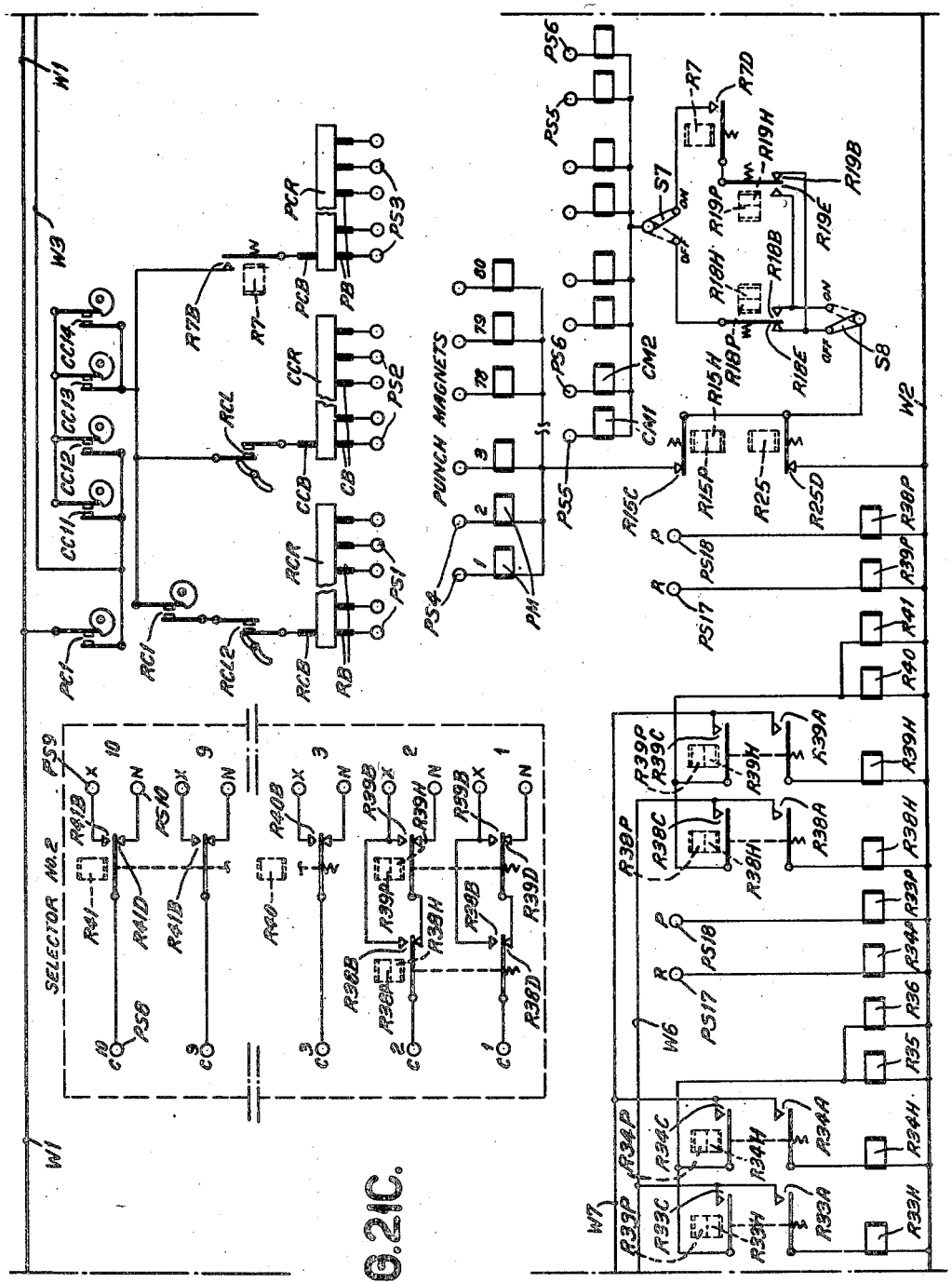

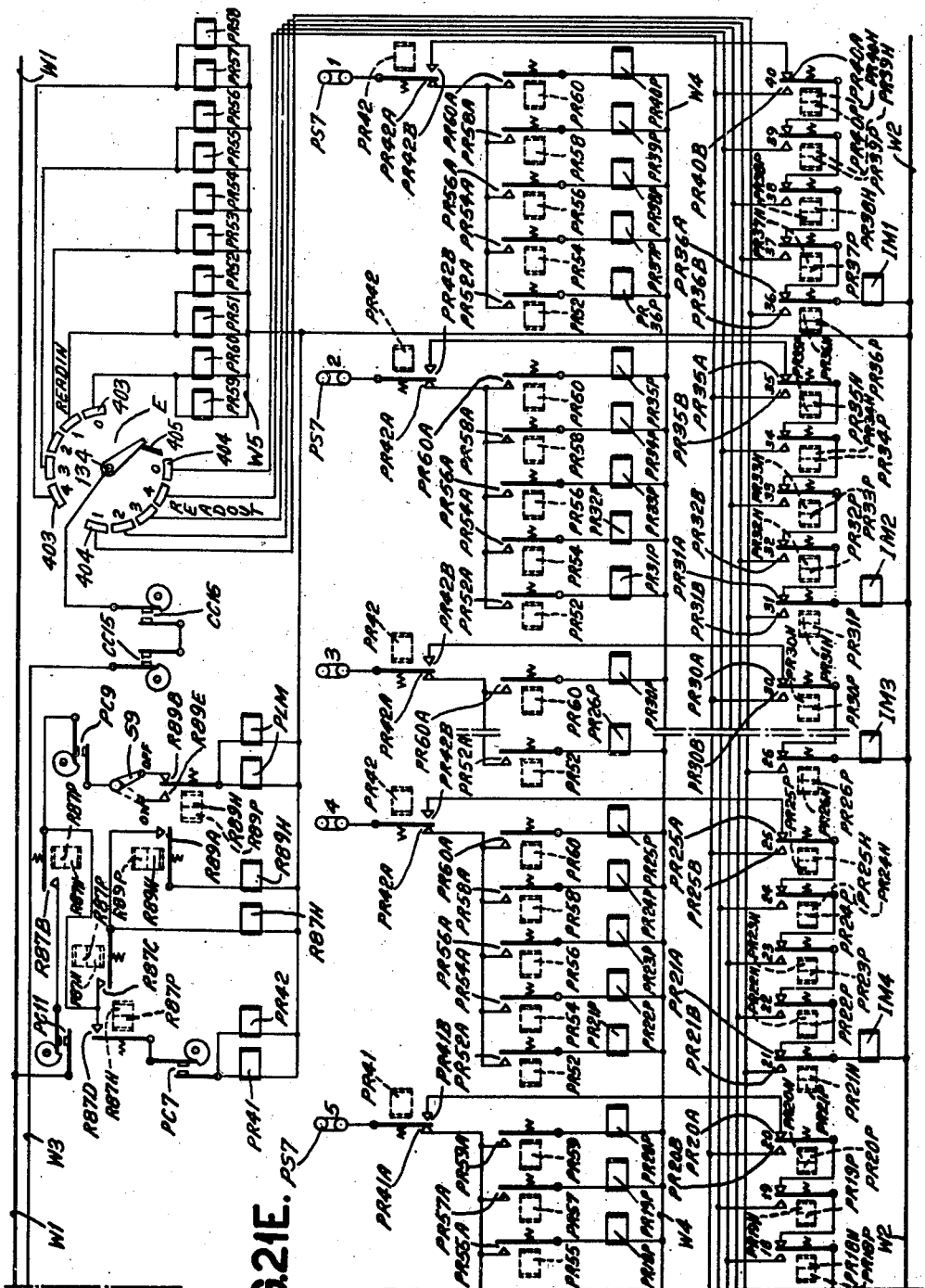

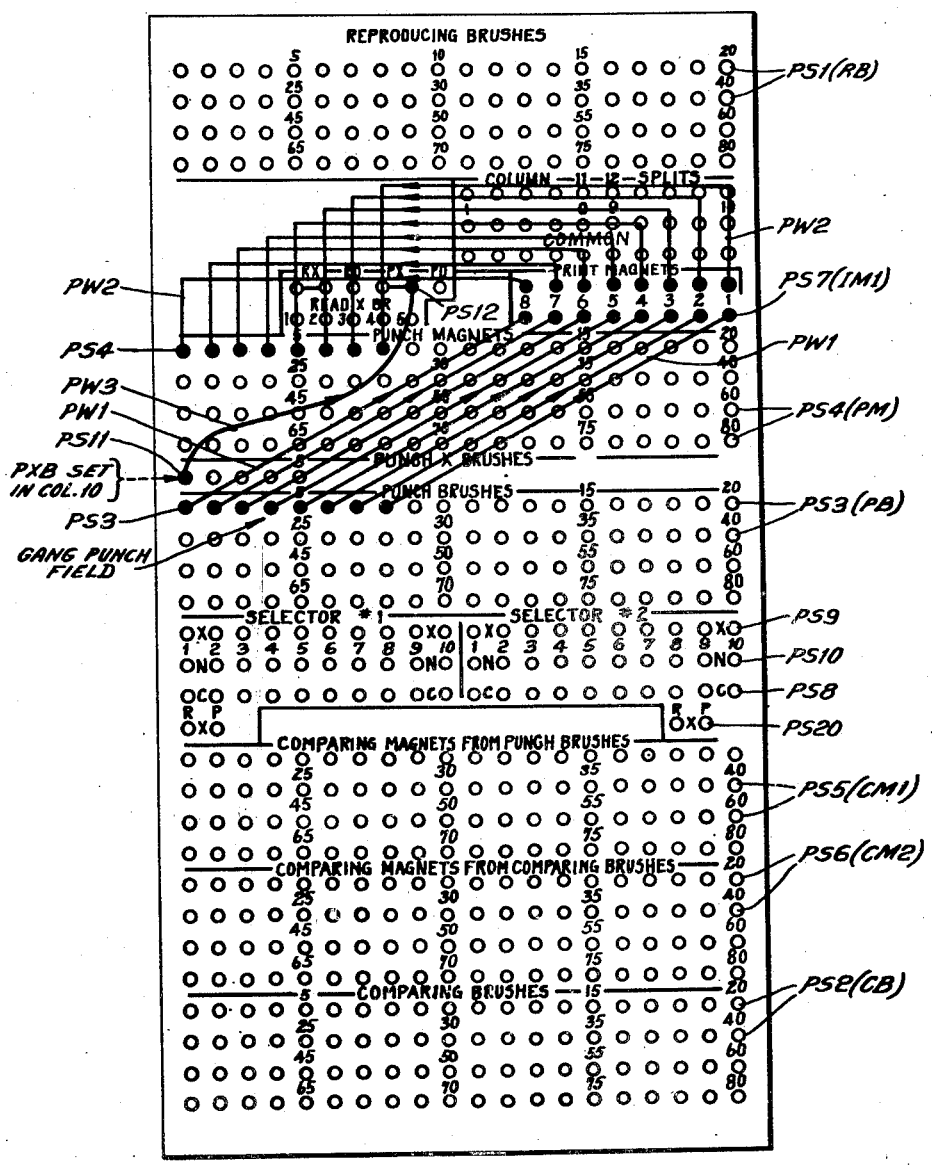

Sept. 7, 1948.　　　　G. F. DALY　　　2,448,781
RECORD CONTROLLED MACHINE
Filed March 14, 1942　　　　　　　29 Sheets-Sheet 22

REPRODUCING WITH INTERPRETING
NO MASTER CARDS
NUMBER PUNCHED IN COLS. 1 TO 8
NO COMPARING
SWITCHES S3, S4, S5, S7 - "ON"

INVENTOR
George F. Daly
BY
ATTORNEY

Sept. 7, 1948.  G. F. DALY  2,448,781
RECORD CONTROLLED MACHINE
Filed March 14, 1942  29 Sheets-Sheet 23

REPRODUCING AND GANG PUNCHING WITH INTERPRETING OF REPRODUCED FIELD
MASTER CARDS IN PUNCH HOPPER
SWITCHES S3, S4, S5, S7 — "ON"
MASTER CARDS PUNCHED "X" — COL. 80

INVENTOR
George F. Daly
BY
ATTORNEY

Sept. 7, 1948.   G. F. DALY   2,448,781
RECORD CONTROLLED MACHINE
Filed March 14, 1942   29 Sheets-Sheet 24

REPRODUCING AND GANG PUNCHING WITH
INTERPRETING OF GANG PUNCHED FIELD

MASTER CARDS IN READING HOPPER
SWITCHES S3, S4, S5, S7, — "ON"
MASTER CARDS PUNCHED "X" — COL. 15

INVENTOR
George F. Daly
BY
W. M. Wilson
ATTORNEY

Sept. 7, 1948.  G. F. DALY  2,448,781
RECORD CONTROLLED MACHINE
Filed March 14, 1942  29 Sheets-Sheet 25

GANG PUNCHING WITH INTERPRETING AND SUPPRESSING X-PUNCHING

NO COMPARING
SWITCHES S3, S4, S5, S7 — "OFF"
MASTER CARDS PUNCHED "X" COL. 8

INVENTOR
George F. Daly
BY
ATTORNEY

Sept. 7, 1948.    G. F. DALY    2,448,781
RECORD CONTROLLED MACHINE
Filed March 14, 1942    29 Sheets-Sheet 26

INVENTOR
George F. Daly
BY
ATTORNEY

REPRODUCING WITH CLASS SELECTION AND INTERPRETING

CERTAIN REPRODUCING CARDS PUNCHED "X" IN COL.1
SWITCHES S3, S4, S5, S7 — "ON"

Sept. 7, 1948.　　　　　G. F. DALY　　　　　2,448,781
RECORD CONTROLLED MACHINE
Filed March 14, 1942　　　　　　　　　　　　29 Sheets-Sheet 28

X TRANSFER
REPRODUCING — SOLID LINE
GANG PUNCHING — DOTTED LINE
INTERPRETING AND PUNCHING —
　　DOT & DASH

INVENTOR
George F. Daly
BY
ATTORNEY

Sept. 7, 1948.  G. F. DALY  2,448,781
RECORD CONTROLLED MACHINE
Filed March 14, 1942  29 Sheets-Sheet 29

Patented Sept. 7, 1948

2,448,781

UNITED STATES PATENT OFFICE 2,448,781

RECORD CONTROLLED MACHINE

George F. Daly, Endicott, N. Y., assignor to International Business Machines Corporation, New York, N. Y., a corporation of New York Application March 14, 1942, Serial No. 434,773

18 Claims. (Cl. 101—93)

This invention relates to record controlled machines.

An object of the present invention is to provide an improved record controlled reproducing machine, commonly known in the art as a reproducer. In this type of machine provision is made for duplicating in whole or in part, records in the form of cards under control of data designations which may take the form of perforations placed in the cards to be reproduced. In one form which this machine may take in practice, provision is made for an operation known as gang punching in which a plurality of detail cards are punched with common data under control of a single master card.

An object of the present invention is to provide such a machine with mechanism for printing upon a card data which is represented in either the same card or another card by data designations such as perforations.

An object is to provide a machine of the type described with novel printing mechanism which is flexible in respect to the control by the designations in the records.

An object of the present invention is to provide an improved record controlled printing mechanism.

An object is to provide a record controlled printing mechanism capable of printing upon records large reproductions of the data designated in records.

An object is to provide a novel means for controlling printing mechanism.

In the application of perforated records, such as the well known record cards used in the Hollerith system of recording accounting and statistical data, it is quite common to use the cards as vouchers for various purposes to record data at the source. For example, the perforated cards employed in this system are commonly used as time cards and job cards and for a time may be in the possession of persons who record original data therein, such as workmen who may record by means of a pencil particulars as to jobs and manufacturing operations. In the use of these cards it is quite common to place them endwise in suitable pockets, or, in some other way to temporarily retain them in racks, clips, or other devices until wanted. For example, time cards are commonly placed in the card racks of the time recorder and for this purpose it is desirable to have certain information such as the employee's number, clearly visible along one end of the card so that it is an easy matter to identify any desired card and select it from the others.

Many other cases occur where the cards must be kept plainly in sight and easily selectable or identified at a distance according to a number on the card. An example is in production planning where the cards which denote work in progress and other things are often placed in racks so that the significant data, such as a job, operation, part, or lot number is clearly visible so that the card may be quickly located when necessary. Usually the cards have the desired number stamped or written on the card in pencil or in ink so that when the card is put in its receptacle the number will be clearly visible along the short edge of the card or may be clearly read when the cards are riffled with the fingers.

One of the principal objects of the present invention is to provide a record controlled printing mechanism which is capable of printing large identifying numbers in a row parallel with one of the shorter edges of the card and adjacent the shorter edge in order that the identified number may be clearly visible and conspicuous when the cards are placed endwise in suitable pockets or receptacles.

Means are known for printing upon cards the data which is recorded in the cards by means of designations. Such machines have been called interpreters and usually take the form of a printing mechanism which prints the numbers or letters represented by perforations in the card at the head of the card columns so that the printed characters appear along the longer edge of the card.

On account of the large number of columns in record cards of this type and the very close spacing of the columns, the numbers are usually too small to be readily visible at any great distance. It is not convenient to use printed numbers of this type as a means of readily picking out the cards at locations, such as time recorders, where the cards must be displayed in large numbers at a distance from the eye too great for easy reading of the desired numbers.

Another disadvantage of using cards which have been printed in the manner just mentioned, is that usually all of the data on the card is printed and the desired numbers are visually difficult to segregate from other numbers. Also parts of the identifying numbers may be recorded in separate columns making it necessary to read the whole line of print to select the parts which are pertinent.

With the printing mechanism disclosed hereinafter it is possible to print a number which is composed of digits recorded in a plurality of different columns in the record card. Thus a group of coded classifications amounting to only one or two digits designated in scattered columns on the card may be printed in one row either as one composite number or separated by spaces as desired.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevation of the machine.

Fig. 2 is a rear elevation of the machine.

Fig. 3A is a vertical section of the reading side of the machine which receives the reproducing cards.

Fig. 3C is a detail perspective view of the reading card lever contacts.

Fig. 4B is a plan view of the mechanism shown in Fig. 3B.

Fig. 5A is a vertical section of the typewheel assembly.

Fig. 6 is a large scale detail view of certain of the main driving gears.

Fig. 7 is a detail view in vertical section showing the punching mechanism in operated position.

Fig. 8 is a transverse vertical section on the line 8—8 in Fig. 3B.

Fig. 9 is a vertical section on the line 9—9 in Fig. 6.

Fig. 10 is a front elevation of the printing mechanism.

Fig. 12 is a plan view of the printing mechanism.

Fig. 12A is a large scale detail view of the sliding driving connection to the printing mechanism.

Fig. 13 is a view showing certain parts of the printing mechanism in the normal position.

Fig. 14 is a similar view showing parts of the printing mechanism in operated position.

Fig. 15 is a large scale view in elevation of the punching mechanism.

Fig. 16 is a perspective view of the ribbon feeding and reversing mechanism.

Fig. 17 is a view of the left hand portion of a card.

Fig. 18 is a detail perspective view of the punch hopper contacts.

Fig. 19 is a detail perspective view of the knock-off bar contacts.

Fig. 20 is an electrical and mechanical timing chart.

Figure 3B:
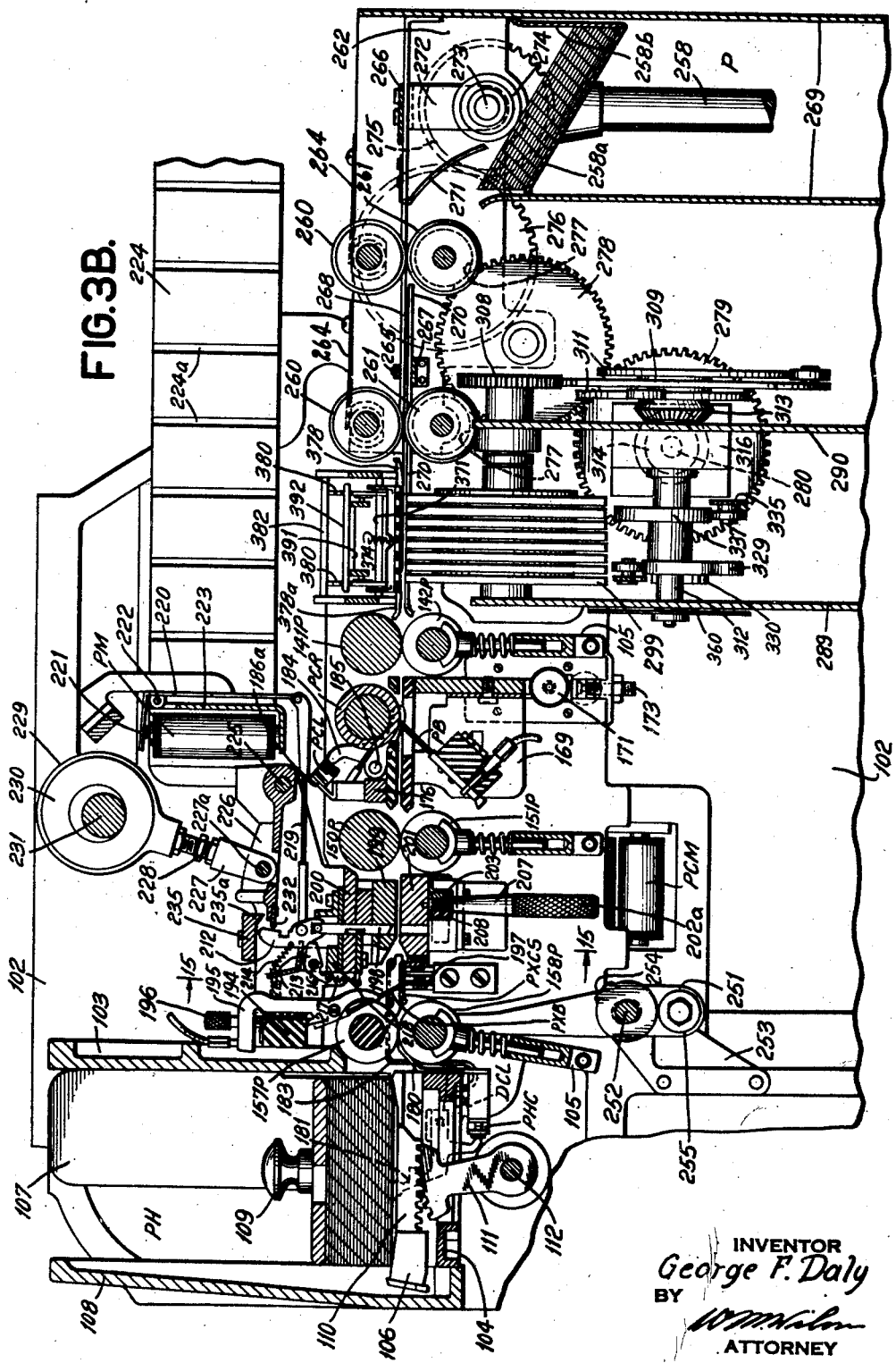
Fig. 3B is a similar view of the punch side of the machine on which cards are reproduced or gang punched.

Figs. 21A to 21E together comprise the wiring diagram.

Figs. 22A to 22I consist of plugboard charts illustrating how the machine is plugged for various types of operations.

As a convenience in understanding the invention described herein and the description of its operation with respect to the wiring diagram, certain convenient ways have been followed in respect to the designations of the various controlling instrumentalities of the machine such as magnets, contacts, and other parts of the electrical circuits. So far as possible the various electrical elements and certain other parts of the machine have been designated with letters which have been derived from the initials of the words comprising the name of the part. For example, the hoppers in which the record cards are placed have been designated PH and RH, which refer to the punch hopper and the reading hopper, respectively. All relays have been designated with the letter R followed by a number and the contacts of the relays have been designated with the number of the relay followed by the letters A, B, C, etc. For example, R18P designates a relay and the letters R18A, R18B, etc., designate its contacts. In order to avoid a maze of wires in the wiring diagram the contact points of the relays in most cases are separated from each other in the wiring diagram in the most convenient locations, and where the contacts appear alone, the corresponding coil has been shown in dotted lines. In the present case, a number of relays are provided with two coils which are designated with the letters P and H after the number of the relay which signify the initially energized coil, often called a pick-up coil, and the holding coil respectively. For example, R14P designates the coil which is first energized, that is, picked up, in consequence of a pulse of current from a source, while the R14H designates the coil which is subsequently energized to maintain the relay in an energized condition. The controlling magnets, contacts, plug wires, line and bus wires, and other parts are designated according to the plan mentioned above. Thus, PM designates a punch magnet, CC1 designates continually operating cam contacts; W1, W2, etc., bus wires, and PW1, PW2, etc. plug wires. This terminology will make the wiring diagram as nearly self-explanatory as possible and will facilitate the tracing of circuits with reference to the plugboard diagrams.

The machine includes a base 100 (Figs. 1, 2, 4A, 4B, and 5) on which is mounted parallel front and rear frames 101, 102, respectively, which are secured together in spaced parallel relationship by means of cross frames 103, forming the side walls of the punch and reading hoppers PH and RH, respectively, and by other frames 104 which form the hopper bottoms. The frames 101, 102 are also joined together by a number of cross bars 105 which also act as guides for pressure shoes for certain feed rollers as will be made clear hereinafter.

The machine is provided with two hoppers of which the hopper RH (Figs. 1 to 4B) receives the cards which are to be reproduced and may be called the reading hopper, while the other hopper PH receives the cards to be punched and may be called the punch hopper. As will be noted hereinafter the letters P and H, occurring in the reference numerals or designations of any part, identify the side of the machine with which the part is most intimately associated.

The hoppers are each provided with a pair of card pickers 106 (Figs. 3A, 3B, 4A, and 4B) which oscillate toward and away from the lower edges of the hopper side frames 103, that is to right and left with reference to Figs. 3A and 3B. Each hopper has a pair of side guides 107 which extend vertically and hold the ends of the cards placed in the hoppers in alignment vertically. Each hopper includes a pair of posts 108 secured to frames 104 which posts guide the left hand edges, Figs. 3A and 3B, of the cards in the hoppers. The hoppers are also provided with follower weights 109 of well known construction which are placed on top of the cards in the hoppers to keep them flat as far as possible.

The pickers include slides 110 which are guided in suitable ways in the hopper bottom frames 104 and mesh with gear sectors 111 secured to shafts 112 journaled in the frames 101, 102. These pickers are oscillated by means which will be made clear hereinafter in describing the driving connections of the machine.

The machine is driven by a suitable driving motor (not shown) mounted on the right hand end of the base 100 with reference to Fig. 1. The driving pulley of the motor is connected by a belt 116 (Figs. 2, 4B, and 8) to a main drive pulley 117 on a main drive shaft 118. This drive shaft is rotatable in a gear casing 119 which contains the bulk of the driving gears for the feed rollers and the punch mechanism on the punch side of the machine. The gear casing 119 is secured to the back of the rear frame 102.

Secured to the main drive shaft 118 is a gear 120 (Figs. 2, 4B, 6, and 8) which meshes with gear 121 fixed to shaft 122 which extends outside of the gear casing 119 and has secured to it a pinion 123 meshing with a large gear 124 loose on a shaft 125. Also secured to the gear 124 and loose on shaft 125 is a gear 126 which meshes with a large gear 127 on a stud 128. A large gear 129 meshes with gear 127 and is rotatably mounted on a stud 130. The gear 129 drives a smaller gear 131 loose on a cam shaft 132 rotatably supported in the frame. The gear 131 drives a gear 133 on a shaft 134 which is rotatably mounted in the frames 101, 102. The train of gearing comprising the gears 120, 121, 123, 124, 126, 127, 129, 131, and 133 rotate continually while the machine is in operation. Mounted on the shaft 134 are cams 135, which operate timing contacts which are designated CC1 and CC16 in Figs. 20 and 21A to 21E.

The shaft 125 may be driven by the gear 124 through the punch clutch mechanism which includes a one-revolution clutch generally designated 136 in Figs. 2, 4B, and 9 of well known form which is controlled by the punch clutch magnet PCM (Fig. 2) secured to the rear face of frame 102 (Fig. 2). When the magnet PCM is energized the one-revolution clutch 136 is engaged and couples gear 124 to the shaft 125. This shaft carries a gear 137 which meshes with a larger gear 138 loose on the stud 128. The gear 138 meshes with a gear 139 fixed on a shaft 140 rotatably supported in the framework. The shaft 140 is part of a feed roller assembly 141R (Fig. 3A) which is journaled in the frame plates 101, 102 and cooperates with a feed roller 142R. Also secured to the shaft 140 is a gear 143 meshing with a gear 144 secured to a cam shaft 145. This shaft is rotatably mounted in the rear frame plate 102 and a support frame 146 secured to the rear frame plate.

Secured to the shaft 145 is a series of cams 147 (Figs. 2 and 4A) operating contacts designated PC1 to PC5, respectively, in Figs. 21A to 21E. These contacts are insulatably mounted on the frame 146. The gear 144 meshes with a gear 148 which is secured to a shaft 149 (Fig. 2) which is part of a feed roller 150R (Fig. 3A) rotatably mounted in the frame plates 101, 102. The feed roller 150R has a cooperating feed roller 151R and the pairs of feed rollers 141R, 142R and 150R, 151R are similar in construction. These pairs of feed rollers are interconnected by small gears 152 (Figs. 2 and 4A) whereby the feed rollers are rotated through the train of gearing just described whenever the punch clutch is engaged by energizing the magnet PCM.

Figure 4A:
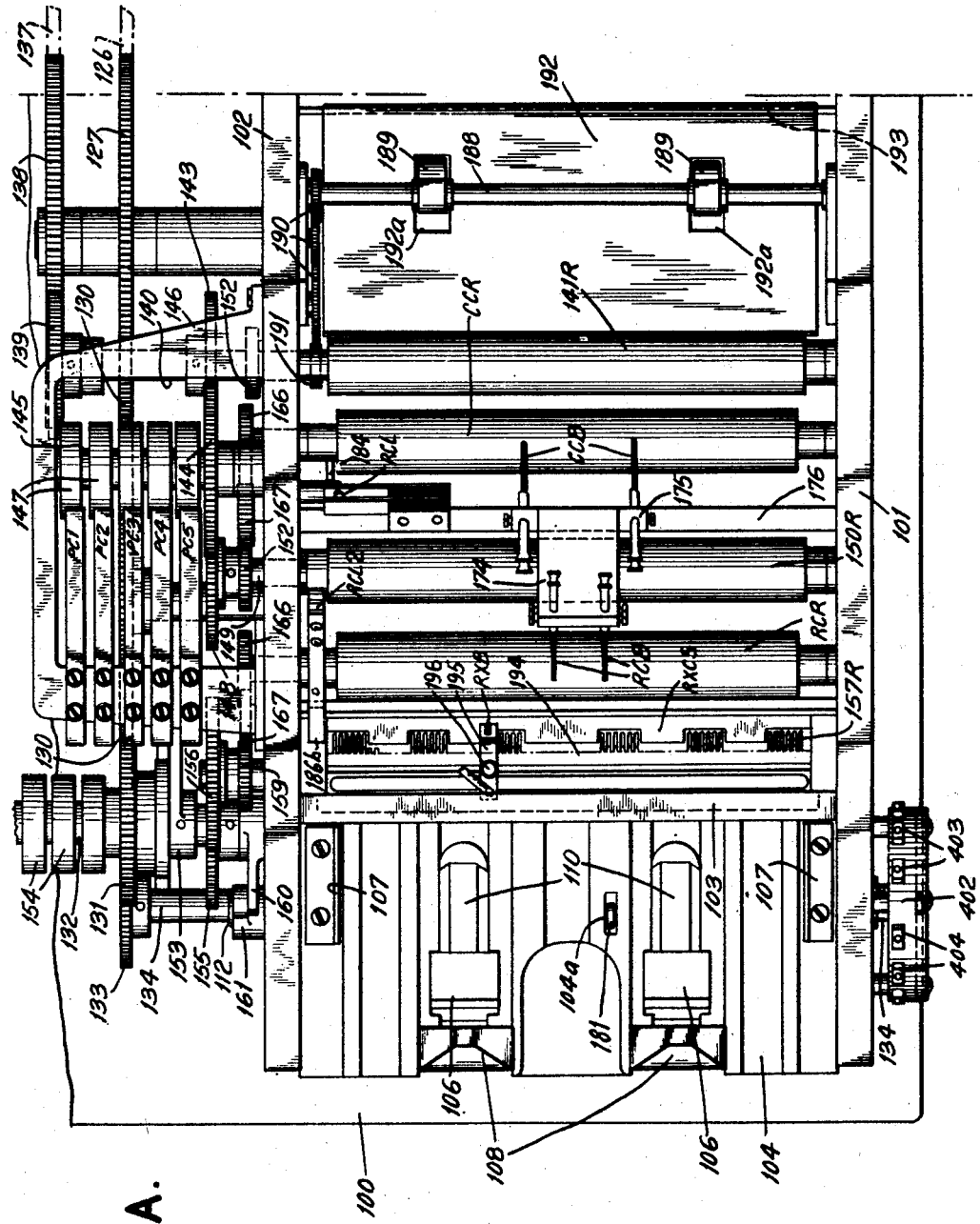
Fig. 4A is a plan view of the mechanism shown in Fig. 3A.

The gear 131 on cam shaft 132 also may be coupled to the shaft 132 through a one-revolution clutch generally designated 153 in Figs. 2 and 4A which is controlled by a reading clutch magnet RCM (Fig. 2). Secured to the shaft 132 is a series of cams 154 (see Fig. 4A also) which actuate contacts designated RC1 to RC4 in Figs. 20 and 21A to 21E and insulatably mounted on the frame of the machine. Also secured to the shaft 132 is a gear 155 of the same diameter as a gear 131 (Figs. 2 and 4A) which meshes with a gear 156 secured to a feed roller shaft 157R (see Fig. 3A also) rotatably mounted in the frame plates 101, 102. Cooperating with the feed roller 157R is a feed roller 158R and gears 159 (Figs. 2 and 4A), similar to the gears 152, are provided to couple the feed rollers 157R, 158R together.

It will be clear from the foregoing description that, when both the punch clutch magnet PCM and the reading clutch magnet RCM are energized, the pairs of feed rollers 141R, 142R, 150R, 151R; and 157R, 158R will be rotated to advance a card from the reading hopper RH to the right (Figs. 3A and 4A).

The shaft 132 carries an eccentric strap 160 (Fig. 4A) connected to an arm 161 secured to the picker operating shaft 112 associated with the reading hopper RH. Thus, when the feed rollers 157R, 158R are operative, the picker 106 for the reading hopper RH also will be reciprocated, but the clutch 153 provides a means by which the feeding of cards from the hopper RH may be stopped when necessary. The reason for this construction will be more clearly explained hereinafter with reference to plugboard diagrams to illustrate various operations of the machine.

The lower feed rollers 142R, 151R, 158R are mounted on arms 162 (Fig. 1) which are pivotally mounted in recesses formed in the frame plates 101, 102 and are spring-pressed upwardly by pressure shoes 163 (Fig. 3A) on the upper ends of plungers 164 slidably mounted in vertical holes in the cross bars 105 and urged upwardly by means of coil springs 165.

Located between the three pairs of feed rollers associated with the reading hopper RH (Figs. 1, 3A, and 4A) are two record sensing stations which include reading contact roller RCR and comparing contact roller CCR which are rotatably mounted in the frames 101, 102. These contact rollers are provided with gears 166 meshing with idler gears 167 carried by studs on the frame 102. The idler for the contact roller RCR meshes with upper gear 159, while the idler gear 167 for the contact roller CCR meshes with the upper gear 152 secured to the shaft 149 whereby both contact rollers are rotated at approximately the same rate and in the same direction as the upper feed rollers 141R, 150R, 157R.

Cooperating with the contact rollers RCR and CCR, (Figs. 1 and 3A) are the reading brushes RB and the comparing brushes CB, respectively, which are mounted in brush carrying bars 168 secured in frames 169 slidably mounted in guides 170 carried by the frames 101, 102. The frames 169 are provided with spring pressed plungers 171, which may be seen in Fig. 8, cooperating with holes in blocks 172 adjustably slidably mounted for vertical movement in the frames 101, 102. These blocks have T-slots milled horizontally and transversely of their lower ends to rotatably receive the grooved ends of screw studs 173 whereby the frames 169 may be adjusted vertically, yet may be readily removed without disturbing the adjustment, it being merely necessary to pull the plungers 171 inwardly toward the center of the machine (Fig. 8) to permit dropping the brush frames with their brushes.

Cooperating with the contact rollers RCR, CCR are two sets of common contact roller brushes RCB, CCB, respectively (Figs. 3A and 4A), which are carried by a metallic bracket 174 in the case of brushes RCB and by a metallic short bar 175 in the case of the brushes CCB. The bracket and bar are suitably insulated from each other and from a support bar 176 secured to the frame plates 101, 102.

The punch side of the machine is similarly provided with feed rollers, contact rollers and brushes disposed in the same relative positions, the punch brushes PB and the punch contact roller PCR being located on the punch side of the machine in the same relative position with respect to the punch hopper PH as the brushes CB and contact roller CCR (Fig. 3A) are located relative to hopper RH. However, the corresponding pairs of feed rollers are designated 141P, 142P; 150P, 151P; 157P, 158P (Figs. 1, 3B, and 4B). Instead of having a contact roller and a set of brushes between the pairs of feed rollers 150P, 151P and 157P, 158P, there is provided a row of punches and a punch die. The punches have approximately the same relative positions with respect to hopper PH as the brushes RB in Fig. 3A have with respect to the punch hopper PH. However, the feed rollers on the punch side of the machine just mentioned are operated intermittently instead of continuously.

Associated with the reading mechanism shown in Figs. 3A and 4A is a series of circuit controlling contacts which indicate the presence or absence of record cards in the various sensing stations and the hoppers respectively. There is a similar set of these contacts on the punch side of the machine in identical locations, therefore, a description of the contacts on the reading side of the machine will be sufficient.

The first set of contacts involved are the reading hopper contacts RHC (Figs. 3A and 18). These contacts are secured to a plate 180 which has bent-over card guide portions 180a projecting upwardly toward the plane of a card fed from the reading hopper RH. The contacts RHC are operated by a lever 181 pivoted at 182 on a projecting portion of the hopper bottom frame 104. The lever 181 extends upwardly through a slot 104A in the frame 104 (Fig. 4A) whereby, when cards are placed in the hopper, they will rest upon the lever 181 and close the contacts RHC.

The next set of control contacts are the reading card lever contacts designated RCL1, which are insulatably mounted on the underside of the hopper bottom frame 104 as shown in Fig. 3A. These contacts are operated by an extension 183a (Fig. 3C) of a bail 183 which is mounted on pivots 183b carried by a block 183c secured to the rear frame 102 between the feed roller 157R and the contact roller RCR. This bail 183 is provided with a runner 183d designed to be engaged by the cards and lifted so as to rock the bail 183 and the extension 183a counterclockwise (Fig. 3C) to close the contacts RCL1.

When a card is about to pass under the contact roller RCR, its leading edge engages a lever 184 pivotally mounted at 185 on a block 186a on a cross frame 186 and rocks said lever counterclockwise in Fig. 3A. This movement closes a pair of contacts RCL2 which are insulatably mounted on a bracket 186b attached to block 186a. The timing of the card lever contacts is such that contacts RCL2 close after the brushes RB have barely moved over upon the top of the card along the reading edge. A similar card lever 184 is provided adjacent the contact roller CCR and, under similar conditions operates a pair of contacts RCL mounted on a bracket 186c carried by bar 176. On the punch side of the machine there is provided the punch hopper contacts PHC, die card lever contacts DCL, and contacts PCL which correspond to the contacts RHC, RCL1, and RCL, respectively, on the reading side of the machine.

The reading side of the machine is provided with a card receiving pocket RP having the usual vertically moving card supporting platform 187 of well known form. Associated with this pocket is a stacking mechanism most clearly shown in Figs. 3A and 4A. Secured to a shaft 188 are two stacker blocks 189 which it is preferred to form of a resilient material like rubber. The shaft 188 is connected by a train of gears 190 to a small gear 191 secured to the lower feed roller shaft 142R whereby the stacker blocks 189 are rotated in the opposite direction to the feed roller 142R. Above the pocket RP there is provided a deflector plate 192 having slots 192a to accommodate the stacker blocks 189. A card fed horizontally by the feed rollers 141R, 142R strikes the deflector plate 192 and is deflected downwardly and eventually will be gripped by the curved ends of the stacker blocks 189.

The card platform 187 is urged upwardly by means of the usual spring, not shown, which normally tends to press cards accumulated on the platform up against guide blocks 192b (Fig. 3A) secured to the plate 192 bent horizontally to the right in transverse section at a point opposite the shaft 188. As soon as the leading edge of a card fed by the rollers 141R, 142R strikes the top card in the pocket RP the stacker blocks 189 come into action and press the card downwardly on the cards already in the pocket RP and at the same time frictionally carries the card to the right until it strikes the side walls of the pocket. These side walls consist of plates 193 vertically supported between frame plates 101, 102 and mounted on said plates and the base 100 of the machine.

Associated with pocket RP is a miniature lever switch of conventional form and designated RFPC, meaning "reproducer full pocket contacts." This switch is of the spring lever type which has only one normal position of the lever and is spring urged back to that position when released. Normally the lever projects upwardly but is in the path of the card supporting plate whereby, when the pocket PR becomes full, the switch RFPC will be opened to control circuits which stop the machine, as will be made clear hereinafter.

Associated with the feed rollers 157P, 158P and 157R, 158R are the X-brushes which sense the so called X-holes in advance of the passage of the cards from the hoppers PH and RH past the punches and the brushes RB, respectively, as will be seen hereinafter. These X-holes exercise certain special control functions which determine how punching and printing is to be controlled. Secured to the right-hand faces of the hopper side plate 103 (Figs. 3A, 3B, 4A, and 4B) are the bars 194 which are slotted vertically on the right-hand faces of the bars with as many slots as there are brushes or punches. In the present case a machine designed to handle the so called 80-column cards, having rectangular perforations, has been disclosed, consequently the bars 194 will be equipped with 80 notches each.

Each bar 194 is provided with a number of brush carriers 195 having an X brush, designated RXB in the case of the reading side of the machine (Figs. 3A and 4A), and PXB in the case of the punch side of the machine (Figs. 3B and 4B). The bars 194 have a rib along their lower right-hand corners which is wedge shaped with the apex of the wedge pointing downwardly and the brush holders 195 have a hook shaped portion which can be engaged with the rib. The brush holders 195 also have a toothed portion which projects into a slot in the bar 194 to hold the brush holder against displacement longitudinally of the bar 194 and also hold the brush holders erect. A thumb screw 196 on each brush holder provides a means for clamping the brush holder to the bar. While the specific number of brush holders is not particularly important, it is assumed for convenience in the present case that five are provided which at will may be set along the bar to correspond with any desired column on a card fed from the hopper.

Brushes RXB (Figs. 3A and 4A) cooperate with a common strip RXCS which are insulatably mounted on the frame 169 for the brushes RB. The brushes PXB (Figs. 3B and 4B) on the punch side of the machine similarly cooperate with a common strip PXCS which is insulatably mounted on the die of the punch mechanism. Since the die is removable as will be explained hereinafter, there is provided a three pronged contact spring or finger 197 secured to the rear frame 103 (Fig. 3B) and the three prongs on the contact spring engage the end of the contact strip PXCS to maintain electrical contact with the external control circuits of the machine when the die is in place. In the case of the strip RXCS, this connection is established by an extra wire in the cable which connects the brushes RB to the plugboard.

The perforating mechanism includes punches 198 (Figs. 3A and 7), which are vertically guided in a stripper plate 199 and a plate 200 and cooperate with a die 201 which is made removable. Slidably mounted on the underside of the die 201 is a pair of bolts 202 (Figs. 3B and 15) having handles 202a which extend downwardly. Each bolt 202 has a rack portion 202b meshing with a pinion 203 pivotally mounted on the underside of the die. The ends of the bolts 202 are received in horizontal slots in the frames 101, 102 to permit the die to be moved horizontally in the direction of card feed for the purpose of adjustment. The pinion 203 and the racks 202b cause the bolts 202 to move in unison when being withdrawn from, or reseated in, the frames 101, 102.

Each bolt 202 has a cam portion 202c engaging a spring pressed plunger 204 when the bolts are fully withdrawn from the slots to force the plungers upwardly and separate the die 201 from the stripper 199. For the purpose of holding the stripper 199 and the die 201 in alignment guide pins 205 are provided which are secured in suitable holes in the die located outside of the path of the card. Since these pins must of necessity fit quite closely to assure perfect alignment of the punches with the die openings, the plungers 204 are desirable to loosen the die when it is desired to remove it since it will have some tendency to stick. The common strip PXCS is attached to the left-hand edge (Fig. 3B) of the die 201 and is insulated from the die by a strip of insulating material.

The bolts 202 are partly guided in blocks 206 to the lower faces of which are attached angular guide pieces 207 which prevent the die from tilting too much on a horizontal axis parallel with the frame plates of the machine when the die is dropped. This helps to prevent jamming of the die when it is being removed or inserted. The inner ends of the bolts 202 are guided by a boxlike member 208 secured to the underside of the die 201 and, with the bottom face of the die 201, surrounding the inner ends of the bolts. Springs 209, attached to pins carried by the bolts 202 and by the die 201, tend to force the bolts 202 toward the frames 101, 102.

Since it is undesirable that the machine be operated without the die, means are provided to prevent starting the machine when the die has been removed and through carelessness has not been replaced. Mounted on the front face of the frame 101 (Figs. 1, 4B, 8 and 15) are contacts designated DC, hereinafter called the die contacts, having a long pin 210 extending through a small hole in the frame 101 opposite the end of the front bolt 202 and normally holding the contacts DC closed when the die is in place. However, if the die is removed, the retraction of the right-hand bolt 202 (Fig. 15) will allow the plunger 210 to move deeper into the hole in frame 101 and permit contacts DC to open. A short stop pin 211 on the contacts DC adjacent the plunger 210 limits the opening movement of the contacts by striking the side of the frame 101.

With the intercoupling of the bolts 202 by means of the pinion 203, it is impossible to leave the die in a partly latched position and still start the machine. For example, it would be impossible to have the right-hand bolt 202 fully in its socket with the left-hand bolt bearing against the inside of the frame 102, since the left-hand bolt through the pinion 203, would keep the right-hand bolt retracted, permitting the contacts DC to open. Thus, the die must not only be in place, but it must be fully latched before the machine can be started as will be made clear hereinafter.

Pivotally mounted on the upper end of each punch 198 (Figs. 3B and 7) is a punch operating hook 212 which is urged in a counterclockwise direction (Fig. 3B) by a spring 214 anchored to a spring anchoring bar 213. This spring anchoring bar is slotted to guide the operating hooks 212, but movement of the hooks in a counterclockwise direction is limited by stop dogs 215 which are in alignment with the slots in the bar 213 and the hooks 212 and the latter normally rest against the ends of the dogs 215. The dogs 215 are pivoted on a wire 216 and are actuated by springs 219, each dog having a stop portion bearing against the left-hand side of bar 218 which is mounted on the plate 200 and supports both the spring anchoring and hook guide bar 213 and the wire 216.

Each punch is connected by a link 219 (Fig. 3B) to an arm 220 forming part of an armature 221 pivoted at 222 to a frame 223. The latter supports the armatures 221 and the magnet coils PM each of which is associated with one of the armatures 221. The cross pieces are supported in grooves 224a formed in a punch supporting frame 224. This frame also supports the stripper plate 199, guide plate 200, and the bars 213, 218. This punch support frame is adjustably slidable horizontally between the frames 101, 102 for the purpose of adjusting the punches.

Pivoted on a cross shaft 225 (Figs. 3B, 4B, 5, 7 and 8) is a punch operating frame 226 to which is pivotally connected, by means of pins 227a, a pair of sockets 227 receiving one of the threaded ends of the double ended studs having right and left-hand threads, respectively, the other ends of which are threaded into members 229 which act as housings for roller bearings 230. The inner part of the roller bearings 230 are mounted on an eccentric portion of a shaft 231. The studs 228 are provided with lock nuts and a hexagonal portion at the center to enable the angularity of the frame 226 to be adjusted relative to the horizontal.

Secured to the left-hand edge of the frame 226 is a punch operating bar 232. The shaft 231 is mounted in bearings 234 (Figs. 4B, 5, and 8) carried by the frames 101, 102. Extending parallel with the punch operating bar 232 and the row of punch hooks 212 is a knock-off bar 235.

There is a punch 198, an operating hook 212, and a punch magnet PM associated with each column on the card, which in the present case will require that the machine be equipped with 80 punches and their associated magnets and other parts. The shaft 231 is provided with a gear 236 (Figs. 2, 4B, 5, 6, and 8) meshing with a gear 237 fixed on the main drive shaft 118. Thus shaft 231 vibrates the frame 226 continuously while the motor is running.

When a magnet PM is energized, its armature 221 (Fig. 3B) will rock the arm 220 counterclockwise and draw the link 219 to the right. This rocks the punch operating hook 212 in a clockwise direction allowing it to hook over the left-hand edge of the bar 232 on its downward stroke. This pushes the punch downwardly through a card between the stripper 199 and the die 201. Upon the return stroke of the frame 226 and deenergization of the magnet PM, the spring 214 will draw the hook 212 back to the position of Fig. 3B. In the event that the armature 221 should stick to the poles of the magnet PM, the upper rounded end of the hook 212 will engage a rib 235a formed in the knock-off bar 235 and will be cammed in a counterclockwise direction to force the hook 212 out of engagement with the bar 232, the rib 235a being formed as a cam surface for this purpose.

The dogs 215 are provided to prevent breakage of the punches. Formerly the movement of the punch operating hooks 212 was limited by the ends of the slots in the bar 213 and, if a punch hook 212 was only partly hooked on the bar 232, the hook 212 would jam in the slot in the bars 213 and bend its punch 198 sufficiently to break it. The springs 217 yield when a condition like this occurs and allows the dogs 215 to rock slightly clockwise thereby providing a little more clearance space for the hook 212 which may not be properly seated to descend without risk of breaking the punch.

It has been found that if the machine is operated when the knock-off bar 235a is removed, breakage of the punches results and, since these parts are quite expensive to make on account of the precision necessary in their manufacture, means is provided to prevent operation of the machine when the knock-off bar is removed. It is necessary to remove this bar to replace broken punches and other parts and sometimes the serviceman forgets to replace the bar. This means is shown in Figs. 4B, 8, and 19, and includes a pair of knock-off contacts KC mounted on a block 235b attached to the inside face of the frame 101 a little to the right of the shaft 231 (Fig. 4B). These contacts are operated by a lever 235c pivoted at 235d on the frame 101. The lever 235c has one of its arms engaging one of the contacts KC while the other arm extends downwardly and curves around the rib 235a to engage the underside of the bar 235 near its end. This bar is fastened in the machine by means of screws at its ends. The adjustment of the contacts KC is such that as soon as the bar 235 is lifted slightly the contacts KC open and prevent starting the machine as will be made clear hereinafter. The contacts KC and DC operated as described are in the main motor control circuit, or basic running circuit as it will be called, which is necessary to maintain the machine in operation and the opening of this circuit results in stopping the driving motor.

The pairs of feed rollers 141P, 142P; 150P, 151P; and 157P, 158P are driven intermittently one index-point position at a time and the timing is such that the movement of the card is arrested while the punches are passing through the card. In other words, the card is fed one index-point position and stopped to allow time for the punches to perforate, then is advanced to the next index-point position. In the present case the cards are placed in the hopper PH and RH face down with the "12" index-point positions to the left (Figs. 3A and 3B) and all holes of similar value are perforated in a row at the same time, the "12" holes being perforated first and the "9" holes last.

For the purpose of driving the feed rollers an intermittent drive gearing is provided which is most clearly shown in Figs. 4B, 6, and 8. Secured to a shaft 239 is a Geneva driven gear 240 which may be coupled to a gear 241 through a one-revolution clutch 242. Gear 241 is loose on shaft 239. The clutch 242 is controlled by a clutch trip lever 243 pivoted on a stud 244 and operated by a pair of complementary cams 245 (Fig. 9) secured to the shaft 125 which it will be remembered is rotated only when the punch clutch 136 is engaged. The cams 245 are so timed that the lever 243 is rocked out of clutch disengaging position once per card cycle. Therefore, if the shaft 125 does not turn, the lever 243 will be held in a position to hold disengaged the clutch dog of the clutch 242.

The gear 120 which is secured to the shaft 118 is provided with a pin 120a (Figs. 4B, 6, and 8) cooperating with the slots of the Geneva gear 240 and the hub of the gear 120 is formed with a Geneva locking surface 120b which cooperates with locking surfaces 240a in the Geneva gear 240. The gear 120 makes one revolution for each index-point position, that is 14 revolutions per card cycle, whereby the card 241 will be intermittently fed.

Secured to the feed rollers 141P, 150P, 157P are large gears 246, 247, 248 (Figs. 2, 4B, 6, and 8) of which the gears 247, 248 (Fig. 6) mesh directly with the gear 241, while gear 246 meshes with an idler 249 meshing with a gear 247. Gears 250 couple the feed rollers 141P, 150P, 157P to the feed rollers 142P, 151P, 158P. Contact roller PCR is driven by gears 166a, 167a (Figs. 2 and 4B), from the gear 250 on feed roller 150P.

Because of the fact that the feed rollers 157P, 158P rotate intermittently, whereas card pickers 106 of the punch hopper PH operate with a continuous feeding movement, means are provided to separate the feed rollers 157P, 158P while the picker is moving a card to the right in Fig. 3B after which the feed rollers are re-engaged to continue the feeding of the card. This is done to prevent buckling of the card as it strikes the bight of the feed rollers when they are momentarily stationary. Journaled on the feed roller 158P (Fig. 3B) adjacent the inside faces of the frames 102 are downwardly extended links 251 which are slotted to embrace a cross shaft 252 journaled on brackets 253 fixed to plates 101, 102. This shaft is provided with a pair of cams 254 one for each link which cooperate with rollers 255 attached to the lower ends of the links. Thus, as the shaft rotates, the feed rollers 158P will be drawn downwardly to separate it from the feed roller 157P. Secured to the shaft 252 (Fig. 6) is a gear 256 which meshes with a gear 126 secured to the gear 124 which it will be remembered turns continually while the machine is in operation. Thus the feed rollers 157P, 158P are opened once per cycle, even when the punch mechanism is not in use.

The punch side of the machine is provided with a pocket P (Figs. 1 and 3B) which has a vertically moving card platform 258 spring urged upwardly and provided with a platform plate 258a which slants downwardly from left to right. Between this pocket and the feed rollers 141P, 142P are provided two pairs of feed rollers 260, 261 (see Fig. 4A also). The lower feed rollers 261 are rotatably mounted in a side frame plate 262 secured to the frames 101, 102. The upper feed rollers 260 are rotatably mounted in bearings 263 which are vertically slidably mounted in open slots cut in the upper edges of the plates 262. Leaf springs 264 secured to the top edges of the plates 262 are bent downwardly at their free ends to press upon the blocks 263.

The plates 262 are joined together by three cross bars 265, 266, 267 (Fig. 3B). The cross bars 265, 266 support an upper card guide 268 which extends from the right-hand pocket partition plate 269 to a point just to the right of the feed rollers 141P, 142P and is upturned slightly at 268a (Fig. 4A) so that a card fed by the rollers 141P, 142P will be directed under the guide 268. The bar 267 supports a shorter guide 270 similar in shape to the left-hand half of guide 268 and is bent downwardly at its left-hand end so that a card fed by the rollers 141P, 142P will pass between the guides 268, 270 in its progress toward the pocket P. The guide 268 is provided with a large hole 268b (Fig. 4B) through which projects a card deflector 271 best shown in Fig. 3B which is fastened to the top side of the guide 268 adjacent the hole 268b. This deflects cards fed by the right-hand pair of feed rollers 260, 261 downwardly on top of the cards on the plate 258a.

Journaled in the rear plate 262 and in a bracket 272 (Figs. 3B and 4B) secured to the under side of the cross bar 266 is a shaft 273 provided with stacker rollers 274. The springs which operate the card platform 258a lightly press the platform plate 258a and the cards which may have been deposited thereon up against the rollers 274. When a card is discharged from the right-hand feed rollers 260, 261 it is gripped by the rollers 274 and pushed downwardly to the right against the upturned portion 258b of the platform plate 258a or the right-hand side plate 269. This stacker arrangement is necessary because of the relatively slow speed at which punching is effected in order to insure that the cards will be properly stacked.

The rollers 260, 261, the stacker rollers 274, and the printing mechanism are driven by a train of gears from the gear 138. Secured to the shaft 273 is a gear 275 (Figs. 3B and 4B) which meshes with a larger gear 276 secured to the shaft of the right-hand feed roller 261 (Fig. 3B). A smaller gear 277 on the same feed roller 261 meshes with a larger idler gear 278 (Figs. 2, 3B and 4B) and the gear 278 meshes with another small gear 277 on the left-hand feed roller 261 (Figs. 3A and 3B) or the right-hand one (Fig. 2). The idler gear 278 also meshes with a gear 279 (see Fig. 5 also) on a cam shaft 280 which has a gear 281. The gear 281 is connected to the gear 138 (Fig. 2) by a train of gears which comprises two idler gears 282, 283; a gear 284 on a shaft 285, and a gear 286 on shaft 285, the latter meshing directly with gear 138. It will be remembered that the gear 138 turns only when the punch clutch 136 controlled by magnet PCM is engaged.

Secured to shaft 280 (Figs. 2 and 5) is a number of cams 287 operating contacts designated PC7 to PC11 (Figs. 2 and 4B). These contacts are insulatably mounted on a bracket 283 (Fig. 2) secured to the base 100. The cam shaft 280 also drives the printing mechanism which operates only when the punch mechanism is in operation.

The printing station is located between the feed rollers 141P, 142P and the left-hand feed rollers 260, 261 (Fig. 3B) and is in two parts. One part comprises the platen operating mechanism, which is mounted on the front frame 101, while the other part includes the printing wheels, ribbon mechanism, and main drive mechanism for the printing wheels and ribbon mechanism, and is a removable unit which also may be set to either of two positions in the machine to print the data in two different printing lines on the card. The removable printing unit will be described first.

This unit has a main frame comprising two vertical plates 289, 290 (Figs. 1, 3B, 5, 9, 10, 11, 12, and 14). These plates are joined together at the bottom by a front bar 291 and a rear bar 292. The plates are also joined by an upper stop bar 293 (Figs. 10, 11, 13 and 14) and a lower stop bar 294 which limit the stroke of the typewheels, as will be made clear hereinafter. The plates are also joined by a stop pawl pivot bar 295 and by a magnet support frame 296.

Journaled in the plates 289, 290 is a shaft 297 (Figs. 5, 5A, 11, 13, and 14) on which is secured the typewheel drum 298 on which the typewheels generally designated 299, are rotatably mounted. The typewheels are mounted upon the drum 298 (Fig. 5A) by means of rings 300 having shoulders abutting the sides of the typewheels. The front or left-hand end (Fig. 5A) of the typewheel drum is shouldered at 300a like one of the rings 300 to support the front or units typewheel. Interposed between the faces of the shoulders in the rings 300 and the portion 300a of drum 298 and the side or hub portion of the typewheels are friction rings 301 which may be cemented to the typewheels. A key 302 is provided to lock the rings 300 to the drum 298 and fits in keyways cut in the rings 300 and in the drum 298 respectively. The key 302 also projects through a rectangular hole in the shouldered portion 300a of the drum 298. Located between the typewheels 299 are spring friction rings 303 which have rings 304 of friction material such as paper cemented to them, which paper rings 304 engage the front or left-hand faces of the rings 300. The inner or right-hand end of the drum 298 is provided with a retaining washer 305 which is attached to the drum by means of screws 306. The friction rings 303 are spring tempered and flat when manufactured, but, in assembling the typewheels on the drum, the rings 303 become dished by having their centers pushed to the left (Fig. 5A) until the right-hand faces of the paper rings 304 are flush with the right-hand faces of the typewheels 299, the typewheels being provided with annular recesses 299a to accommodate the friction rings. In order to prevent the rings 303 from turning relative to the typewheel the typewheels are provided with pins 307 which project through holes in the friction rings 303.

The typewheels are oscillated between the stop bars 293, 294 which limit the operative stroke of the typewheels, and for this purpose each typewheel is provided with a long stop tooth 299b (Figs. 11, 13, and 14) and is also provided with teeth 299c one for each of the characters "0" to "9" inclusive. The upper half of the periphery of the typewheels with reference to Figs. 13 and 14 is provided with type characters in the order 5, 1, 6, 2, 7, 3, 8, 4, 9, 0. The teeth 299c correspond to the characters and are located diametrically opposite the corresponding character. Thus, as shown in Fig. 14, the typewheel 299 has been stopped in a position to print 2 when the platen is operated. In Fig. 13 the typewheels are shown in the fully set position and are about to be restored in a clockwise direction.

Shaft 297 is oscillated by mechanism which is generally shown in Figs. 5, 10, 11, and 12. Secured to the shaft 297 is a gear 308 which meshes with a gear sector 309 on shaft 310 journaled in the plates 289, 290. The gear sector 309 takes the form of a cam follower having rollers 309a cooperating with complementary cams 311 on a cam shaft 312 also journaled in the plates 289, 290. The shaft 312 is provided with a bevel gear 313 (Figs. 3B, 5, 10, 12, and 12A) meshing with a bevel gear 314, the hub of which is rotatably mounted in a flanged bearing member 315 secured to a gear housing 316 fixed to the side plate 290. The hub of the gear 314 is provided with diametrically opposite slots 314a as best shown in Fig. 12A which receives a key 317 in the end of shaft 280, which it will be remembered rotates whenever the punch clutch is engaged and the punch mechanism is in operation. The keyways in the hub of gear 314 are long enough so that the printing unit can be removed from the machine or set in either of two positions to print on two different lines of the card.

Figure 5:
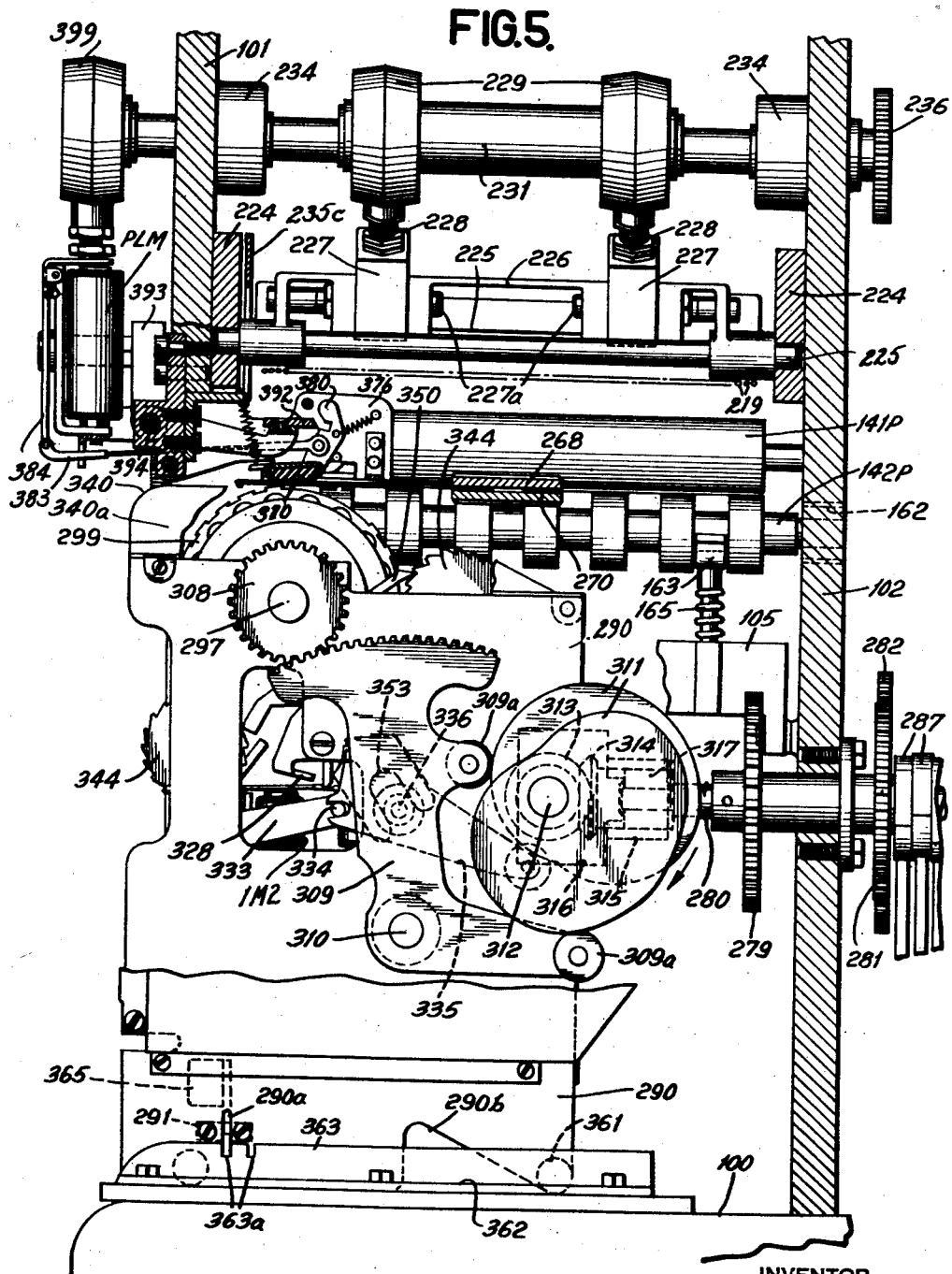
Fig. 5 is a large scale vertical section on the line 5—5 of Fig. 3B.

When the shaft 312 rotates, the complementary cams 311 oscillate the gear sector 309 and thereby oscillate the shaft 297 through gear 308. The parts are shown in Figs. 5 and 13 in the position taken when the machine stops with both clutches disengaged. In this position the typewheels will have been oscillated to the limit of their setting stroke, that is the counterclockwise part of the stroke during which the typewheels may be stopped selectively under control of impulses from the record sensing brushes or the storage relays of the print mechanism as will be made clear hereinafter. Fig. 14 shows one of the typewheels arrested with the "2" type on the printing line and the cam shaft 312 is shown approximately 90° short of the normal stopping position, that is a little beyond the "7" position in the cycle (Fig. 20).

The selective stoppage of the typewheels preparatory to printing is controlled by stop pawls 320 (Figs. 11, 13, and 14) which are pivoted on a rod 321 carried by the bar 295, this bar being provided with transverse slots which hold the pawls 320 in alignment with their respective typewheels 299. Normally the pawls 320 are latched in the position of Fig. 13 by the armatures 322 of the interpreting magnets designated IM1 to IM8 (Figs. 21D and 21E) of which only the first two are shown in Fig. 13. The even numbered magnets are located in a row on the left (Fig. 13) while the odd numbered magnets are located on the right and are staggered with reference to the others. The magnets IM1 to IM8 are mounted on the cross frame 296 and their armatures are pivoted on brackets 323 attached to upstanding posts or lugs formed in the frame 296. Springs 324 anchored to the brackets 323 urge the ends of the armatures, which are provided with latching shoulders, into engagement with the tails of the pawls 320 to hold them in the position of Fig. 13.

The pawls 320, when released, are urged in a clockwise direction into engagement with the teeth 299c of the typewheels, as in Fig. 14, by means of springs 325 (Figs. 13 and 14) which are anchored to stop arms 320a in the pawls 320 and also to zero pawls 326 which are pivoted on a rod 327 carried by the frame 295. The zero pawls 326 have stop portions 326a abutting the stop portions 320b in the position of Fig. 13 to prevent the pawls 320 from engaging the typewheels.

Pivotally mounted on the rod 321 (Figs. 5, 11, 13, and 14) is a restoring bail 328 having a cam follower arm 328a provided with a roller 328b engaging a cam 329 on the shaft 312. The arm 328a is also provided with an arcuate cam surface 328c (Figs. 13 and 14) which, in the position of Fig. 13, rests on the hub of the cam 329. The bail 328 is formed with a cross bar 328d which cooperates with arms 326b of the zero pawls 326.

The timing of the cam shaft 312 is such that at about the middle of the cycle the cam 329 will have elevated cam follower arm 328a to its highest position in which the bail 328 will have rocked the pawls 320 counterclockwise slightly beyond the position of Fig. 13 to relatch those pawls 320 which may have been previously tripped, as a preparation for a new setting of the typewheels. Shortly thereafter, before the "5" point in the cycle is reached, the arm 328a is allowed to drop until the surface 328c engages the periphery of a cam 330 formed in the hub of the cam 329. This allows the bail 328 to move to the position shown in Fig. 14 in which it remains throughout the last half of the cycle, during which the typewheels will be set under control of impulses to the magnets IM1 to IM8.

Let it be assumed that the magnet IM4 (Fig. 14) receives impulses between the "6" and "7" points in the cycle with reference to Fig. 20. This will cause the armature of the magnet IM4 to be attracted, releasing the pawl 320 associated with the typewheel 299 in the fourth or thousands order of the mechanism at a time when the "2" tooth 299C is approaching the final stopping position of the end of pawl 320, with the result that the typewheel corresponding to the magnet IM4 will be stopped with the "2" type at the printing line as in Fig. 14. This action occurs, of course, in consequence of an oscillation of the typewheels in a counterclockwise direction effected as described above by the cams 311 during which the stop lugs 299b of all the typewheels will move in unison from the stop bar 293 to the stop bar 294 until the typewheels are stopped by pawls 320. During this period, as will be made clear hereinafter, as many of the magnets IM1 to IM8 as may have been plugged may receive impulses either directly from the record sensing brushes or from a storage relay system which will be described later herein. In other words the setting of the typewheels will take place over a period amounting to about one-half of the period in which the record sensing brushes traverse the "0" to "9" index-point positions of the record cards.

At the end of the cycle, when all of the typewheels have been set, the cam surface 328c trips off the cam 330, this occurring just beyond the 9 position (Fig. 20) and when the machine stops, if it is going to stop for any reason, the cam 329 will occupy the position of Fig. 13 with all the typewheels which have had a magnet IM1 to IM8 tripped in the printing position. The reason for this is that on account of space limitations, the actual printing from a line of type on the typewheels 297 must take place during the cycle following the one in which the record card passes the record sensing brushes. The actual printing time takes place at about "11" in the following cycle (Fig. 20), that is when the preceding card passing the brushes CB has the "11" index point-positions under said brushes. This printing time is adjusted so that the actual printing takes place while the punched card is momentarily at rest.

When the arm 328a is raised to restore the pawls 320, the cross bar 328d rocks the zero pawls 326 in a counterclockwise direction beyond the position of Fig. 14 and holds them there until the stop pawls are restored. During the period in which the magnets IM1 to IM8 are being energized to control the setting of the typewheels, the zero pawls 326 are held in the position of Fig. 14 to permit release of the pawls 320. At the end of the cycle those pawls 320 which have not been tripped will be locked by the zero pawls 326 as shown in Fig. 13.

The zero pawls 326 are provided for the purpose of preventing printing of zeros to the left of a significant figure. Each pawl 326 has a finger 326c (Figs. 11 to 14) which extends underneath the next adjacent lower order zero pawl, or diagonally downward and to the left as shown in Fig. 12. Let it be assumed, for example, that a typewheel stop pawl 320 has been tripped under control of a hole in the "1" to "9" index point positions of a column, say the fourth order typewheel, which would be the fourth from the bottom in Fig. 12. The tripping of the fourth order stop pawl 320 will lock the fourth order zero pawl 326 in the position of Fig. 14, thereby holding all of the zero pawls 326 for the first three orders or positions in elevated position when cam surface 328c drops off cam 330 a little after "9" in the cycle (Fig. 20). This holds in unlocked condition the stop pawl 320 of the first three orders. If now a zero impulse is given any of the magnets IM1 to IM3, the pawls 320 associated therewith will be free to stop the typewheels 299 at zero. With respect to the four highest orders, the zero pawls 326 will move to the position of Fig. 13 before "0" in the cycle and prevent release of the stop pawls 320 for such orders. Thus, even if a card happened to be perforated "0000200" only the last two zeros would be printed. However, a zero hole much be present or zero can not be printed. Thus, if one of the magnets IM1 to IM8 is not plugged the typewheel 299 associated therewith will be moved beyond the zero position and will be stopped in a blank position by bar 294.

The armatures of the magnets IM1 to IM8 are provided with a stop bar 330 (Figs. 13 and 14) in the form of an inverted U-shaped frame having side arms 330a attached to the top surface of the frame 296 which limits rotation of the armatures 322 by the springs 324 when the magnet assembly including frame 296 is removed from the machine. There is also provided an armature knock-off bail 331 pivoted at 332 to ears 296a formed in the frame 296. Adjustably secured to this bail is an arm 333 having a pin 334. This pin 334 is embraced by a slot in cam follower lever 335 pivoted at 336 to the side plate 290. The lever 335 cooperates with a cam 337 secured to the shaft 312. Bail 331 positively pushes away from the poles of magnets IM1 to IM8 any armatures 322 which may happen to stick due to residual magnetism. The lever 335 also operates the ribbon mechanism as will be explained more clearly hereinafter.

Secured to the top edges of the frames 289, 290 (Figs. 1, 5, 10, 11 and 12) is a ribbon guiding frame 340 formed of thin sheet metal which includes side guides 340a and inclined guide surfaces 340b over which passes the inking ribbon 341 to and from the spools 342. The spools 342 are loosely mounted on spindles 343 to which are secured feed ratchets 344, each being provided with a pin 344a (Figs. 10 and 16) which registers with a suitable hole in the ribbon spool to key each ribbon spool to its shaft 343. The left-hand ends of the spindles 343 (Figs. 10 and 16) have reduced portions 343a which fit into holes in the side plate 289 adjacent semicircular raised portions 289a secured to said plate which half surround the larger diameter of the spindle.

The right-hand ends, with reference to Fig. 10, of the spindles 343 are enlarged slightly at 343b (Figs. 10, 11, 12, and 16). Secured to the inside faces of the plates 290 are bushings 345 which are cut as best shown in Fig. 16 with a central semicircular slot 345a into which may be slipped the enlarged portion 343b. The spindle 343 is then pushed downwardly to the left (Fig. 16) until the enlarged portion 343b lies between the claws 345b formed by slotting the bushings 345 longitudinally.

In inserting the ribbons in the machine the spools 342 are first slipped on the spindles as shown in Fig. 16, then the spindles are placed in the machine with the left-hand ends resting on portions 289a and with the enlarged portions 343b in the bushing 345 by passing the enlargement 343b through the slot 345a. When the spindles are released, double pronged leaf springs 346 (Figs. 10, 11, and 12), secured to the inside faces of the plates 290 and pressing upon the sides of the ratchets 344, push the spindles to the left (Fig. 10) so that the reduced portion 343a enters the hole provided therefor and the enlarged portion 343b enters the space between the claws 345b, thereby securing the ribbon spindles and spools in place.

The ribbon 341 passes from the lower spool 342 (Figs. 11 and 16) upwardly over the left-hand member 340b (Fig. 11) of the ribbon guide frame 340, across the faces of the type at the printing line, down over the right-hand portion 340b, thence on to the upper spool 342.

The ribbon spools are rotated by reversible feed mechanism which includes ribbon feed pawls 350 (Figs. 5, 11, 12 and 16) pivotally mounted at 351 on the lever 335. This lever is urged in a clockwise direction (Fig. 16) by a spring 352 but its movement in this direction is controlled by the cam 337. Normally only one of the ribbon feed pawls 350 engages a ratchet 344. For the purpose of controlling the engagement of the pawls 350 with ratchets 344 there is provided a T-shaped plate 353 which is slotted at its lower end to embrace the pivot 336 for the lever 335. A spring 354, anchored to pins carried by the lever 335 and by plate 353, tends to draw the plate 353 upwardly (Fig. 16). This movement is limited by a pin 335a in the lever 335 which pin may be positioned in either of two slots 353a, 353b in the plate 353. The pawls 350 are urged in a direction to engage the ratchets 344 by means of a wishbone spring 335b coiled around pin 335a and extending over the upper side of pins 350b, 350a on the pawls 350. These pins rest upon cams 353c, 353d formed in plate 353.

Figure 11:
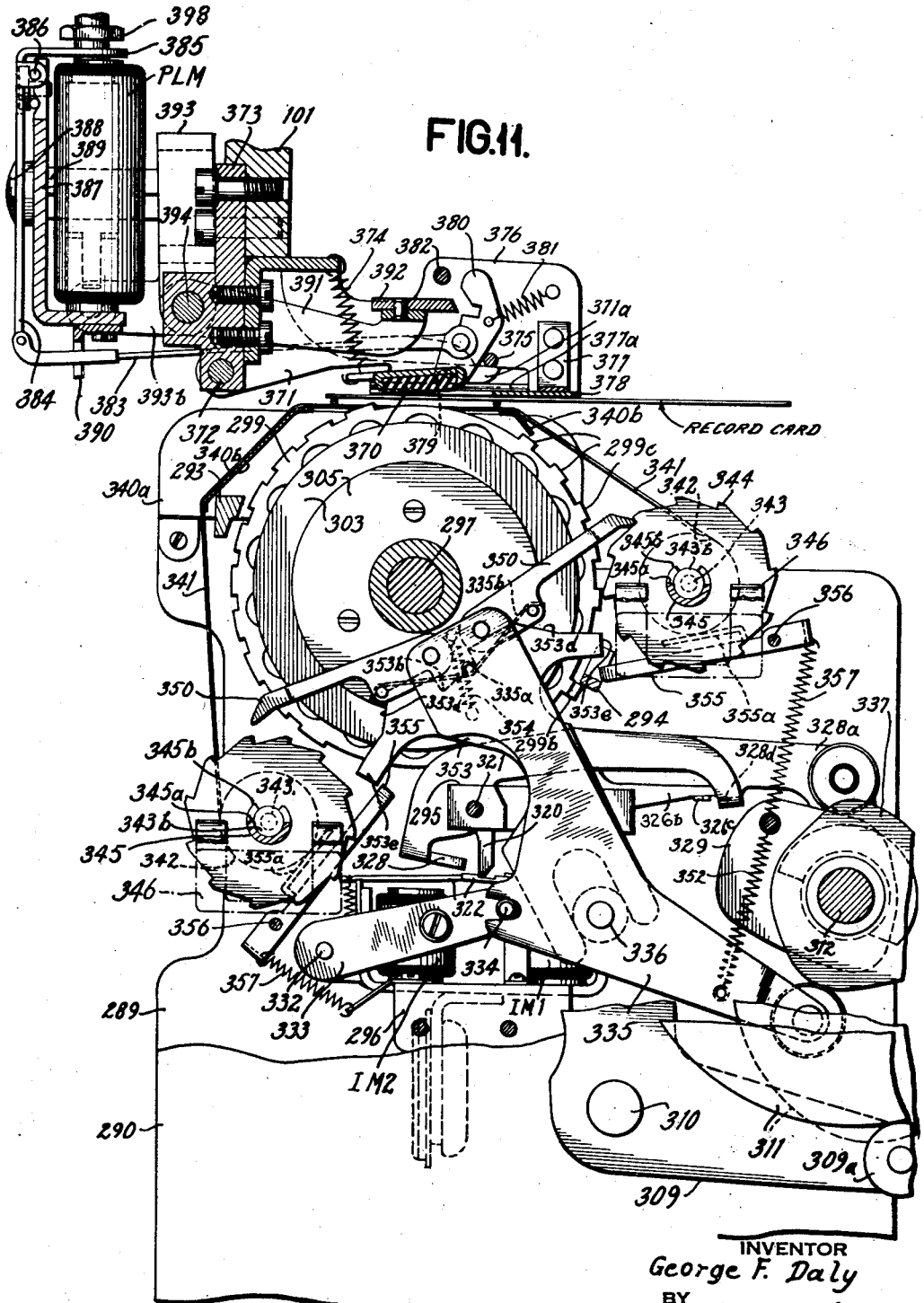
Fig. 11 is a side view of the printing mechanism.

With the parts shown in the position of Fig. 16, the lower or right-hand pawl 350 engages the lower ratchet 344, that is the left-hand one with reference to Fig. 11. Once per cycle cam 337 rotates away from the position of Fig. 16 and allows the spring 352 to rock the lever 335, thereby through the pawl 350 rotating the lower ratchet 344 and its spool 342 one tooth space.

When the plate 353 is rocked clockwise (Fig. 16) relative to the lever 335, to the position of Fig. 11, the pin 335a will pass from the notch 353b to the notch 353a. This movement causes the cam 353d to lift the pin 350b and the lower dog 350 out of engagement with the lower ratchet 344, as in Fig. 11, while the cam 353c allows the pin 350a to drop thereby lowering the upper pawl 350 into engagement with the upper ratchet 344. This shifting movement of the plate 335 is effected by spring 352 or the cam 337, according to the direction to which the plate 353 must be shifted, and is controlled by fingers 355 pivoted on studs 356 attached to the frame plate 290. The fingers 355 have forked portions 355a urged against the ribbon wound on the spools by means of springs 357 and the forked portions 355a, as most clearly shown in Figs. 10 and 16, are aligned with circumferential grooves 342a in the spools 342. When there is present one or more turns of the ribbon around the spools 342, as is the case in Fig. 11, the fingers 355 are held by forks 355a clear of projections 353e in the plate 353 to enable this plate to oscillate freely along with the lever 353. In Fig. 16, however, the parts are shown in the position in which the lower spool 342 has become unwound to an extent to expose the grooves 342a to the forked portion 355a whereby the fingers 355 have been rocked by spring 357 to the position there shown.

When the finger 355 is rocked as described, it moves into the path of the adjacent projection 353e whereby, upon the next oscillation of the lever 335, the lever, in rocking clockwise to the position in Fig. 16, will bring the projection 353e into engagement with the finger 355 and plate 353 will be held while the lever 335 rocks a further extent clockwise. This, in effect, causes the plate to be shifted in a counterclockwise direction, relative to the arm 335, whereby the pin 335a takes the position now shown in Fig. 16. This movement of the plate allows the dog 350 for the lower ratchet 344 to drop into teeth of said ratchet and, with succeeding operations of the cam 337, will be rotated clockwise.

When the upper spool 342 becomes completely unwound, the finger 355 associated therewith will move into the path of the upper left-hand projection 353e in Fig. 16 and cause the plate 353 to be shifted to carry the pin 335a into the notch 353a. Shifting of the plate 353 from the position shown in Fig. 16 to the alternative position is effected positively by the cam 337, but from this position to the one shown in Fig. 16 the shifting is effected by the spring 352 which naturally is made strong enough to overcome the resistance of the cams 353c and the spring 354.

Since there is a possibility that the cam shaft 312 may get out of time when the printing unit is removed for any purpose, the shaft 312 is provided with an index disk 360 (Figs. 1, 3B, 10, and 12) adjacent the left-hand plate 289, which disk is provided with suitable graduations cooperating with an index on plate 289. This disk is also a convenience in adjusting the timing of the parts of the printing unit when it is removed from the machine.

The lower corners of the plates 289, 290 are provided with pairs of circular disks 361 (Figs. 1, 5, and 10) riveted together on opposite sides of the plates. Mounted on the top of the base 100 is a plate 362 having Z-shaped guide bars 363 secured to the right-hand and left-hand edges of the plate (Fig. 1). The bars 363 lap over the outer disks 361 and serve as guides in inserting and removing the printing unit and for holding the printing unit in its proper position with respect to the card feeding rollers 141P, 142P, 260, 261. The bar 299 has a longitudinal slot in which is pivoted at 364 a latch lever 365 which is urged in a clockwise direction by a spring 366. The lever 365 has a horizontal arm which projects through a slot 290a (Figs. 5 and 10) in the plate 290 and engages either of two slots 363a cut transversely of the right-hand bar 363 (Fig. 1). When the latch 365 is seated in the left-hand notch 363a (Fig. 5) the printing unit will be positioned to print a line of numbers shown in solid lines in Fig. 17. When the latch is in the right-hand notch 363a the printing will be effected in the position shown by the dotted lines in Fig. 17. When the printing mechanism is removed from the machine the latch 365 may be released and the entire printing unit, that is all parts enclosed or supported by the plates 289, 290, may be moved forward with reference to Fig. 1 or to the left (Fig. 5).

In replacing ribbons, however, it may be desired to merely partly remove the printing unit and leave it attached to the machine. For this purpose plates 289, 290 are provided with cut out portions or notches 290b (Fig. 5) which enable the printing mechanism to be partly withdrawn and tilted downwardly until the diagonal edges of the notches rest upon the top surface of the plate 362. When this is done the printing unit need only be withdrawn about two-thirds the distance required for complete removal, and, when so withdrawn, the plates 289, 290 will act like cantilever beams to support the printing unit.

Printing from a line of type set up on the printing drum and exposed on the printing line is effected by a platen mechanism under the control of platen control magnets designated PLM (Figs. 4B, 5, 11 and 21E). The mechanism controlled by these magnets is most clearly shown in Figs. 1 and 11. Printing is effected by means of a platen 370 (Fig. 11) which is attached to a bail 371 pivoted at 372 in a block 373 attached to the front of the frame 101, the frame being suitably cut away and recessed to accommodate the block 373 and the parts of the platen mechanism which project interiorly of the space between the frame 101, 102 and between the feed rollers 141p, 142 and the left-hand pair of feed rollers 260, 261 (see Fig. 4B also). Springs 374 attached to the bail 371 hold the bail with projections 371a on its side arms up against a stop rod 375 carried by a frame 376 secured to the back of the block 373. The side plates of the frame 376 are joined by a U-shaped bracket 377 and to the underside of the cross bar of this bracket is secured an L-shaped card guide 378. One leg of guide 378 is relatively wide, as shown in section Fig. 11, and the other leg 378a (Figs. 4B and 11) is narrower and extends transversely of the plate 101 and toward the latter, alongside the highest order typewheel 299. This portion of the card guide is upturned along the edge nearest rollers 141P, 142P to insure that a card will be fed underneath the platen 370 and will not catch upon the end of it.

Pivotally mounted on studs 379 at the ends of the bail 371 are two bail operating hooks 380 similar to the hooks 212 attached to the punches 198 (Fig. 3B). Each hook 380 is urged in a clockwise direction (Fig. 11) against the stop rod 375 by a spring 381. A knock-off rod 382 is also provided for the hooks 380 which rod rigidly joins the side plates of the frame 376. The platen operating hooks 380 are connected by links 383 to downwardly extending arms 384 attached to the armatures 385 of the magnets PLM. The armatures 385 are pivoted at 386 (Figs. 1 and 11) on lugs formed in a plate 387 secured by screws 388 and posts 389 to the front face of frame 101. The lower edge of the plate 387 is bent at an angle to form a ledge or shelf supporting magnets PLM, and the underside of the shelf is provided with an angular strip 390 having slots which guide the links 383.

An operating bail is provided which includes side arms 391 and a cross bar 392 (Fig. 11). One of the side arms 391 is secured to a second bail 393 pivoted at 394 to the block 373 (Fig. 11) and at 395 (Fig. 1) to a block 396 secured to the front plate 101 of the machine. The bail 393 has a stiffening member 393a and also has an arm 393b extending horizontally to the left (Fig. 11). Arm 393b is connected by an adjustable linkage 398 to a housing 399 for a roller bearing 400 mounted on an eccentric portion of the shaft 231 outside of the frame 101.

When the shaft 231 rotates (Fig. 1) the link 398 will be vibrated up and down and will impart an oscillating motion to the bail 393 which will be transmitted to the bail comprising the side arms 391 and cross bar 392.

When the magnets PLM are energized with the bar 392 vibrating up and down, the platen operating hooks 380 will be drawn into cooperative relationship with the bar 392 in the same way as the punch hooks 212 are operated, and the platen 370 will be operated to effect an imprint upon a card from the line of type set up in the manner explained above. The rod 382 performs the same function for hooks 380 as the rib 235a in the knock-off bar (Fig. 3B) performs for hooks 212.

Figure 21B:
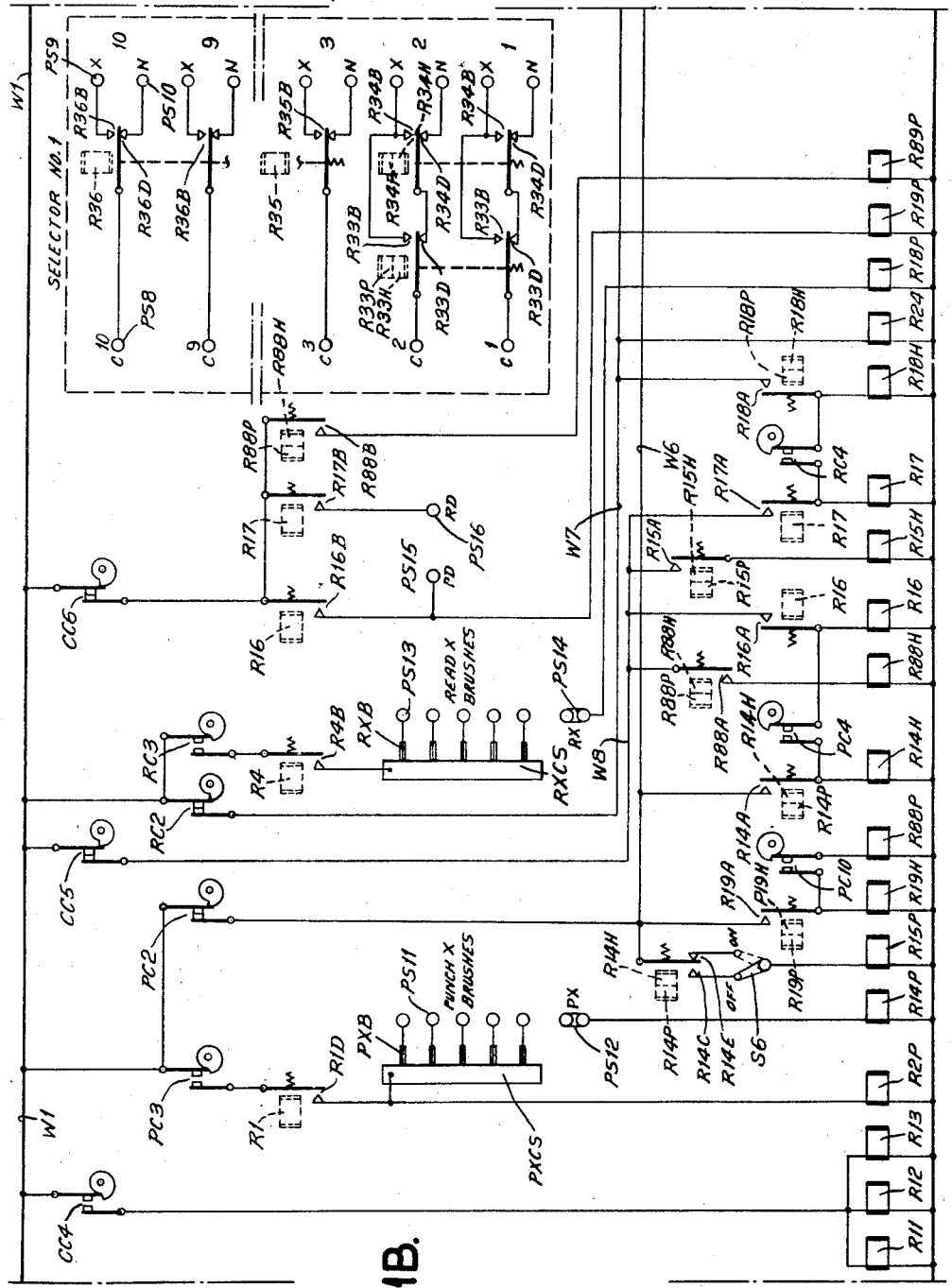
Figure 21D:
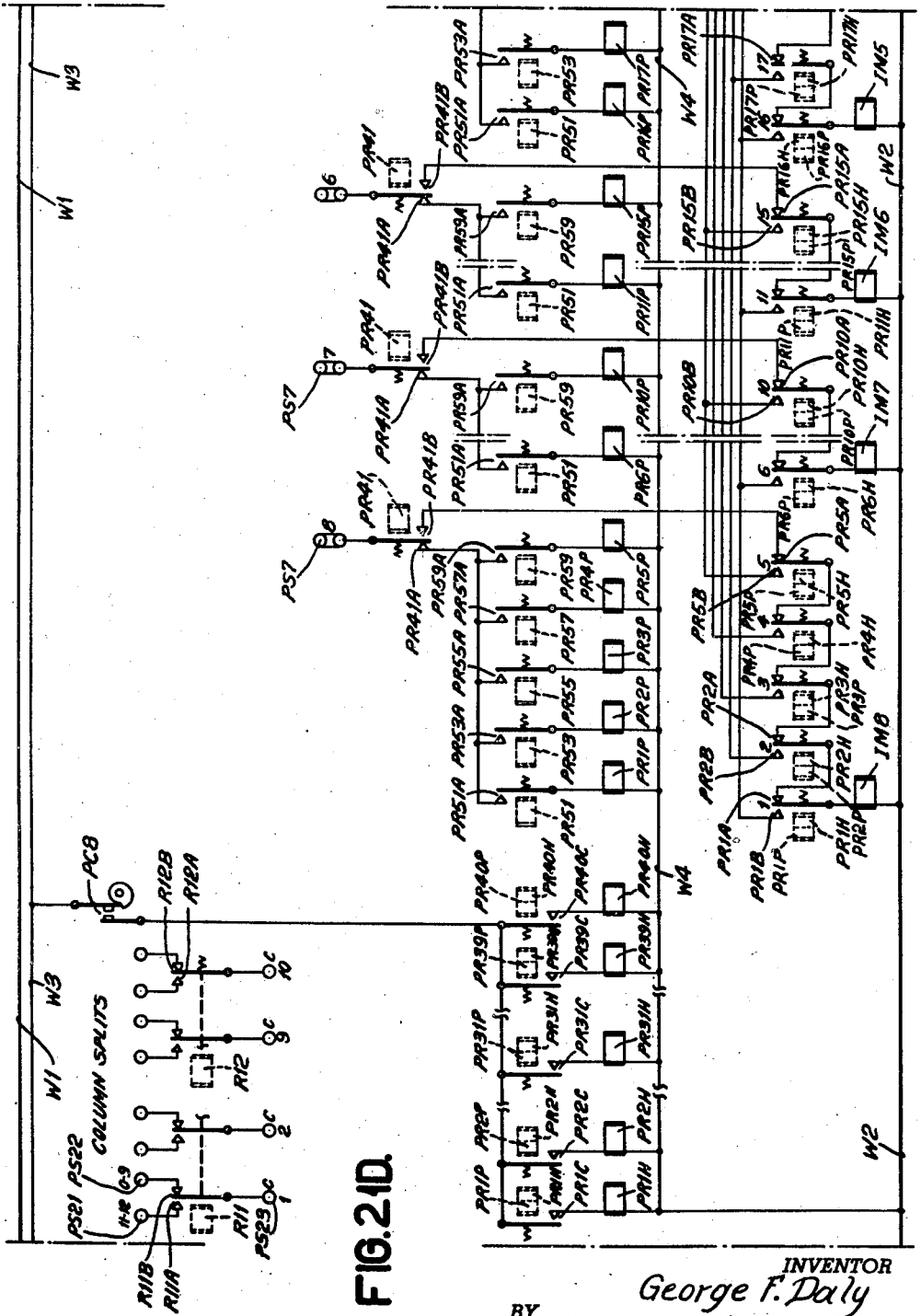

For the purpose of controlling the operation of the magnets IM1 to IM8 there is provided a storage relay system which includes a series of printing relays designated PR1 to PR60, inclusive, in Figs. 21D and 21E. In order to save space all of these relays are not shown in the drawings, but the ones which are missing are connected according to the same system as those shown. The complete connections for all of the printing relays associated with the groups of relays for the first, second, fourth, fifth, seventh, and eighth orders or positions of the printing mechanism are shown in Figs. 21D and 21E and the end relays of each group for the partly missing groups are also shown to indicate the fact that these groups are connected in the same way as the others.

The storage relay system also includes an emitter generally designated E which, as shown in Fig. 1, consists of a circular frame 402 concentric with the shaft 134 and secured to the front plate 101. This emitter includes a group of five read-in contacts or segments 403 and five read-out contacts 404 which are insulatably mounted. Cooperating with these contacts 403, 404 is a brush 405 mounted on shaft 134. The emitter E turns at the rate of one revolution per card cycle and is timed as shown in Fig. 20 so that during the read-in portion of the cycle, in which the brush 405 is traversing the read-in segments 403, circuits may be established through the segments 403 in synchronism with the establishment of circuits through the sensing brushes to the printing relays in a manner hereinafter to be explained in detail. During the remaining, or read-out portion of the cycle when the brushes traverse the segments 404, the spacing of such segments is such that the read-out circuits are closed approximately half-way between index-point positions on the card for a purpose which will be made clear hereinafter.

Before proceeding with a detailed description of the operation of the machine under control of punched cards, the manner in which the machine is started in operation will be described. It will be assumed that cards have been placed in both the punch hopper PH and the reproducing hopper RH, thereby causing the contacts PHC, RHC to close energizing hopper relays R3 and R6. Energization of these relays R6 and R3 causes the contacts R6B, R3D to open and contacts R6D and R3E to close. Contacts R6C and R3C also close but, for the time being, have no effect.

When the start key is depressed and contacts STC are closed the initial starting circuit is established as follows: line wire W1, contacts KC, DC, CMC1, STC, R6D, R1B or R25B, R3E, and relay R10, to line wire W2. Relay R10 closes contacts R10C to energize the motor control relay MCR over a circut as follows: contacts KC, DC, R10C, and relay MCR, to line wire W2. The motor control relay MCR closes contacts (not shown) which start the main driving motor of the machine. Relay R9 is also energized in parallel with the motor control relay MCR through contacts R13B, thereby closing contacts R9A and R9C. After the start key is released the relay R9, through its contacts R9A and R9C maintains holding circuits for relays MCR, R9 through the contacts CC3. This holding circuit is relatively momentary and the machine will stop feeding cards at the end of the first cycle unless the start key is depressed a second time or held down more than two cycles.

During the first cycle, cards are fed from the punch hopper PH and from the reproducing hopper RH, respectively, and close the contacts RCL1, DCL thereby energizing the card lever relays R1 and R4. In order to cause the feeding of these first cards it is necessary to energize the punch clutch magnet PCM and reproducing clutch magnet RCM. Bearing in mind that the contacts CC1 to CC11 operate continually, the energization of the relays R9 and R10 as described above by depression of the start key, causes the contacts R9B, R10D to close, thereby establishing circuits for the clutch magnets PCM, RCM as follows: line wire W1, contacts R9B, R10D, R1C, CC1, and magnet PCM, to line wire W2. Also a parallel circuit extends through contacts R9B, R10B, R4B, R4A, switch S3, contacts CC2, and magnet RCM, to line wire W2. Thus, in the beginning the magnets PCM, RCM are energized and start the feeding of cards which cause the contacts DCL, RCL1, RCL2 to close during the first cycle as stated.

During the second cycle the contacts R1E and R4C will be in closed condition whereby the circuit for magnet RCM will extend through contacts R1E, switch S1, and contacts R14E, while the circuit for magnet PCM will extend through contacts R4C, instead of through contacts R4B and R1C respectively. Thus, during the second cycle there will be no change so far as the energization of clutch magnets PCM, RCM is concerned. Contacts R1A and R4D close during the latter part of the first cycle, but have no effect since contacts R7E are still open because contacts PCL have not yet closed. For this reason the start key must be held down continually or depressed three times to initiate the three cycles of the machine required to move the first cards from the respective hoppers far enough to close the contacts RCL, PCL. Early in the third cycle this takes place thereby energizing relay R7C to close contacts R7E.

As soon as contacts R7E close, the holding circuit for the relay R10 is finally completed which will be maintained as long as cards continue to feed on both sides of the machine. This holding circuit is the basic running circuit and is traced as follows: line wire W1; contacts KC, DC, CMB1; stop key contacts SPC, full pocket contacts PFPC and RFPC; contacts R4D, R6C, R7E, R1A, R3C, R10A; and relay R10 to line wire W2.

The maintenance of the basic running circuit is dependent upon the presence of cards in the hoppers, upon the continuance of feeding of cards, and upon the number of cards which may be present in the punch and reading pockets. For instance, suppose the punch hopper PH becomes exhausted of cards, this will immediately open the contacts PHC, deenergizing relay R3. Contacts R3C will open and, since contacts R7C are now open, the basic circuit will be interrupted causing the relay R10 to become deenergized. Since relay R10 controls the relay MCR, the latter will be deenergized and the main driving motor DM will stop, thereby arresting the feeding of cards. Also contacts R9B, R10D will open preventing further impulses to the clutch magnets PCM, RCM, thus the machine will stop but the various relays controlled by the card lever contacts DCL, RCL1, PCL, and the reading hopper contacts RHC will remain energized since none of these card lever contacts have opened. When additional cards are placed in the punch hopper contacts PHC will reclose and reenergize relay R3, thereby reclosing contacts R3C. Since the holding circuit for relay R10 must extend through contacts R10A it is necessary to depress the start key once to restart the machine by reenergizing the relays R10, MCR, R9 in succession as explained above.

After being started in this fashion the machine will continue to run until another interruption of the basic running circuit takes place. This may happen due to the failure of a card to feed from either hopper or due to the jamming of a card in the punches which would create a card gap causing one or more of the card lever contacts DCL, RCL1, PCL to open. Since, in the event of a card jam, there is no means of closing the gap which will be created between the cards by the removal of a jammed card or by failure of a card to feed, it is advisable to remove from the machine all the cards in the course of feed and restart operations over again from the point where the interruption occurred. The stoppage of the machine can also be effected when either of the pockets becomes empty causing the contacts PFPC or RFPC to open. This condition may be corrected and the machine restarted as in the case of exhaustion of the hoppers by merely removing the cards from the pocket which is too full.

In the event that the operator removes the die, as described above, for the purpose of removing a jammed card, or for cleaning and fails to latch the die in place properly, the die contacts DC will remain open and prevent starting the machine. In the event that a serviceman removes the knock-off bar, contacts KC will open and also prevent restarting the machine until the knock-off bar is replaced. The contacts DC prevent damage to the punches and die in the event of failure to replace the die properly. It has been found from experience that if the knock-off bar is not replaced and the machine is operated without it the punches become broken.

It may happen in starting the machine that cards will not be fed simultaneously from both hoppers during one of the initial cycles, or the exhaustion of one hopper of cards, may cause the reading side of the machine to get out of step with the punch side. For example, let it be assumed that a card does not feed on the punch side of the machine during the first cycle. This will mean that relay R1 will not be energized and contacts R1C will remain closed notwithstanding the fact that contacts R4C have been closed during the first cycle by the first card fed from the reading hopper.

The energization of relay R4 without the companion energization of relay R1 has the effect, owing to the failure of contacts R1E to close and the closure of contacts R4C, of causing the punch clutch magnet PCM to be energized but not the reading clutch magnet RCM whereby the feeding of cards on the reading side of the machine will stop until a card is fed on the punch side of the machine. Thus, in the case of exhaustion of a hopper, the machine resumes feeding of cards only on the side of the machine which was exhausted, which will have the effect of bringing the two sides of the machine back into step. When the reading side of the machine becomes exhausted, contacts R1E will close to enable energization of the reading clutch magnet RCM through contacts R4A and the failure of contacts R4C to close will prevent energization of the punch clutch magnet PCM.

When only the punch side of the machine is to be used, as would be the case in gang punching under control of perforated cards interspersed with the cards to be punched, the switches S3, S5, S7 are shifted to the "off" position. In this case, since the reading side of the machine is not in use the relay R4 will never be energized and contacts R4E will remain closed. Thus, once the machine has been started, the punch clutch magnet PCM will be energized once each cycle as long as cards continue to feed from the hopper PH. The energization of the relay R1 which is controlled by the die card lever contacts DCL has no effect on magnets PCM since contacts R4A and R4E remain closed.

The closure of switch S5 has the effect of shunting those of the contacts of the relays R1, R3 and R6 which are in circuit with the start key contacts STC. When the start key is depressed with only the punch side of the machine in use, the initial starting circuit extends from line wire W1, contacts KC, DC, CMC1, STC, switch S5, and relay R10, to line wire W2. This causes the motor to start and the punch clutch magnet PCM to be energized through the energization of relays R9, R10, and MCR as described above. During the first three cycles of the machine, the contacts R1A and R7E close in succession as explained above. Since the reading side of the machine is not in use contacts R6E and R4B remain closed, consequently the energization of the relay R3 and closure of contacts R3A by the placing of the cards in the punch hopper PH initially closes part of the basic running circuit which is finally completed by the energization of relays R1 and R7. This basic running circuit is controlled in the same general way as described above when interruptions such as an exhausted hopper, a card jam, or full pocket occur, except, of course, that the effects are limited to the punch side of the machine and the selective control of the punch clutch magnet PCM and the reading clutch magnet RCM is unnecessary.

When the cards are to be interpreted and a number printed upon the card according to data designations in the columns designating the members to be printed, the plug sockets PS7 are connected by plug wires to either plug sockets PS2 or the plug sockets PS3. It will be assumed as a simple illustration that the machine is gang punching under control of master cards interspersed with cards to be punched in the punch hopper PH. The machine may be plugged as shown in Fig. 22A. The control exercised by the X-holes in the master cards to prevent printing of the numbers upon the master cards will be ignored for the time being. It will be assumed that an 8-digit number is to be printed under control of the holes punched in columns 1 to 8 of the card, accordingly, the plug sockets PS7 corresponding to the units order or lowest position of the printing mechanism will be connected by plug wire PW1 to the plug socket PS3 (Fig. 22A) corresponding to the brush sensing the column 8 of a punch card which is discharged from the punch station and fed past the brushes PB. Similarly, as shown in Fig. 22A, the plug socket PS7 for the eighth or highest position and the intervening plug sockets will be connected by a plug wire PW1 to the plug sockets PS3 for columns 1 to 7 inclusive.

In the wiring diagram and in Fig. 22A, a small number 1 appearing above or in line with plug socket PS7 indicates the units order or lowest position of the printing mechanism, while the plug socket for the highest order is designated with the numeral 8. The numbering of the printing magnets IM1 to IM8 corresponds to the numbering of the plug sockets PS7 and similarly indicates the denominational orders.

In the present case the punch brushes PB will also be plugged to the punch magnets PM by inserting plug wires PW2 between plug sockets PS7 and PS4 so that the punch magnet for column 1, for instance is electrically connected to the punch brush PB for column 1. In order to do this and at the same time plug the printing mechanism to the same brushes PB it is necessary to use double plug sockets PS7 and two plug wires PW1, PW2 per card brush whereby each plug socket PS3 is connected to both a plug socket PS4 and a plug socket PS7. The index-point positions of each punched card will be sensed by the brushes PB and the succeeding card will be punched in the order 12, 11, 0, 1 . . . 9 while the punched master card or punched detail card, as the case may be, passes the brushes PB. The corresponding index-point positions of two successive cards will pass the punches and brushes PB together. It will be assumed that the card passing brushes PB is punched 00000015 in columns 1 to 8.

At the "1" point in the cycle in which the punched card passes the brushes PB, the punch magnet PM for column 7 will be energized to punch a "1" hole in column 7. In doing this, the following circuit will be established: line wire W1, contacts PC1, CC11, CC12, CC13, CC14, R7B, common brush PCB, punch contact roll PCR, punch brushes PB for column 7; the plug wire PW1 from plug socket PS3 to plug socket PS7 for the tens order, that is, position 2 of the printing mechanism, the plug wire PW2 between plug sockets PS7 for the tens order and PS4 corresponding to column 7, the punch magnet PM for column 7, contacts R15C and R25D, to line wire W2. A parallel circuit is also established from the plug socket PS7 through contacts PR42A for position 2 of the printing mechanism, contacts PR52A, relay PR31P, and bus wire W4, to line wire W2, it being assumed that contacts PR52A are closed.

The closure of this second or printing storage circuit at the "1" point in the cycle is permitted through the operation of the emitter E, which, at "1" in the cycle, causes the energization of the relay PR52 by a circuit traced as follows: line wire W1, contacts PC1, bus wire W3, contacts CC15, CC16, the emitter common strip, the "1" read-in contact of the emitter E, relays PR51, PR52, and bus wire W5, to line wire W2. Thus the concurrent closure of the circuit through the brush PB for column 7 and the contacts PR52A at the "1" time in the cycle results in the energization of print relay PR31P and causes the contacts PR31B to close and PR31A to open. Contacts PR31C also close and establish a holding circuit of less than a cycle duration for the holding coil PR31H traced from line wire W1, contacts PC1, wire W3, contacts PC8, PR31C, coil PR31H, and bus wire W4, to line wire W2. Thus, at the "1" point in the cycle the print magnet IM2 is not energized but a double coil relay whose coils are designated PR31P and PR31H will be energized and will be kept energized until the end of the cycle by means of the contacts PC8. Coil PR3H holds contacts PR31C closed until contacts PC1, PC8 open at the end of the cycle (Fig. 21d). The effect is to store the value "1" by setting a relay to represent such value.

At the "5" point in the cycle a circuit is established as follows: line wire W2, contacts PC11, R87B, R87D, PC7, and relays PR41 and PR42 in parallel, to line wire W2.

At this point it is desired to explain that relay R87 is energized as soon as cards feed between the brushes PB in consequence of closure of card lever contacts PCL, provided the print control switch S4 is closed. Because of the fact that a card must be printed during the cycle following the one in which it is punched, a holding circuit is provided to keep relay R87 energized after the card lever contacts PCL have opened in consequence of the last card passing the brushes PB.

The closure of the circuit through the relays PR41 and PR42 is timed so that these relays are energized slightly before the punch brush PB for column 8 senses the "5" hole in the card. There are four sets of contacts for each relay PR41, PR42 of which the normally closed contacts are designated PR41A, PR42A, while the open contacts are designated PR41B, PR42B. The punch magnet PM for column 8 will be energized at the "5" point in the cycle by a circuit traced similarly to the above and a parallel printing circuit will be established from the brush PB for column 8 to the plug socket PS7 for position 1 of the printing mechanism through contacts PR42B and the contacts PR40A, PR39A, PR38A, PR37A, PR36A, and units printing magnet IM1, to line wire W2. The energization of magnet IM1 at the "5" point in the cycle will cause the units order typewheel to be stopped at the "5" position with the "5" character thereon facing the platen.

Approximately half way between the "5" and "6" index-point positions of the card, a second circuit will be established by the emitter E through one of the readout contacts traced as follows: line wire W1, contacts PC1, bus wire W3, contacts CC15, CC16, the common strip of emitter E, the "1" readout contact of emitter E, contacts PR31B, and magnet IM2, to line wire W2. The typewheel for the tens position is then stopped with the "1" type facing the platen in consequence of the arrangement of the type in which the "1" type appears between the "5" and "6" types, respectively.

While the "0" positions of a card passing the brushes PB are being sensed, the relays PR59, PR60 will be energized by emitter E, closing the contacts PR59A, PR60A for positions 3 to 8 of the printing mechanism simultaneously with the establishment of the circuits through the "0" holes in columns 1 to 6 of the card to the punch magnets. This will cause the energization of the relays PR5P, PR10P, PR15P, PR20P, PR25P, PR30P in the same general manner as in the case of the relay PR31P, and the correspondingly numbered holding coils PR5H, PR10H, etc., will be energized. Near the end of the cycle the emitter E will cause parallel circuits to be established to the magnets IM3 to IM8 through the "0" readout contacts and contacts PR5B, PR10B, etc., in the same general manner as through the contacts PR31B and magnet IM2. Thus at the end of the cycle in which the card punched "00000015" passes the brushes PB the typewheels will have been set to print "15." The zeros to the left of the numeral "1" will not be printed because of the effect of the zero pawls 326 for the third to eighth positions of the printing mechanism.

In the illustrative case, at the "11" point of the following cycle a circuit will be established through the platen magnets PLM which may be traced as follows: Line wire W1, contacts PC11, R87B; PC9, closing at 11; switch S9, contacts R89B, and the platen magnets PLM, to line wire W2. As explained above, the energization of the platen magnets causes the platen to operate to print from the previously set typewheels. In the event that the card printed upon happens to be the last card, the relay coil R78H, by keeping the contacts R87B, R87C, closed will insure a pulse of current to the platen magnets PLM, notwithstanding the opening of contacts PCL. The timing of the energization of the platen magnets PLM is such that printing takes place while the card is momentarily at rest.

Certain operations, such as gang punching, requiring the use of previously punched master cards on the punch side of the machine to control punching operations, make it necessary to provide for certain special controls of punching, printing, or comparing operations. For example, in gang punching, when master cards are interspersed with cards to be punched and fed through the punch side of the machine, it is necessary to suppress punching operations when each master card passes the punch station. This is due to the fact that gang punching is effected by utilizing each card which has been punched under direct control of one card to control the punching of the next succeeding card. In other words, when the last detail card following a given master card passes brushes PB and the next succeeding master card passes the punches, it is necessary to prevent operation of the punches as otherwise the succeeding master card would be mutilated with new perforations. Furthermore, while a given detail or master card is passing the punching station it is obviously impossible to print upon it at the same time on account of limitations of space. For that reason the printing station was located between the punch brushes and the punch card pocket. Thus, a card which has been punched must be first transported through the punch brush station before a number can be printed upon it requiring that in most cases printing upon the master card be prevented. Master cards are often used over and over again and the first passage of the master card through the machine would be sufficient to print upon the master card. For this and other reasons it is desired to suppress printing when the master card passes the printing station.

In order to accomplish these various purposes, which require cycle delays of the effect of control impulses for from one to three cycles, there has been provided class selection and cycle delay controls which are made flexible so they can be used for a variety of purposes. Cycle delays of one, two, and three cycles from the time the controlling impulse is picked to the time the control impulse is rendered completely effective may be had with this flexible class selection and cycle delay control. One of these controls is associated with the punching side of the machine while the other is associated with the reproducing or reading side of the machine. Each of these controls is complete in itself and has associated with it a class selection relay system which may be utilized for many different purposes in controlling punching and comparing.

The cycle delay and class selection controls are rendered operative by means of the so-called X-holes in the cards which are holes placed in the "11" index-point positions of a card column. Usually master cards are identified by an X-hole in a given column which in the detail cards lacks such a hole. Conveniently it will be assumed that the machine has been plugged for gang punching as in Fig. 22A, and that it is merely desired to suppress punching when the master card passes the punch station and to suppress printing while the same card passes the printing station. It will be assumed that the data to be gang punched is perforated in a field comprising columns 1 to 8 of the master and detail cards and that the numbers appearing in this field are to be printed upon the detail cards.

The operations of printing and punching will proceed as described above with reference to Fig. 22A.

When the master card is discharged from the punch hopper PH, the punch X-brush PXB for the column in which the X-hole appears in the master card will close a circuit at the "13" point in the cycle. This is due to the fact that the punch X-brush PXB is so located that when a card passing through the punch station reaches the "13" point, that is, with the punch brush PB just resting on the bottom edge of the card, the punch X-brushes PXB will be about to drop into the X-hole in the master card which is being fed from the punch hopper. This, of course, occurs at the end of the cycle in which the master card is ejected from the punch hopper.

The circuit which is established by the X-hole in the master card is traced as follows: line wire W1, contacts PC3 (Fig. 21B) which close at "13" in the cycle, contacts R1D, common strip PXCS, the brush PXB, the plug wire PW3 (Fig. 22A) between plug sockets PS11 and PS12, and coil R14P, to line wire W2. Contacts R14A close and energize the holding coil R14H which establishes a holding circuit to line wire W1 through wire W6 and the contacts PC2. The timing of the contacts PC2 is such that the relay coil R14H will be kept energized until near the end of the next succeeding cycle during which the punched master card will pass the punch station.

Contacts R14C also close and energize relay R15P in parallel with the holding coil R14H through wire W6, contacts R14C and the switch S6. Contacts R15A close and energize the holding coil R15H through wire W8 and the contacts CC5. This holding circuit however is of very short duration and is insufficient by itself to keep the relay R15H energized during the cycle in which the master card passes the punch station. However, the coil R15P is kept energized by the contacts PC2, with the result that contacts R15C remain open during the passage of the master card past the punch station and prevent circuits from being established through the punch magnets PM. At the end of this cycle the relay R14 is deenergized, but, since contacts CC5 close before contacts PC2 open (Fig. 23), the relay R15H will be kept energized until just before the "14" point in the next cycle during which the master card will pass the punch brushes PB. Thus, suppression of punching is effected only during the cycle in which the master card passes the punch station.

During the passage of the master card past the punch brushes PB, circuits will be established through the punch magnets PM to punch the number appearing in the columns 1 to 8 as described above. Also the magnets IM1 to IM8 are energized to set up the number punched. Therefore a circuit must be set up which is ultimately to control suppression of printing from the set type wheel. The cycle delay control is actually started in operation during the cycle in which the master card is discharged from the punch hopper PH and is rendered operative by the initial energization of relays R14P—R14H. Owing to the fact that relay R14H is energized through most of the cycle in which the master card passes the punch station, contacts PC4 close and energize relay R16 in parallel with relay R14H. Closure of contacts R16A connects the relay R16 to line wire W8 in parallel with relay R15H which, it will be remembered, was energized along with relay R14P. The holding circuit for relay R16, like the one for relay R15H, is dependent upon the contact CC5 which may be considered as momentary with respect to the coils R16 and R15H. The closure of contacts R16B causes a circuit to be established from line wire W1, contacts CC6, R16B, and relay R19P to line wire W2. All of this occurs during the cycle in which the master card passes the punch station.

Contacts R19A of relay R19P establish a holding circuit for the coil R19H through wire W6 and contacts PC2 which will keep relay R19H energized through the following cycle in which the master card passes the punch brushes PB. Near the end of the cycle in which the master card is passing the punch brushes PB, the contacts PC10 close a circuit to energize relay R88P in parallel with relay R19H before relay R19H is deenergized by the opening of contacts PC2. Relay R88P closes contacts R88A which energize the holding coil R88H through the contacts CC5 which it will be recalled hold only into the following cycle for a very short period, that is through the D position. Contacts R88B also are closed to energize relay R89P through contacts CC6. Relay R89P closes contacts R89A to establish a holding circuit extending from line wire W1, through contacts PC11, R87B, R87C, R89A, and coil R89H, to line wire W2.

At this point it is desired to recall the fact that when printing is to be effected the switch S4 is closed whereby relay R87P will be energized in parallel with the card lever relay R7 which is controlled by the punch card lever contacts PCL. Thus, when the machine is conditioned for printing, the contacts R87B, R87C, R87D will all be closed. The contacts PC11 have the same timing as the contacts PC2 with the result that the relay R89H will be held through substantially the entire cycle in which the master card is passing the printing station. Since contacts R89B are now open the platen magnets PLM cannot be energized, and printing will not be effected upon the master card.

It sometimes happens that the detail cards and the master cards are distinguished by placing the X-holes in the detail cards and not in the master cards. Under these conditions the platen magnets PLM must be energized for each card which has an X hole, but not for any card which lacks the X hole. This result is accomplished by setting switches S1, S6, S8, and S9 in the dotted line position.

During the first cycle of the machine the first card will in all probability be a master card which lacks the X hole. Owing to the position of the switch S6, the relay R15P is now connected to the contacts PC2 through the closed contacts 14E of relay R14P. This means that during the first cycle of the machine the relay R15 will be energized automatically by closure of contacts PC2. On the other hand, with switch S9 in the dotted position the platen magnets PLM will only be energized when relay R89P is energized. Thus both printing and punching will be prevented during the first and second cycles of the machine. Thus, when the first master card passes the punch station relay R15, through the contacts R15C, will prevent punching and will be deenergized at the end of the cycle. During the second cycle of the machine, while the first master card is passing the punch station, the X hole in the first detail card will be sensed and will energize relay R14P. This relay will open the contacts R14E and prevent a second energization of relay R15P.

Each succeeding detail card through its X-hole will also energize relay R14P and prevent energization of relay R15P until another master card is ejected from the punch hopper. Insofar as the detail cards are concerned the relays R16, R19P, R88P, and R89P will function for each detail card as described above, but their ultimate effect will be to close a circuit through the platen magnets during the third cycle after the detail card passes brush PXB instead of opening a circuit. This is due to the fact that, each time relay R14P is energized. relay R89P will also be energized since the contacts R14A permit the relays R16P, R19P, R88P, and R89P to be energized in succession. Therefore, since this occurs only with detail cards, the contacts R89E will close a circuit through the platen magnets PLM by way of the switch S9 in the dotted line position.

The timing is such that any card will determine the status of the relay R89E in the third cycle after the card passes the punch X-brush PXB, that is, when such card passes the printing station. Thus, after a master card passes underneath the punch X-brush PXB, it will cause, according to the position of switches S6, S9, a one cycle energization or interruption in the energization of the relay R89E which energization or interruption will be timed to occur at the time when the same card passes the printing station. On the one hand the presence of an X-hole in a master card causes relay R15 to be energized to prevent punching and relay R89P to be energized to prevent printing, while, on the other hand, the X-hole prevents the energization of relay R15P to permit punching and causes the energization of relay R89P to permit printing.

Associated with the cycle delay circuits described above for controlling punching and printing are two class selectors which may be used for a variety of operations, such as the transposition of fields in reproducing and gang punching. For example, the master cards might have data punched in one group of columns which it is desired to punch in a different group of columns in detail cards. This requires a temporary shift in the connection between the brushes and punches while the master cards are passing the brushes PB and RB. The same impulses which control the relay R14P may also be used to control the class selection relays. There are two groups of class selection relays, one being associated with the punching side of the machine while the other is associated with the reading or reproducing side of the machine. The relay R34P controls one of the class selectors with respect to the reading side of the machine while the relay R33 is provided for control from the punch side of the machine.

It will be assumed that the punch side of the machine is in operation and that a class selector No. 1 is to be used for some purpose. A plug wire may be inserted between plug socket PS18 and plug socket PS11 for the X-brush PXB set in the column in which the X-hole will appear. When the master card containing the X-hole passes the X-brush PXB, a circuit will be set up to the relay R33P traced from line wire W1, contacts PC3 and R1D, common strip PXCS, X-brush PXB, the plug wire, and relay R33P, to line wire W2. Relay R33P closes contacts R33A and establishes a holding circuit for the holding coil R33H as follows: line wire W1, contacts PC2, wire W6, contacts R33A, and coil R33H, to line wire W2. Contacts R33C close and connect the relays R35, R36 to wire W6 in parallel with relay R33H. The energization of relays R33, R35, R36 in parallel causes the contacts R33B, R35B, R36B to close and the contacts R33D, R35D, R36D to open thus effecting a circuit transfer, the utility of which will be brought out hereinafter by means of specific examples. Since the coil R33H is held through the contacts PC2, selector No. 1 will be held in transfer condition only during the cycle in which the master card passes the punch brushes PB.

In the event it is desired to operate selector No. 1 from the reproducing side of the machine under control of an X-hole sensed by one of the brushes RXB, the plug wire may be inserted between a plug socket PS13 and the plug socket PS17, calling into play the relay R34P which will function in exactly the same way as relay R33P. The contacts R34A control a holding coil R34H and also contacts R34C in parallel with the contacts R33C so as to have the same effect. Since relays R33D, R34D operate independently and not together, the contacts R33B, R33D, R34B, R34D are connected as shown in the wiring diagram so as to have the same aggregate effect, notwithstanding their independent operation. This is not necessary for relays R35, R36 because these relays always operate when one of the relays R33P, R34P is operative.

Figure 22B:
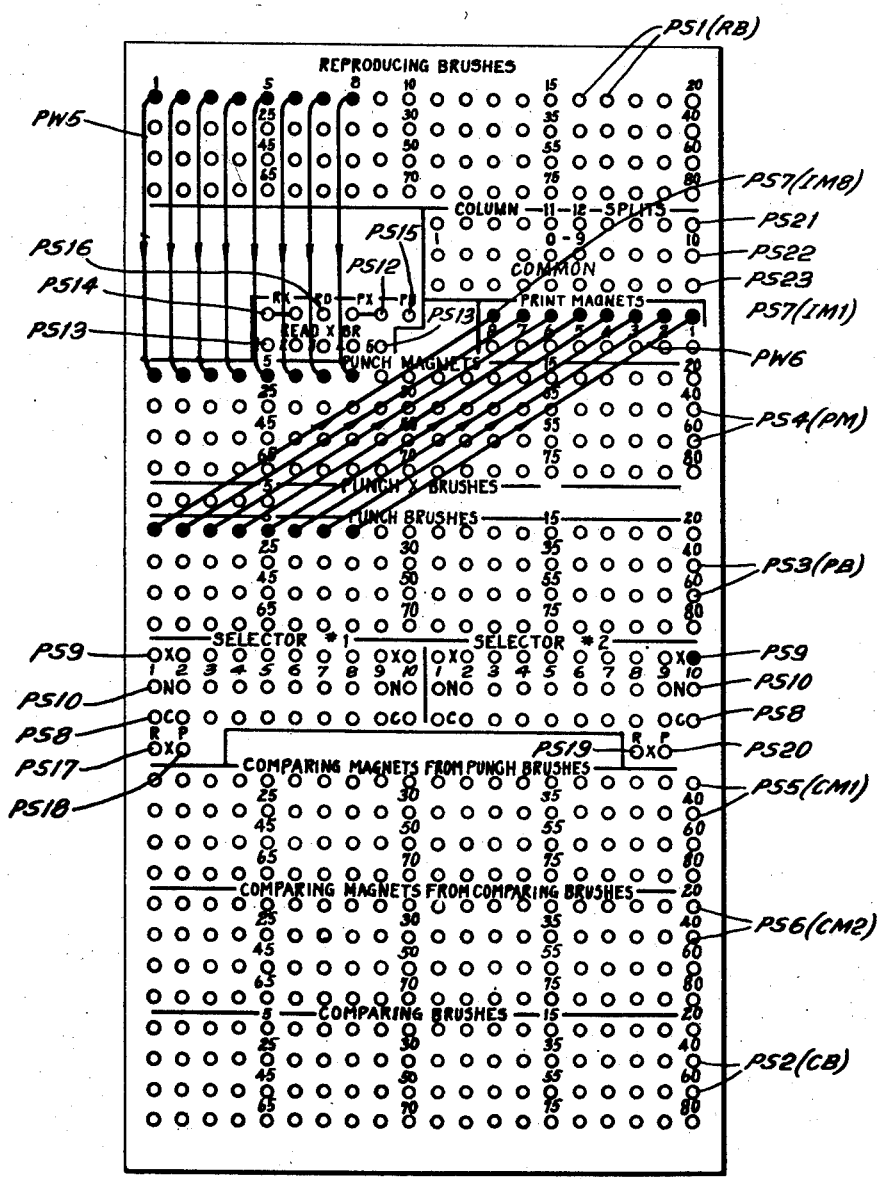
Figure 22C:
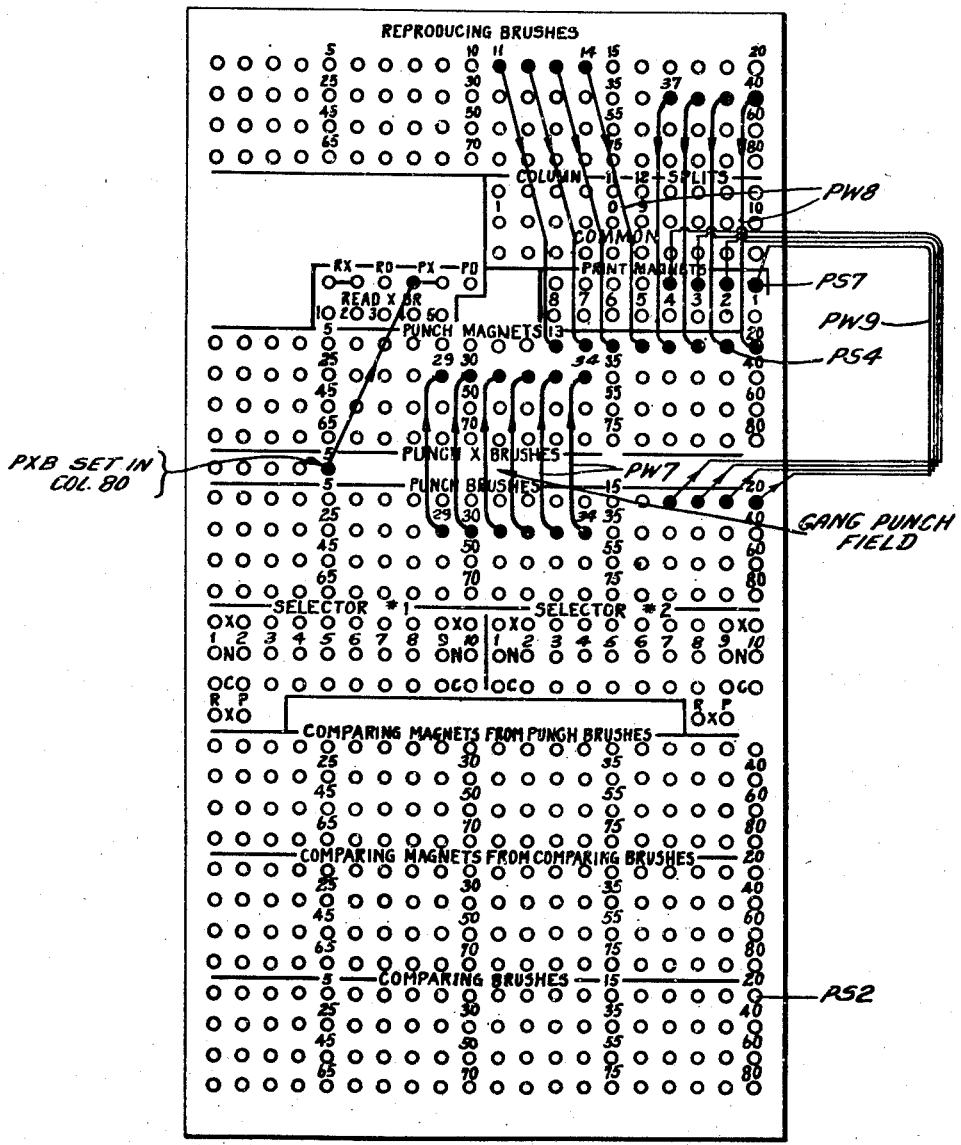

Under certain conditions it is desirable for the class selectors to be used to transpose data when gang punching. This requires a one cycle delay in the effect of the X-holes upon the class selector. In other words, the class selector should operate just before the card containing the X-hole passes the punch brushes PB instead of before passing the punches. This, of course, will happen during the next cycle after the master card has passed the punches. To obtain the cycle delay control plug wires are inserted between the plug sockets PS11, PS12 and between PS18, PS19 as shown in Fig. 22F, assuming that only the punching side of the machine is in operation. This is the form of plugging which would be used in the event that it was desired to transpose data in certain columns in the master card to different columns in the detail cards.

In this case it is necessary to delay the energization of relay R33P until the leading edge of the master card is about to pass the punch brushes PB. When the X-hole in the master card is sensed by the operative brush PXB, relay R14P will be energized and the printing and punching suppression controls involving relays R15P and R89P will be established as described above to prevent punching the master card and to prevent printing the number on the master card. While the master card is passing through the punch station the relay R16 will be energized as described above. This will occur approximately one cycle after the sensing of the X-hole by the brush PXB and, in addition to establishing the normal cycle delay circuits, will also by energizing relay R19P, cause the energization of relay R33P by a circuit traced from line wire W1, contacts CC6, R16B, the plug wire PW19 (Fig. 22F) between plug sockets PS15 and PS18, and relay R33P to line wire W2. The energization of relay R33P will have the same effect as before except that it will occur while the punches are approximately opposite the trailing edge of the master card. Thus during the following cycle, while the master card is passing the punch brushes, the contacts R33B, R35B, R36B will be held closed and will control a particular group of punches associated with columns other than the one in which the holes in the master card appear. This will be made clearer hereinafter by a specific example.

In the event that a similar control is required on the reading side of the machine the plug wires are inserted between plug sockets PS13, PS14, PS16, and PS17, respectively. In this case a group of relays will be called into operation which are similar in function to those described above to control printing and punching and to effect the energization of the relay R34P instead of relay R33P. Two systems of relays are provided with the two class selectors and the second system of relays operates in the same fashion as those already described. These relays are listed below along with their controlling cam operated contacts, the first column giving the relays which have been discussed above, while the second column gives the functional counter-part.

| | | | |
|---|---|---|---|
| PC2 | RC2 | R19 | None |
| PC3 | RC3 | R33P | R38P |
| PC4 | RC4 | R33H | R38H |
| R14P | R18P | R34P | R39P |
| R14H | R18H | R34H | R39H |
| R15P | None | R35 | R40 |
| R15H | None | R36 | R41 |
| R16 | R17 | W6 | W7 |

The switches S3, S5, S7 are collectively known as the "reproduce" switches and consist of a number of switches or contacts mechanically connected together so as to be operable as a unit. In other words, all may be thrown to the "on" or "off" position simultaneously. When the reproduce switch is set to "on" position, the machine is conditioned for using both sides of the machine, as for a reproducing operation, which may also entail gang punching, as will be seen hereinafter. When thrown to the "off" position the switches condition the machine for gang punching alone in which only the punch side of the machine is used. Various examples to illustrate the flexibility of operation of the machine will be given hereinafter, utilizing plug-board diagrams of a simple nature to indicate how the machine is plugged for different types of operations and for different functions.

Before proceeding with the description of the specific kinds of operation which may be performed the general operation of the machine will be explained to make clear how the printing circuits, cycle delay, and class selection controls operate. With reference to Figs. 22A and 22B, which show the method of plugging for simple gang punching and simple reproducing, respectively, both with interpreting, the various plug sockets which lead to controlling magnets or contacts and the brushes have been designated and are followed by the part to which they are connected or control enclosed in parenthesis. In order to simplify the tracing of the circuit, for example, the plug socket designation PS1 (Fig. 22A) is followed by the designation of the reading brush RB enclosed in parenthesis. The direction of current flow, assuming the line wire W1 is positive, will be indicated by arrow heads on the various plug wires.

With the exception of the plug sockets allocated to the "column splits" (Fig. 22A) and selectors Nos. 1 and 2, the plug sockets on the plugboard are either sources, that is impulse outputs, or control receptors (impulse inputs). The sources consist of the reproducing brushes, the RD and PD cycle delay sockets, the punch brushes, comparing brushes, and the X brushes. The inputs which receive impulses from the sources are the print magnets, the RX, PX cycle delay controls, the punch magnets, the R and P pickups for selectors Nos. 1 and 2, and the comparing magnets. The column splits and selectors Nos. 1 and 2 are controls which determine the direction of impulses which may be transmitted from the sources to the receptors. With these facts concerning the plugboard in mind it will be a relatively easy matter to trace circuits by means of the plugboard diagrams with relatively little reference to the wiring diagram. The letters R, P, and X in Figs. 22A to 22I means "reproducing," "punching," and "X-control." The letters RX, RD, PX, and PD may be taken to mean "read X," "reproducing delay," "punched X," and "punching delay." The letters X, N, C with respect to the selectors, denote "X punched cards," "non-X punched cards," and "common." The letters X and N designate the rows of plug sockets to which plug connections may be made when closed circuits are desired upon the occurrence of an X punched card and a non-X punched card, respectively. In other words, if it is desired that selector No. 1 close circuits from one of the sources on the plugboard when an X punched card is detected by a brush PXB or RXB, the C and X rows of plug sockets must be plugged. If the circuit is to be broken when an X-punched card is encountered then the N and C plug sockets will be plugged. The same general system of labels used on the plugboard have also been shown on the wiring diagram (Figs. 21A to 21E) for convenience in remembering the functions and relationships of the various controls.

The machine may be used for duplicating, that is reproducing, sets of cards either wholly or in part. In this operation each card fed from the hopper RH on the reproducing side of the machine controls the punches through brushes RB to punch cards on the punch side of the machine. The entire card or only a part of it may be reproduced according to how the machine is plugged. Fig. 22B illustrates how the machine may be plugged to reproduce columns 1 to 8 of cards placed in the reading hopper RH and to print the numbers appearing in this field upon the cards from hopper PH. For this operation both sides of the machine operate together without interruption as long as both the hoppers are kept supplied with cards. To effect punching, the reproducing brushes RB for columns 1 to 8 are connected by plug wires PW5 to the punch magnets PM corresponding to columns 1 to 8. Two alternative methods of plugging print magnets IM1 to IM8 may be used as desired. According to one scheme plug wires PW6 may be inserted to connect the punch brushes PB for columns 1 to 8 to the plug sockets PS7. This will cause the energization of the print magnets PM from the brushes PB in the cycle after the card is punched in the same way as described with reference to Fig. 22A, the circuits being traced the same.

According to the second scheme the plug wires PW6 may be inserted in the plug sockets PS2 for columns 1 to 8 to render the print magnets IM1 to IM8 responsive to the comparing brushes CB on the reading side of the machine. For this plugging arrangement the circuits which effect printing will be traced from line wire W1, contacts PC1, CC11 to CC14, RCL; common brush CCB, the contact roll CCR, the comparing brushes CB, plug sockets PS2, plug wires PW6, to the plug sockets PS7 and thence to magnets IM1 to IM8 as traced above in describing the operation of the printing mechanism. The punch magnets in both cases will be energized by the following circuits: line wire W1, contacts PC1, CC11 to CC14, RC1, RCL2; brush RCB, contact roll RCR, brush RB, plug socket PS1, the plug wires PW5 to plug sockets PS4 for columns 1 to 8, the punch magnets PM for columns 1 to 8, contacts R15C, R25D, to line wire W2.

Since the capacity of the printing mechanism as described herein is limited to eight positions, only eight figures can be printed upon the card. However, a greater number of columns may be plugged in the same manner as illustrated by the plug wires PW5 to duplicate the entire card if necessary, but, as a rule, it is seldom necessary to do this.

For the arrangement shown in Figs. 22A and 22B, it is not necessary to print only the data which is punched under control of the reproducing or punch brushes. The plug sockets PS7 may be plugged to any columns in which punched holes appear regardless of whether or not the data represented by these holes are to be gang punched or reproduced, as the case may be. For example, Figs. 22A and 22B have assumed for simplicity of description, that the card is only punched in columns 1 to 8. It is possible that the operation of gang punching, for example, may be carried out with reference to cards which have been previously punched such as with a serial number and that additional data are to be gang punched in the cards. It might be desired to print the serial number on the cards, but obviously it would not be desired to punch in the field in which the serial number appears as the cards would be mutilated. Thus in the case of Fig. 22A the number which is to be interpreted might appear in other columns, for example columns 21 to 28. In such a case the lower ends of plug wires PW1 (Fig. 22A) will be inserted in the plug sockets PS3 for columns 21 to 28 while the right hand ends of the plug wires PW2 will be inserted in the plug sockets PS3 for columns 1 to 8 in place of the plug wires PW1. This would result in gang punching columns 1 to 8 of Fig. 22A and printing from columns 21 to 28. In Fig. 22B, it would be merely necessary to shift the lower ends of plug wires PW5 to the plug sockets PS3 for columns 21 to 28 or to plug sockets PS2 for columns 21 to 28 according to which of the two alternative methods of control of the printing magnets IM1 to IM8 is desired as explained above.

The operations of reproducing and gang punching may be carried out together in two different ways. In one case, the master cards will be placed in the punch hopper interspersed with the proper numbers of cards which are not punched in the columns which are to be gang punched and the machine will be plugged as shown in Fig. 22C. In the second case the master cards will be placed in the hopper RH and will be interspersed with cards which are to be reproduced in part, at least, in the cards on the punch side of the machine.

The operation of the machine with respect to Fig. 22C will be described first.

In the punch hopper there will be placed the master cards interspersed with groups of detail cards which are to be gang punched under control of the master cards, that is, with respect to each group of detail cards which follows a given master card, certain common information is to appear which will be derived from the master cards and will be different for each group. On the reading side of the machine will be placed cards having certain data to be reproduced in the detail cards which are interspersed with the master cards on the punch side of the machine.

In other words certain data appearing in the first card from hopper RH is to be punched in the first detail card following the first master card fed on the punch side of the machine and so on. The feeding of cards on the reproducing side will be stopped while the master card is passing the punches since it is not desired to punch any data on the master card. However, when the master card passes the punch brushes PB it is desired to feed cards on the reproducing side of the machine since the first detail card following the master cards is to receive data from both the first master card and the first reproducing card. The data which appears on the master card will be repeatedly punched, that is gang punched, in the succeeding detail cards and for each of these detail cards a different reproducing card will be fed and will control punching of a corresponding detail card.

The machine is started in operation as described above where both sides of the machine are to be used. During the first cycle both feeds operate and advance cards from both hoppers PH, RH. During this first cycle the card levers DCL, RCL1, RCL2 close. Also the primary X-brushes PXB will sense the X-hole in column 80 of the master card which differentiates such card from the detail cards and will effect an energization of relay R14P in a manner described above. This will cause the contacts R14E to open. Since the contacts RCL1 also close, the contacts R4A will open, thus during the first card feeding cycle the reading clutch magnet RCM cannot be energized. However, the punch clutch magnet can still be energized and punch side of the machine will be effective to feed the master card past the punch brushes during the second cycle of the machine. Owing to the effect of relay R14 described above, contacts R15C will be opened during the second cycle and prevent punching of the master card.

At the end of the second cycle, relay R14H will be deenergized since the second card fed on the punch side will be a detail card lacking the X hole. Thus, during the second cycle of the machine, the relay R14E will be de-energized time enough to permit the energization of the reading clutch magnet RCM in parallel with the punch clutch magnet PCM. During the third cycle, in which the first detail card and the first reproducing card will be fed together, the detail card will be fed past the punches and the reproducing card will be fed past brushes RB, and the first master card will be fed past the brushes PB.

With the plugging arrangement shown in Fig. 22C numbers punched in columns 29 to 34 in the master card will be punched in a corresponding column of the first detail card.

At the same time numbers punched in columns 37 to 40 and 11 to 14 of the reproducing card will be punched in a field comprising columns 13 to 20 in the detail card and the numbers in columns 37 to 40 will be printed by positions 1 to 4 of the printing mechanism. The circuits involved in effecting these operations will now be traced. The punching circuits extend from line wire W1, contacts PC1, CC11 to CC14, R7B, brush PCB, contact roller PCR, punch brushes PB, the plug wires PW7, the punch magnets PM for columns 29 to 34, and contacts R15C, R25D, to line wire W2. The reproducing circuits are traced as follows: line wire W1, contacts PC1, CC11 to CC14, RC1, RCL2; brush RCB, contact roller RCR, brushes RB, plug wires PW8, punch magnets PM for columns 13 to 20 and contacts R15C, R25D, to line wire W2. Printing circuits are also established to the printing magnets IM1 to IM4, as described above, through the plug wires PW9 from brushes PB for columns 17 to 20 traced as above. The second detail card, of course, will be punched in columns 29 to 34 under control of the holes in the same columns of the first detail card. Also the second detail card will have the data appearing in columns 37 to 40, inclusive, of the second reproducing card punched in columns 13 to 20, of the second detail card. For each detail card punched there will be fed a corresponding reproducing card until the next master card is fed to the punch brush PXB in which case the feeding of reproducing cards will stop for one cycle to allow the master card to pass the punches and to prevent the detail card preceding a master card from punching the succeeding master card as described above.

Figure 22D:
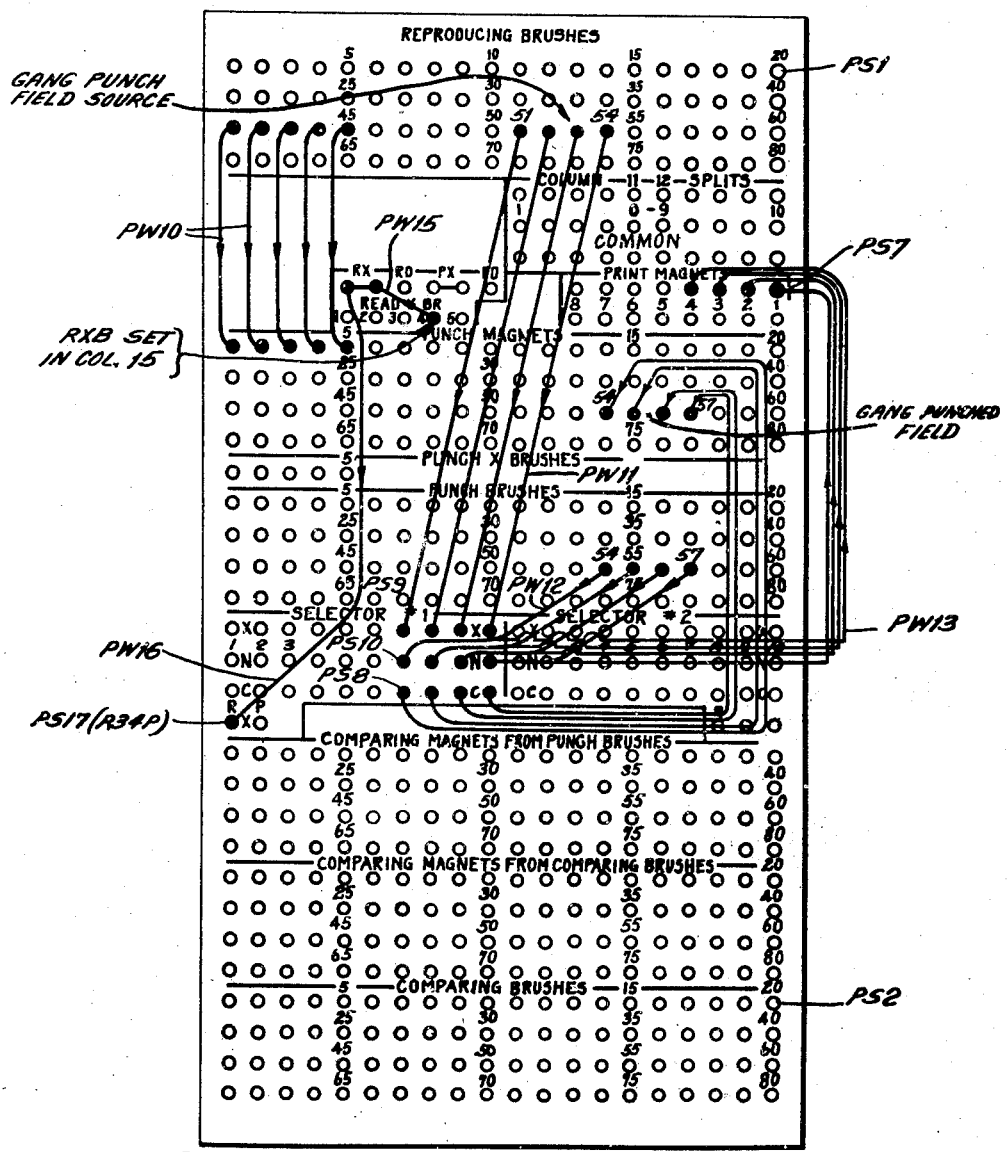
Figure 22E:
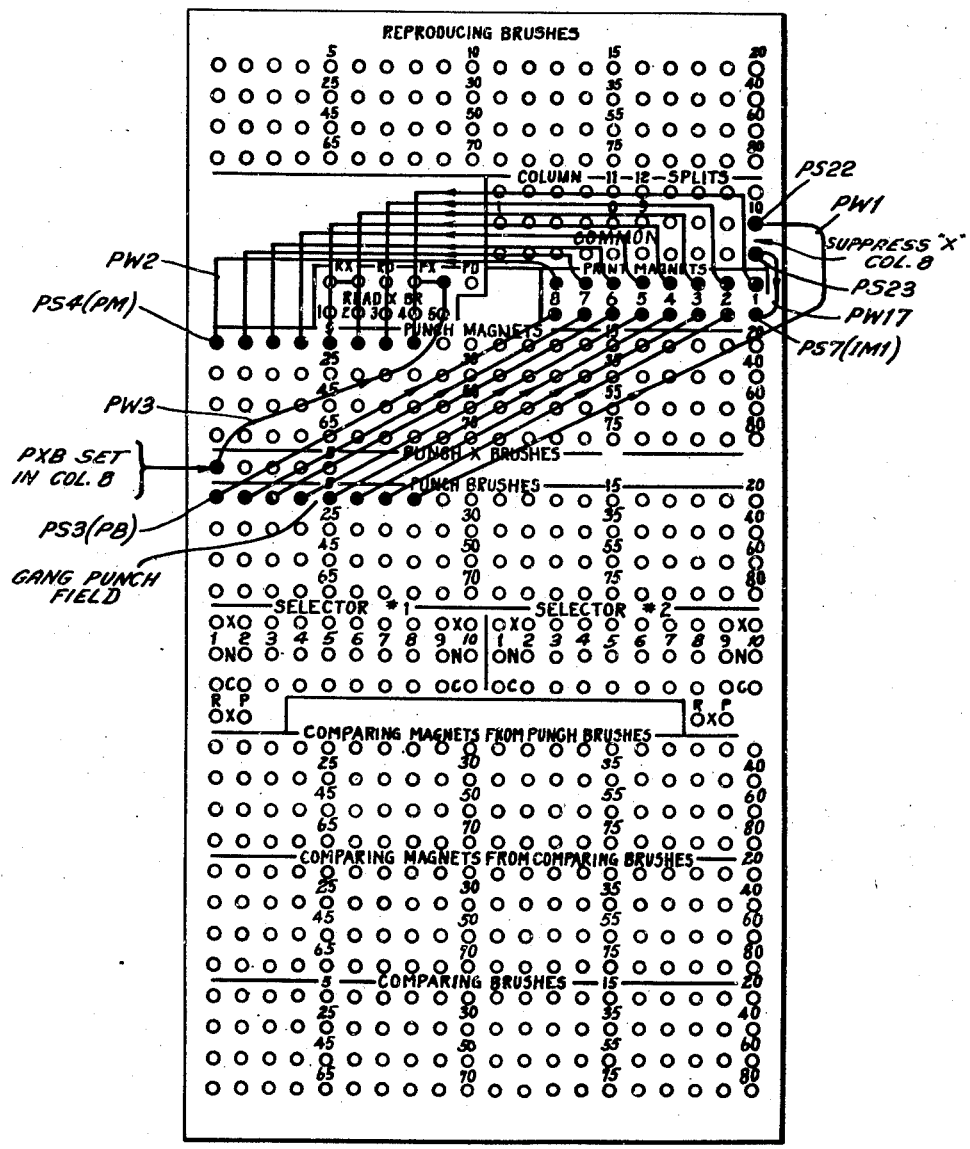
Figure 22F:
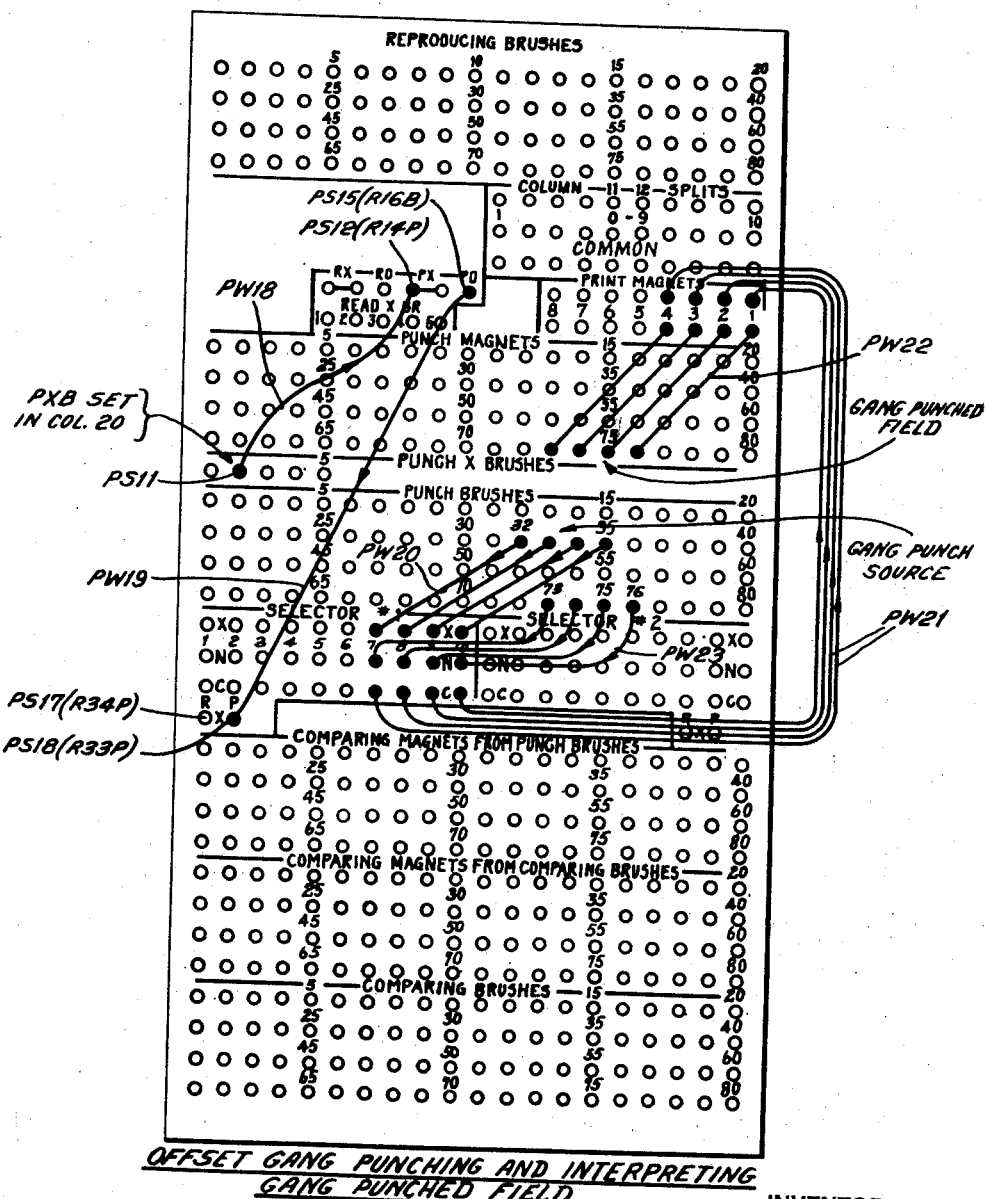

With the method of plugging for the second case shown in Fig. 22D, the master cards are interspersed with other cards on the reading side of the machine and there may be any number of cards in each group which follows a master card. Owing to the fact that it is not possible to stop the punching mechanism without stopping the reading mechanism and the fact that no means is provided for storing data punched in the cards on either side of the machine, it is necessary in this case to punch additional cards corresponding to the master cards. In the present case, insofar as the feeding of cards is concerned the two sides of the machine run synchronously and neither side stops when a master card is fed. In this type of operation, when a master card passes the brushes RB, data therein appearing in columns 51 to 54 is to be punched in a spacing card on the punch side of the machine which will be transferred during the next cycle from the spacing card to a detail card. In other words, data occurring in columns 51 to 54 of a master card is to be ganged punched and in the present case will be arbitrarily transferred to columns 54 to 57 inclusive of the detail cards corresponding to the group of reproducing cards following the master card. Data appearing in columns 41 to 45 of the reproducing cards appearing after the master card is to be transferred to the corresponding detail cards and will be arbitrarily punched in columns 1 to 5 inclusive of the detail cards.

Since it is impossible to suppress punching with respect to one field or group of columns of a detail card without also suppressing all punching, it is necessary to use one of the selectors to prevent punching the spacing cards under control of the preceding detail card and at the same time permit punching of the spacing card under control of the master card. The plug wires PS10 in Fig. 22D connect the reproducing brushes RB for columns 41 to 45 to the punch magnets for columns 1 to 5 whereby data is transferred from columns 41 to 45 of the reproducing cards to columns 1 to 5 of the detail cards by circuits traced the same as with respect to Fig. 22B involving the plug wires PW5. The plug wires PW12, PW13 connect the punch brushes PB for columns 54 to 57 to the first four positions of the printing mechanism and to the punch magnets PM for columns 54 to 57 inclusive.

With reference to Fig. 22D, it will be noted that the effect of the plug wires PW12, PW13 is to normally connect the punch brushes PB for columns 54 to 57 to the first four positions of the printing mechanism and also to the punch magnets for columns 54 to 57 through closed contacts R36D of selector No. 1. In other words, in the absence of an X-hole in a master card effecting a change in the status of selector No. 1, the normal control of the first four positions of the printing mechanism and the punch magnets for columns 54 to 57 will be from the punch brushes PB for columns 54 to 57, the circuits for the punch and print magnets being maintained through contacts R36D which are normally closed.

When a master card is fed on the reading side of the machine, the X-hole in the master card will cause a circuit to be established from line wire W1; contacts RC3, R4B; the common strip RXCS, the brush RXB set in column 15, plug wire PW15, and relay R18P, to line wire W2. Relay R18P has no special effect in the present case. The brush RXB also sets up a parallel circuit through a plug wire PW16 to the relay R34P which takes effect immediately and causes selector No. 1 to become effective through the energization of relays R34P, R35P, R36P as explained above.

The closure of contacts R36B, which are the only ones plugged of the groups R34B, R35B, R36B, causes the punch magnets for columns 54 to 57 to be controlled for one cycle by the reading brushes RB for columns 51 to 54 through the plug wires PW11, PW13, through contacts R36B. Thus the number which appears in columns 51 to 54 in the master card will be punched in the corresponding spacing card.

Since relay R14P is not energized in this case, there will be no interruption in the feeding of cards on either side of the machine. Thus, the master card will be fed to the comparing brushes CB and the spacing card will be fed to the punch brushes PB.

The reproducing card following the master card will not have an X-hole, and selector No. 1 will be de-energized to restore the control of the punch magnets for columns 54 to 57 and the printing magnets to the punch brushes for columns 54 to 57. Thus during the cycle in which the spacing card passes brushes PB, the number which has been punched in the spacing card under control of the master card will now be punched in the first detail card. Also during this cycle, the reading brushes RB for columns 41 to 45 will control punching in columns 1 to 5 of the first detail card through the plug wires PW10. The effect of selector No. 1 is to disconnect the punch brushes for columns 54 to 57 from the punch magnets for the same columns to prevent punching the spacing card under control of the last detail card of a group and at the same time permit the punching in the spacing card of the number appearing in the master card which is to be gang punched in the detail cards.

The spacing cards usually will only contain the data which is to be gang punched and will subsequently be removed by a sorting operation. This is easily done by utilizing X-holes in the spacing cards or detail cards as a means of differentiating the cards. Since detail cards usually have at least one X-hole which is used for special control purposes and this X-hole will ordinarily be either reproduced or gang punched by any of the methods described above, it will be possible to segregate the spacing cards from the detail cards by this means and no additional plugging in Fig. 22D will be necessary to make it possible to subsequently separate the spacing cards from the detail cards. For example, an X-hole might appear in one or more of columns 41 to 45 or 51 to 54 of the reproducing and master cards, respectively, and would be punched in the detail cards.

In case it should be necessary to punch X-holes in the spacing cards as a means for separating them from the detail cards, a plug wire may be inserted between plug socket PS1 for column 15 in which the X-hole appears, and a plug socket PS4 for a column in which no other hole is likely to appear. This is not absolutely necessary as will be seen hereinafter in reference to the selective suppression of punching through the split column controls.

Figure 22D shows the plugging of the machine necessary to print the data which is gang punched. In the event that it is desired to print data which is not gang punched but which may be punched in the detail card under control of a reproducing card, the extreme upper ends of split plug wires PW12 may be removed from the plug sockets PS8 and replaced by other plug wires inserted in the proper plug sockets PS2 corresponding to the brushes CB which will sense the data to be reproduced under control of the reproducing card. In Fig. 22D, the data in columns 41 to 45, for example, could be printed by placing plug wires in plug sockets PS2 for columns 41 to 45 and plug sockets PS7 for positions 1 to 4 of the printing mechanism.

It is desirable to make provision for the transfer of X-holes and/or suppression of punching X-holes in detail cards. For this purpose there is provided two column split relays designated R11, R12 which operate in unison and may be plugged to prevent punching the X-hole in the detail card. The relays R11, R12 are energized once per cycle by contacts CC4, from just after the "9" point to a point between "11" and "0" of the cycle (Fig. 23). These relays control contacts R11A, R11B and R12A, and R12B. Thus the contacts R11A are closed at the "11" and "12" points in the cycle when there are likely to be "11" or "12" holes in the card, while the contacts R11B, R12B are closed from "0" to "9". These contacts may be plugged in various ways to suppress or enable punching in particular column.

It might be desired, for example, to suppress punching in the detail cards the X-hole which appears in the master card. Since the X-hole is very likely to appear in the same column with a hole in the "0" to "9" positions forming part of numerical data which must be reproduced in the detail cards, the suppression of the punching of the X-hole must be effected without suppressing the punching of the second hole.

As an illustration, let it be assumed that the punching side of the machine is being used for gang punchin gas in Fig. 22A, and that it is desired to suppress the punching of an X-hole appearing in column 8. The plug socket PS3 for column 8 will be connected by plug wire PW1 (Fig. 22E) to the "0-9" plug socket PS22 of column split relay R12, while the "C" or "common" plug socket PS23 will be connected by a plug wire PW17 to the plug socket PS7 for position 1 of the printing mechanism. From the "0" to "9" point in the cycle in which the master card is sensed by brushes PB, a circuit may be established from the brushes PB1 for column 8, through the plug wire PW1, contacts R12B, and plug wires PW17, PW2, to the punch magnet PM for column 8 to punch numbers "0" to "9." At "11" and "12" of this cycle the contacts CC4 will be holding energized the relays R11, R12 holding contacts R12B open. Thus, during the first part of the cycle, when the "11" index-point position is sensed, no circuit can be established through the X-hole because the contacts R11B will then be open. If there should happen to be a "1" hole in column 8 then the opening of contacts CC4 between "11" and "0" will permit the contacts R11B to close. Then at the "1" point in the cycle the "1" hole in the card will set up the normal punch controlling circuit to punch the "1" hole in the card. Where the X-hole appears in the master card in a column which is devoted solely to the X perforation, suppression of X punching is obtained by merely failing to plug the punch magnet for that column to the proper punch brush. Thus, in Fig. 22A it may be assumed that column 10 of the detail cards is not to be punched and the failure to plug the brush PB for column 10 to the punch magnet for this column, suppresses the X-hole.

The class selectors which are designated selector No. 1 and selector No. 2 respectively, may be utilized to cause gang punching to be effected in the detail cards under control of perforations in a different field in the master cards. In other words, data in one field of a master card may be transferred, that is "offset," to another field in the detail card and thereafter gang punched into following detail cards until another master card is sensed. Figure 22F shows how the machine may be plugged to effect this type of operation which conveniently may be called "offset gang punching" because of the fact that the field which is punched may be displaced longitudinally of the card or offset relative to the field in the master card. With the arrangement shown in Fig. 22F the master card has a field comprising columns 32 to 35 which is to be punched in a field comprising columns 73 to 76 in the detail cards. In other words, the controlling field is offset 41 columns to the left of the field to be punched.

When the first master card, which will be punched with an X-hole in column 20 is sensed, the relay R14P will be energized through the plug wire PW18 (Fig. 22F) and the brush PXB set in column 20. This will, of course, initiate the cycle delay circuits described above which will control suppression of punching and printing with respect to the master card. Also as described above, the closure of contacts R16B during the cycle in which the master card passes punches will cause energization of relay R33P by way of plug wire PW19. In other words, the energization of selector No. 1 will be delayed one cycle and will remain energized while the master card passes the brushes PB and controls the punch magnets PM. The energization of relay R33P of course, causes relays R35 and R36 to be energized as explained above thereby closing the contacts R36B to connect the punch brushes for columns 32 to 35 to the first four positions of the printing mechanism and to magnets PM for columns 73 to 76 through the plug wires PW20, PW21, PW22 and the contacts R36B. Thus the data which appears in columns 32 to 35 in the master card will be punched in columns 73 to 76 of the detail card and the printing mechanism will be set. However no printing will be effected upon the master card during the following cycle because of the fact that the relay R89H will be energized during this cycle to suppress printing in the manner explained above. During the next cycle, when the master card passes the printing station, selector No. 1 will be deenergized and the punch brushes for columns 73 to 76 will be connected to the printing mechanism and punch magnets for columns 73 to 76 through the plug wires PW23, the contacts R36D, and plug wires PW21, PW22. During the following cycle the first detail card will pass the printing station and the data which appeared in columns 32 to 35 of the master card and which has been transferred to columns 73 to 76 of the detail card will be printed upon the first detail card.

Figure 22G:
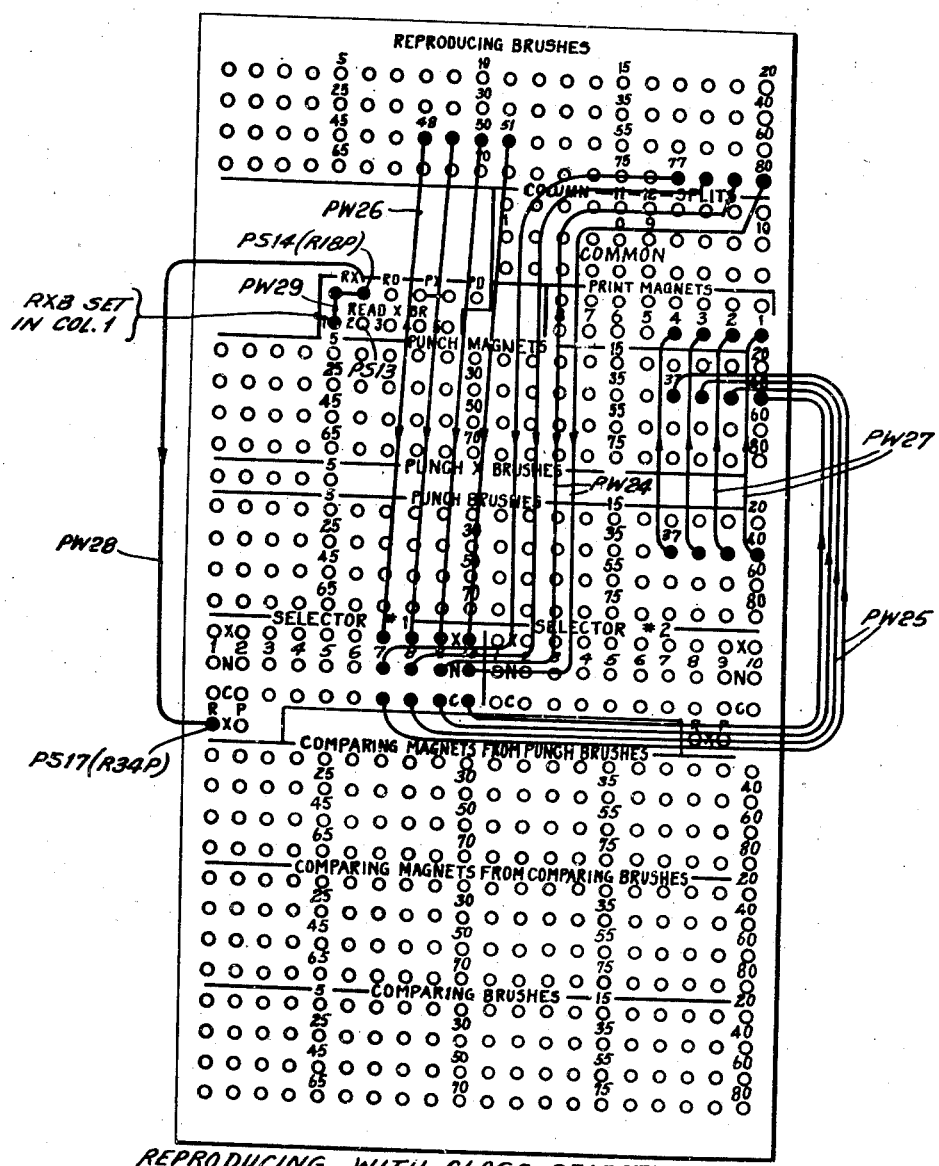

In Fig. 22G there is shown an arrangement whereby, when the machine is reproducing, the punch magnets corresponding to a certain field, say comprising columns 37 to 40, may be temporarily controlled by reproducing brushes other than the ones which normally control reproducing. With the arrangement shown in Fig. 22G the punch magnets PM for columns 37 to 40 are connected by plug wires PW24, PW25 through the contacts R36D, to the plug sockets PS1 of the brushes RB for columns 77 to 80 whereby, under normal conditions, data appearing in columns 77 to 80 of a reproducing card will be transferred to columns 37 to 40 of a card on the punch side of the machine. Contacts R36B are connected by plug wires PW26 to plug sockets PS1 for columns 48 to 51. With this arrangement, no master cards are involved on either side of the machine. The first four orders of the printing mechanism are connected to the punch brushes for columns 37 to 40 by plug wires PW27.

An example of the use of such a system of plugging is the case where it is necessary to redesign the cards used in the accounting system whereby, for instance, the account number which appears in say columns 48 to 51 of some cards and columns 77 to 80 of others, is to be placed in the future in columns 37 to 40. It may be found necessary to mix both kinds of old cards and duplicate them, that is, prepare a new set of cards in which the account number appears in columns 37 to 40. In this case, those old cards in which the account number appears in columns 48 to 51 will be differentiated from the other reproducing cards by an X-hole.

The machine will operate in the same general manner as described with reference to Fig. 22B, except that unless the X-hole appears in a card, the reproducing circuit will extend from the reading brushes RB for columns 77 to 80, through the plug wires PW24, contacts R36D of selector No. 1, and plug wires PW25 to the punch magnets for columns 37 to 40. As soon as an X-punched card, which will have the account number in columns 48 to 51, is sensed, the X-hole in such a card will cause the energization of relay R34P through the plug wires PW28, PW29 and also will cause the energization of relay R18P through the plug wires PW29. In this case relay R18 has no effect, while the energization of relay R34P causes contacts R36B to close thereby connecting the punch magnets for columns 37 to 40 to the brushes RB for columns 48 to 51. This transfer of the punch magnets to the brushes RB for columns 48 to 51 is maintained during the cycle in which the X-punched card passes reading brushes RB. The circuits for the punches is traced from the brushes RB through the plug wires PW26, contacts R36B, and plug wires PW25, to the punch magnets PM for columns 37 to 40. Thus the number which appears in columns 48 to 51 is reproduced in columns 37 to 40 of a detail card on the punch side of the machine. During the next cycle the detail card passes the punch brushes PB and set the printing mechanism for the same data by way of the plug wires PW27.

Figure 22H:
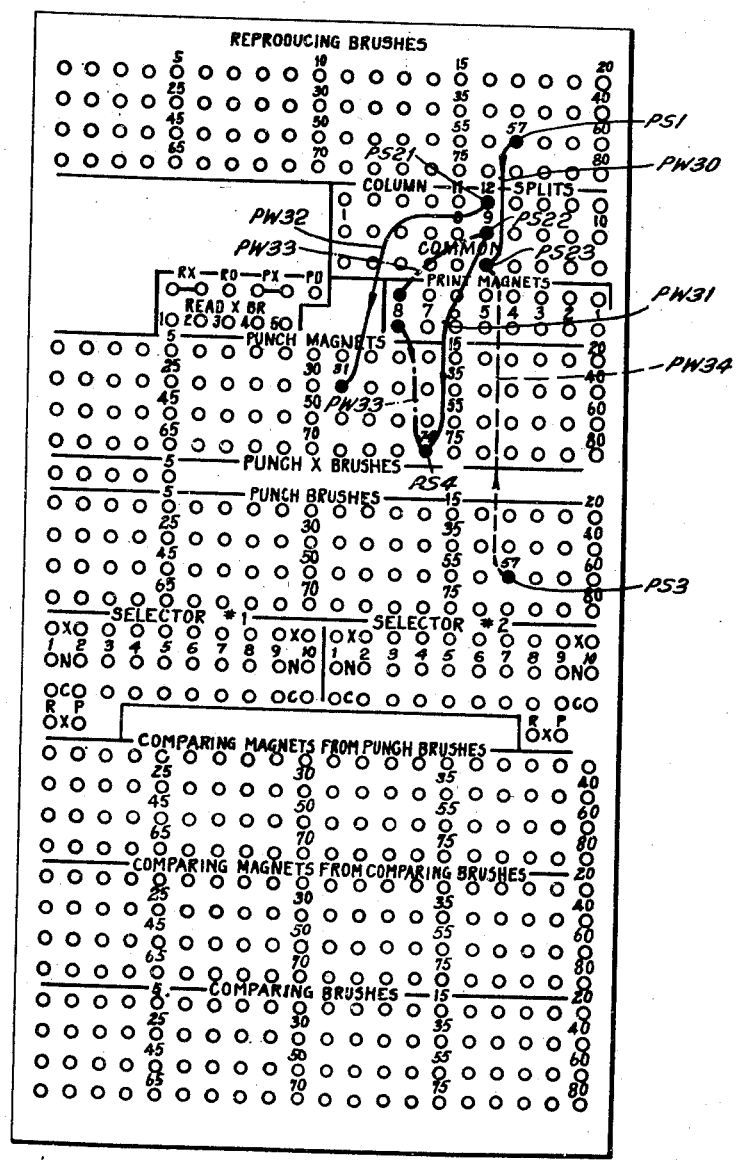
Figure 221:
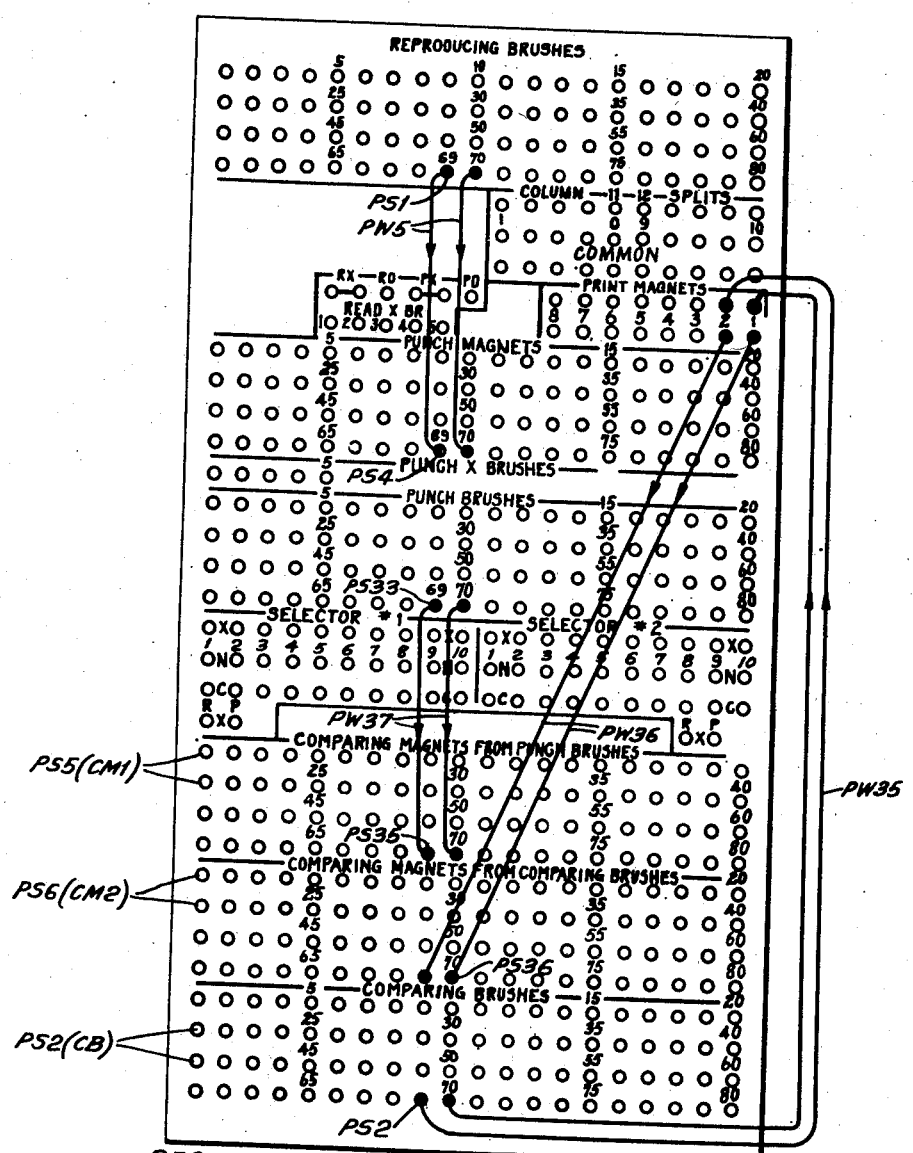

In some cases it is desirable to transfer an X-punching in a given column of a reproducing card to a different column of the card which is being punched, but at the same time transferring to the column in the punched card corresponding to the given column any other holes in the 0 to 9 positions and interpret such holes. In Fig. 22H there is shown different methods of plugging the machine to effect the transfer of the X-hole under the conditions of interpreting and gang punching. This operation requires the use of the column split relays R11, R12. The plugging shown in solid lines in Fig. 22H illustrates how the impulses transmitted through "0" to "9" holes appearing in column 57 of a reproducing card is delivered by way of plug wires PW30, PW31 and the closed contacts R11B or R12B to the punch magnet PM for column 74. An X-impulse in column 57 of the reproducing card will be transmitted through plug wires PW30, PW32 and the contacts R11A or R12A to the punch magnet PM for column 31. Thus, the holes forming part of numerical data will be transferred from column 57 in the reproducing card to column 54 of the card being punched, while the X-hole in column 57 will be reproduced in column 31 of the card being punched.

If it is desired to interpret the numerical data at the same time as it is punched, the solid line plug wire between plug sockets PS22 and PS4 will be replaced by the plug wires PW33 shown by the dot-dash lines to enable the print magnet IM8 for position 8 of the printing mechanism to be energized in parallel with the punch magnet for column 74.

When gang punching is being effected, the dotted line plug wire PW34 to plug socket PS3 will be used instead of the one between plug sockets PS23 and PS1.

It will be understood that the foregoing arrangement may be used in conjunction with any of the arrangements disclosed in Figs. 22A to 22G as a substitute for the direct plugging for any particular column of a reproduced or gang-punched field. For example, in Fig. 22A, the upper end of any of the plug wires PW1 could be inserted in the plug socked PS23, the dotted arrangement of PS34 in Fig. 22H being used in this case instead of the solid line plug wire PW30, and the remaining two plug sockets PS21, PS22 plugged as shown in Fig. 22H to the proper plug sockets PS4.

The machine may be plugged to reproduce, interpret, and compare the reproduced card with the reproducing cards, shown in Fig. 22I. In this figure only two columns of plug wires are shown in order to simplify the explanation. With this arrangement, the operation of the machine is the same as with respect to Fig. 22B insofar as reproducing the data in the reproducing cards is concerned, the plug wires PW5 in Fig. 22I having the same function as in Fig. 22B. As explained with reference to Fig. 22B, as an alternative method of plugging, the plug wires PW35 place the printing mechanism under control of the comparing brushes CB instead of the punch brushes PB. The plug wires PW36 place the comparing magnets CM2 under control of the comparing brushes CB through the plug wires PW35 while the comparing magnets CM1 are placed under control of the punch brushes PB by means of the plug wires PW37.

After each reproducing card has effected the punching of a new card by way of the plug wires PW5, both the reproducing card and the correspondingly punched or reproduced card pass the brushes CB and PB in synchronism. If the cards are punched identically, the corresponding magnets CM1, CM2 will be energized together by way of the corresponding plug wires PW35, PW36, PW37 for each column, with the result that no change will occur in the comparing mechanism as described in Patent No. 2,174,702. Thus the master contact CMC1 will remain closed and permit the machine to continue in operation for another cycle. However, if it should happen that the reproducing card and punched card do not agree in one or more columns both magnets CM1, CM2 for the disagreeing columns will not be energized together with the result that the comparing mechanism will reverse the status of the master contacts CMC1, CMC2. The closure of the contacts CMC2 causes a circuit to be established from line wire W1; contacts KC, DC, CMC2; and the signal light SL to line wire W2. The opening of contacts CMC1 interrupts the basic running circuit and causes the feeding of cards to stop.

Also as explained in Patent No. 2,174,702, a mechanical indicator is operative to tell the operator in which column or columns the disagreement occurred. This gives the operator the opportunity to remove the non-agreeing cards and investigate the reason why the card was not punched in exact agreement with the corresponding reproducing cards. With the stopping of the machine by the opening of the contacts CMO1 the contacts R10B close and energize relay R25 in parallel with the signal light SL. Relay R25 in turn closes contacts R25C and establishes a holding circuit for itself and at the same time opens contacts R25B, R25D.

The contacts R25B are in parallel with the contacts R1B which open as soon as the card lever relay R1 is energized. The relay R1, which is controlled by the die card lever contacts DCL, remains energized when cards continue to feed from hopper PH. Thus, after the machine is started in operation, provided the hopper does not become exhausted of cards, the contacts R1B will remain open whereby the subsequent opening of contacts R25B has the effect of preventing the operator from starting the machine by means of the start key and contacts STC. Also, when both hoppers contain cards, both relays R3 and R6 will be energized and the contacts R3E, R6D will be closed. Contacts R25D open the comparing and punching circuits. Thus the machine cannot be started by the operator until the comparing mechanism is reset manually.

As explained in Patent No. 2,174,702 a handle is provided by means of which the comparing mechanism may be manually reset to effect the reclosure of contacts CMC1 and the opening of contacts CMC2. When this is done by the operator the signal light SL and relay R25 will be deenergized permitting contacts R25B, R25D to reclose. This enables starting of the machine by means of the start key contacts STC in the usual way.

While there has been shown and described and pointed out the fundamental novel features of the invention as applied to a single embodiment it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine controlled by records in which data is represented by designations in columns of index-point positions, each column having a row of index-point positions representing different digits; a record sensing device for traversing a column to sense the index-point positions therein successively to detect a single designation placed in any of the index-point positions of such column; a type member having two sets of type thereon, one set of type being spaced at intervals and corresponding to the first half of the index-point positions sensed by said device, the second set of type representing the other half of the index-point positions in said column, said second set of type being interspersed with the first named types, both sets being in the same order as the index-point positions occur in said column, a storage device controlled by said sensing device for storing representations of the designations occurring in the first half of the index-point positions while the sensing device is traversing said first half, and means coacting with said storing device and with said sensing device and operative while the sensing device is sensing the second half of said designations to set said printing member to any of the positions represented by designations in the record column.

2. In a machine controlled by records having data represented by designations in columns of index-point positions, each column having index-point positions representing a series of digits, one of said positions containing a designation to represent a selected digit; means to sense said designations in a single continuous cycle, means controlled by the sensing means and operative during one half of said cycle to store representations of said digits, a printing member movable between two limiting positions during the other half of the cycle while the sensing device is sensing the remaining index-point positions, and means controlled alternatively by the sensing device or by the storage device for stopping said printing member in a position represented by either a stored designation from the first half or by a designation in the second half of the column.

3. In a machine of the class described having means to feed record cards past a punching station and a record analyzing station, said punching station including a row of punches for punching one row of index-point positions of the same value at a time, said record sensing station having a row of sensing elements for sensing a row of index-point positions also of the same value in one card while the corresponding row of index-point positions is passing said punch station; operating means for said punches controlled by said sensing means; printing members, each having two sets of types, one set corresponding to a first group of index-point positions sensed in order by said elements and punched in the same order by said punches, the other set being interspersed with the second set and corresponding to the remaining positions sensed by sensing means and punched by said punches, a storage device for storing representations of designations in the first-half of the index-point positions, and means for setting said printing members coacting with said storage device and said sensing means and operative only while the punching mechanism is punching designations in the second set of index-point positions.

4. In a machine controlled by records in which data is represented by designations in columns of index-point positions, each column having index-point positions representing the digits 0 to 9 inclusive, a typewheel having a set of types corresponding to the digits 0 to 4 inclusive in the order named and having interspersed with these types other types corresponding to the digits 5 to 9 inclusive and in the same order, a record sensing element for traversing said column of index-point positions in numerical order, a designation storage device controlled by said sensing element when it is traversing the 0 to 4 index-point positions to store the value of a designation in the 0 to 4 group of index-point positions, and means for moving said typewheel in any one of the positions corresponding to the index-point position, said moving means being controlled directly by the sensing element or indirectly by the sensing element through said storage device while it is sensing the 5 to 9 group of index-point positions.

5. In a machine of the class described a record sensing element for traversing successively a series of index-point positions in a record column; a typewheel having a row of types in two sets, one set being interspersed with the other and corresponding to one sequentially sensed set of index-point positions in mid column and the other set being interspersed with the first set and corresponding to the remaining index-point positions, means controlled by said sensing element while it is sensing the index-point positions corresponding to the first set for storing the representations of any designations in the first set of index-point positions, and typewheel moving means alternatively controllable by the record sensing element directly or by the storage device while the record sensing element is sensing the index-point positions corresponding to the remaining set.

6. In a machine controlled by records in which data is recorded by means of data designations, each disposed in any one of a series of index-point positions arranged in a column; a sensing device operative in a single cycle of operation of the machine to traverse said column; a printing mechanism including a printing device having a series of types, one type for each of said positions, said printing device being settable during a small portion of said cycle to place any of said types in printing position, and including a setting control element controllable by said sensing device during the setting portion of said cycle, and data representing means capable of controlling said element in cooperation with the sensing device during the setting period and said printing device being settable, under control of said sensing device while the latter is sensing positions other than those sensed during said small portion of the cycle, to represent any designation in said other positions.

7. In a machine controlled by records in which data is recorded by means of single designations differentially disposed in a column of index-point positions representing different characters, each character of said data being represented by a single designation in a single column; record sensing means, including an element for each column for successively traversing such column to detect said single designation; printing wheels, one for each column, each wheel having one group of types arranged on its periphery at spaced intervals and corresponding to a first sensed group of index-point positions in which group a designation may occur and also having another group of types interspersed with the first group of types and corresponding to the remaining index-point positions of said column in which alternatively said single designation may occur; means controlled by the sensing means while it is sensing the second group of index-point positions for setting the printing wheels according to the positions of designations which may occur in the second sensed groups of designations, and additional means set by the record sensing means while it is sensing the first groups of designations and operative, while the sensing means is sensing said second group of designations, to control the setting means to set the type wheels according to the interspersed types, whereby to effect printing from either the interspersed types or from the types of the first group, according to the positions of the designations.

8. A machine controlled by records having data designations disposed in a plurality of columns on said records, each column containing a row of index-point positions representing different characters and containing a single designation differentially disposed in said index-point positions to represent any one of said characters; a record sensing device for traversing said columns to sense the index-point positions successively, one at a time, in the order of their arrangement in said columns; printing mechanism including a series of type elements, each type element corresponding to one of said columns and having two groups of types disposed in a single row, one group of types corresponding to a predetermined number of the index-point positions first sensed by the sensing device in which group the single designation may appear and having the types of the second group corresponding to the remaining index-point positions in said column and interspersed in the order of sensing said remaining index point positions with the types of the first group, in which remaining groups of index point positions said designations may appear as an alternative, said printing mechanism including means to set the type elements under direct control of the sensing device to represent any of the character designations which may appear in the second groups of index-point positions; and a storing device settable under control of the sensing device while it is sensing the index-point positions, and subsequently operative, while the sensing means is sensing the remaining index-point positions of all said columns to set the type elements according to designations which may have appeared in the groups of index-point positions first sensed.

9. In a machine controlled by records having rows of index-point positions representing different characters in each of which rows may appear a single designation at a given index-point position to represent a given character, record sensing means including a sensing element for each column and traversing said column from one end to the other to sense the positions of said single designations in said rows; printing mechanism including a type member for each row having a row of types corresponding to a predetermined number of the index-point positions first sensed by the sensing elements and types interspersed with the first named types corresponding to the remaining index-point positions traversed by the sensing means after said sensing means has traversed said predetermined number of index-point positions, and including means controlled by the sensing means while it is traversing the remaining index-point positions for arresting the type members in positions in which selected ones of said first named types are at the printing line, according to whether or not any single designations occur in the second group of index-point positions; and storage means set under control of the sensing means while it is traversing said predetermined index-point positions, and subsequently operative, while the sensing means is traversing the remaining index-point positions, to arrest said type wheels with selected ones of the interspersed types at the printing line according to the positions of such single designations as may occur in the predetermined number of index-point positions.

10. In a machine controlled by records having columns of index-point positions corresponding to characters, in which each column may contain a single designation in any one of said index-point positions to represent the character corresponding to such index-point position; record sensing means having a sensing element for each column and traversing such column from one end to the other to detect the single designation which may appear in such column; printing mechanism including a printing member for each column of a group of columns in which data to be printed is recorded by said designations, each printing member having a continuous row of types in which alternate types correspond to the characters represented by a group of index-point positions last sensed by the sensing means and the remaining types correspond to a group comprising the remaining index-point positions first sensed, said printing mechanism also including means controlled by the sensing means while it is sensing the first named group of designations for selectively stopping said members to present the different alternate types at a printing line when said single designations occur in the first named groups of index-point positions, and additional means for controlling the stopping means while said first named group of designations is being sensed to present any of the remaining types at the printing line when said single designations occur in the groups of index-point positions first sensed, said additional means being preset under control of the sensing means while the latter is sensing the second named group of index-point positions.

11. In a machine controlled by records having columns of index-point positions corresponding to characters, in which each column may contain a single designation in any one of said index-point positions to represent the character corresponding to such index-point position; record sensing means having a sensing element for each column and traversing such column from one end to the other to detect the single designation which may appear in such column; printing mechanism including a printing member for each column of a group of columns in which data to be printed is recorded by said designations, each printing member having a continuous row of types in which alternate types correspond to the characters represented by a group of index-point positions last sensed by the sensing means and the remaining types correspond to a group comprising the remaining index-point positions first sensed, said printing mechanism also including operating means for the printing members for moving the types past a printing line and operative to restore the type members from a previous operation, said restoring being effected while the sensing means is sensing the second named group of index-point positions, said printing mechanism including means controlled by the sensing means for selectively stopping the printing members with any of the alternate types presented at the printing line when said single designations occur in the first group of index-point positions; and additional means for controlling said stopping means to present the remaining types at the printing line and preset under control of such single designations as may appear in said second group of index-point positions, said additional means being preset while the sensing means is sensing the second named group of designations and operative to control the stopping means while the sensing means is sensing the first named group of index-point positions.

12. In a machine controlled by records wherein data is represented by designations placed in columns of index-point positions, each column having a row of index-point positions representing the digits 0 to 9 and arranged in numerical order from one end of the column to the other, said digits being designated by a single designation in such column; means to sense a column of said records in numerical order; a printing member having a row of type elements in numerical order spaced at intervals and corresponding to a first group of index-point positions and arranged on said member in the same order as said index-point positions occur in said column and having a second group of type elements interspersed with the first group and also arranged in the same order as the remaining designations occur in said column; means to set said printing members to any of said type positions and controlled directly by the sensing device while it is traversing the index-point positions corresponding to one of said groups of type, and storage means controlled by the sensing means while it is traversing the remaining index-point positions for alternatively controlling the setting means to set the printing member in any of the interspersed type positions while the sensing means is traversing the said one group of index-point positions, said printing mechanism being controlled either directly by the sensing means or indirectly by the sensing means through the storage device according to whether the designation in a column appears in said first or said second group of index-point positions, respectively.

13. In a machine controlled by records in which data is recorded by selectively placing single designations in columns of index-point positions, each index-point position representing a different character, each designation being differentially disposed in any one of the index-point positions of a column to designate any one of the characters corresponding to such index-point positions; printing mechanism having a type member for each column, each type member having types corresponding to the successive index-point positions of one continuous portion of a column alternating with types corresponding to the index-point position of the remaining portion of such column; printing control means presettable to represent any of the characters in said first continuous portions of said columns and operative, when preset to represent a character designation in any column, to control the printing means to cause the type corresponding to such character designation to be presented at a printing line; and record sensing means first traversing the first named portions of said columns and operative to preset the printing control means to represent the characters designated by any designations which may appear in said first-named portions and thereafter traversing the remaining continuous portions and, during such last-named traverse, controlling the printing means directly to present at the printing line characters represented by such designations as may appear in the remaining portions of said columns, whereby, if the single designation appears in the first sensed portion of any column the printing mechanism will be controlled by the printing control mechanism for such column, and, if such designation appears in the remaining portion, the printing mechanism will be controlled directly by the sensing means for such column.

14. In a record controlled machine operable in cycles and having means operable over the major portion of each cycle to traverse the columns of each record to detect designations in said columns, each column comprising a series of index-point positions, each position representing a character, each character being designated by a single designation placed in an appropriate one of said index-point positions; printing mechanism having type members for each sensed column and means operable during a relatively small portion of each cycle, while the sensing means is sensing only predetermined portions of the record columns, to set the type members to present at a printing line any of the characters corresponding to designations in any of the index-point positions, said setting means restoring said printing members from a previous operation during the period in the cycle when the sensing means is traversing the remaining portions of said columns, said setting means being directly controlled by the sensing means while the latter is sensing said predetermined portions of said columns, to set the printing members to present the characters corresponding to designations which appear only in said predetermined portions of said columns; and storing means controlling by designations which appear only in the remaining portions of said columns, and sensed while the printing members are being restored, for storing representations of the designations in said remaining portion, said storing means thereafter controlling the setting means to set said printing members according to such representations while the sensing means is sensing said predetermined portions.

15. In a machine of the class described, sensing means traversing a record column consisting of a row of index-point positions, each position representing a different character, any one of which positions may or may not contain said designation; a plurality of storing devices, each device representing a character and corresponding to one of a predetermined number of successively sensed index-point positions of said column, said devices being selectively rendered operative by the sensing means when a designation occurs in the corresponding one of the predetermined number of index-point positions; a printing member having two series of types, one series of types corresponding to said storing devices and their related characters and the other series of types corresponding to the remaining index-point positions and the characters represented thereby; and means to set said printing members to present any of said types at a printing line and controlled eit' er by a storing device which has been rendered operative, in the event the designation appears in one of the predetermined number of index-point positions, or by the sensing means in the event said designation appears in any one of the remaining index-point positions.

16. In a machine controlled by records having rows of index-point positions in which single designations, each occurring alone in any one of a row of index-point positions representing characters, denote the characters of data recorded; storage means, including a plurality of storage devices for each row, each settable to store a representation of a designation in a predetermined index point position of a row; printing means, including printing members, each having types corresponding to all of the characters represented by the index-point positions of a single row, and including means controllable by the storage devices to set said printing members to present any of the types in the predetermined parts of a row at the printing line; and record sensing means controlling both the storage means and the setting means to either selectively set the storage devices when the single designations occur in said predetermined parts of said rows or directly control the setting means to present any of the other characters at the printing line when the single designations occur in the remaining parts of the rows.

17. In a machine controlled by records having a plurality of rows of index-point positions, each position corresponding to a character represented by a designation placed in such position; printing mechanism having type members, one for each row, each type member being settable to present at a printing line any of the characters represented by a single designation in any of the index-point positions of the corresponding rows; setting means for the type members, including a setting magnet for each row and the associated type member; a series of storage circuits for each row for controlling each magnet, there being a storage circuit for each of a predetermined number of index-point positions of each row, each storage circuit of a series corresponding to a character and including means to close a circuit to the magnet for such row when the storage circuit is closed; and contact means responsive to said designations for selectively closing either the storage circuits or circuits to said magnets according to whether the designations occur in the predetermined index-point positions or in the remaining positions of said rows.

18. In a machine controlled by records having a plurality of rows of index-point positions, each position corresponding to a character, said character being represented by a designation placed in the proper index-point position; a plurality of series of storage circuits, one series for each row, each circuit of a series corresponding to one of a predetermined number of index-point positions in the row associated with such series and having circuit closing means rendered effective when the storage circuit is closed, said circuit closing means, when rendered effective, storing a representation of the character represented by a designation in the index-point position corresponding to said storage circuit; printing means including printing magnets, one for each row, for effecting printing of all the characters corresponding to the index-point positions of said row; record sensing means, including a sensing element for traversing each row to detect the position of a designation in such row; control means controlled by said sensing means for selectively closing the storage circuits when designations occur in the predetermined positions, printing control circuits including said magnets and said circuit closing means while the sensing means is traversing the remaining positions of said rows, means in said printing control circuits for closing circuits to the printing magnets through the first named circuit closing means of such rows as may have been rendered effective by a designation in the predetermined positions, and means to connect said sensing elements to said magnets while the magnets are subject to control by the printing control circuits to enable the magnets to be energized under control of designations in the remaining index-point positions.

GEORGE F. DALY.

REFERENCES CITED

The following references are of record in the file of this patent:

UNITED STATES PATENTS

| Number | Name | Date |
|---|---|---|
| 1,506,382 | Peirce | Aug. 24, 1929 |
| 1,727,471 | Tasker | Sept. 10, 1929 |
| 1,750,191 | Peirce | Mar. 11, 1930 |
| 1,909,548 | Peirce | May 16, 1933 |
| 2,032,805 | Lake | Mar. 3, 1936 |
| 2,053,067 | Cunningham | Sept. 1, 1936 |
| 2,076,717 | Fuller | Apr. 13, 1937 |
| 2,077,962 | Smith | Apr. 20, 1937 |
| 2,120,233 | Daly et al. | June 14, 1938 |
| 2,165,260 | Herman | July 11, 1939 |
| 2,175,530 | Knutsen | Oct. 10, 1939 |